United States Patent
Kim et al.

(10) Patent No.: US 12,323,843 B2
(45) Date of Patent: *Jun. 3, 2025

(54) METHOD FOR REPORTING MEASUREMENT RESULT BY USER EQUIPMENT TRANSCEIVING DATA BY FIRST RADIO ACCESS TECHNOLOGY AND SECOND RADIO ACCESS TECHNOLOGY, AND DEVICE THEREFOR

(71) Applicant: Samsung Electronics Co., Ltd., Suwon-si (KR)

(72) Inventors: Soenghun Kim, Suwon-si (KR); Donggun Kim, Seoul (KR); Sangbum Kim, Suwon-si (KR); Jaehyuk Jang, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,189

(22) Filed: Mar. 4, 2024

(65) Prior Publication Data

US 2024/0214855 A1     Jun. 27, 2024

Related U.S. Application Data

(63) Continuation of application No. 17/444,272, filed on Aug. 2, 2021, now Pat. No. 11,924,665, which is a
(Continued)

(30) Foreign Application Priority Data

Mar. 24, 2017    (KR) ........................ 10-2017-0037533

(51) Int. Cl.
*H04W 4/00*        (2018.01)
*H04W 24/10*      (2009.01)
(Continued)

(52) U.S. Cl.
CPC ........... *H04W 24/10* (2013.01); *H04W 68/06* (2013.01); *H04W 88/06* (2013.01)

(58) Field of Classification Search
CPC ..... H04W 24/10; H04W 68/06; H04W 88/06; H04W 74/0833; H04W 76/16; H04W 68/02; H04W 76/02
See application file for complete search history.

(56) References Cited

U.S. PATENT DOCUMENTS 10,368,334 B2    7/2019   Park et al.
11,140,567 B2 * 10/2021   Tsai ...................... H04W 24/10
(Continued)

FOREIGN PATENT DOCUMENTS

KR    10-2012-0063426 A     6/2012
KR    10-2013-0103449 A     9/2013
(Continued)

OTHER PUBLICATIONS

International Search Report regarding Application No. PCT/KR2018/003519, issued Jun. 26, 2018, 4 pages.
(Continued)

*Primary Examiner* — Omoniyi Obayanju

(57) ABSTRACT

The present disclosure relates to a communication technique for combining, with an IoT technology, a 5G communication system for supporting a data transmission rate higher than that of a 4G system, and to a system therefor. The present disclosure may be applied to intelligent services (e.g., a smart home, a smart building, a smart city, a smart car or connected car, healthcare, digital education, retail business, security and safety-related service, etc.), based on a 5G communication technology and an IoT-related technology. A method for a user equipment in a first communication system according to the present invention comprises steps in which a user equipment in an inactive state: transmits a paging area update request message; checks whether or not
(Continued)

a timer associated with a paging area update has expired; and transitions into an idle state if a response message for the paging area update request message has not been received until the timer has expired.

20 Claims, 56 Drawing Sheets

Related U.S. Application Data continuation of application No. 16/495,809, filed as application No. PCT/KR2018/003519 on Mar. 26, 2018, now Pat. No. 11,082,874.

(51) Int. Cl.
*H04W 68/06* (2009.01)
*H04W 88/06* (2009.01)

(56) References Cited

U.S. PATENT DOCUMENTS

| | | | |
|---|---|---|---|
| 2008/0304434 A1 | 12/2008 | Giaretta et al. | |
| 2011/0190010 A1 | 8/2011 | Cho | |
| 2012/0142371 A1 | 6/2012 | Park et al. | |
| 2013/0235742 A1 | 9/2013 | Josiam et al. | |
| 2016/0127884 A1 | 5/2016 | Kim et al. | |
| 2016/0150435 A1 | 5/2016 | Baek et al. | |
| 2017/0215117 A1 | 7/2017 | Kwon et al. | |
| 2017/0324459 A1 | 11/2017 | Koskela et al. | |
| 2017/0332419 A1 | 11/2017 | Kim et al. | |
| 2018/0132158 A1 | 5/2018 | Tseng et al. | |
| 2018/0234894 A1 | 8/2018 | Jiang | |
| 2018/0270895 A1 | 9/2018 | Park et al. | |
| 2019/0230714 A1* | 7/2019 | Liu | H04W 74/006 |
| 2019/0349883 A1 | 11/2019 | Fuhishiro et al. | |
| 2019/0357069 A1 | 11/2019 | Harada et al. | |

FOREIGN PATENT DOCUMENTS

| | | |
|---|---|---|
| KR | 10-2016-0063020 A | 6/2016 |
| KR | 10-2017-0128042 A | 11/2017 |
| WO | 2015009069 A1 | 1/2015 |
| WO | 2016140403 A1 | 9/2016 |
| WO | 2016163786 A1 | 10/2016 |

OTHER PUBLICATIONS

Office Action dated Mar. 26, 2021 in connection with Korean Application No. 10-2017-0037533, 10 pages.
Samsung, "Cell Quality Derivation from Beam Quality," R1-1612475, 3GPP TSG RAN WG1 Meeting #87, Reno, USA, Nov. 14-18, 2016, 4 pages.
Nokia, et al., "Mobility Measurements in Connected Mode," R2-1701067, 3GPP TSG-RAN WG2 Meeting #97, Feb. 13-17, 2017, 8 pages.
Nokia, et al., "On Deriving Cell Quality in NR," R2-1701572, 3GPP TSG-RAN WG2 NR #97, Feb. 13-17, 2017, 3 pages.
Sony, "DL measurements for CONNECTED mode mobility," R1-1703131, 3GPP TSG RAN WG1#88, Feb. 13-17, 2017, 3 pages.
Decision of Patent dated Oct. 21, 2021 in connection with Korean Patent Application No. 10-2017-0037533, 5 pages.
Non-Final Office Action dated Mar. 16, 2022, in connection with U.S. Appl. No. 17/030,778, 8 pages.
Office Action dated May 11, 2022, in connection with Korean Patent Application No. 10-2022-0009426, 10 pages.
Huawei, et al., "Discussion on link recovery procedure for beam blockage," R1-1700041, 3GPP TSG-RAN WG1 Meeting #AH, Spokane, USA, Jan. 16-20, 2017, 5 pages.
CATT, "Considerations on beam recovery mechanism," R1-1702078, 3GPP TSG-RAN WG1 Meeting #88, Athens, Greece, Feb. 13-17, 2017, 4 pages.
Notification of a Decision to Grant dated Dec. 2, 2022, in connection with Korean Patent Application No. 10-2022-0009426, 5 pages.
Samsung, "Recovery mechanisms for beam failure scenarios," R1-1702938,3GPP TSG RAN WG1 Meeting #88, Athens, Greece, Feb. 13-17, 2017, 3 pages.
Samsung, "Trigger condition for beam failure recovery," R1-1702939, 3GPP TSG RAN WG1 Meeting #88, Athens, Greece Feb. 13-17, 2017, 4 pages.
CATT, "Discussion on beam recovery," R1-1700225, 3GPP TSG RAN WG1 AH_NR Meeting, R1-1700225, Spokane, USA Jan. 16-20, 2017, 3 pages.

* cited by examiner

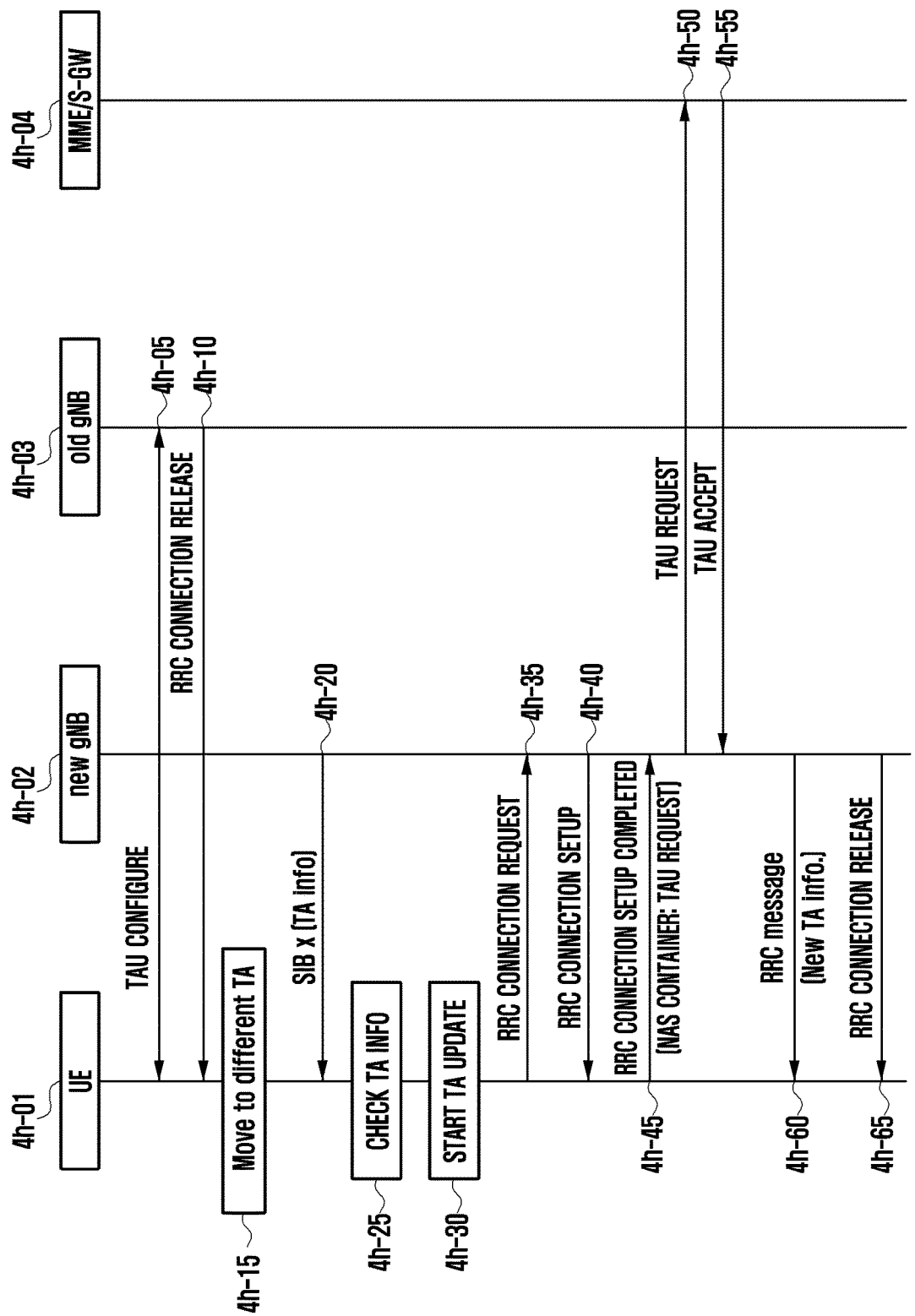

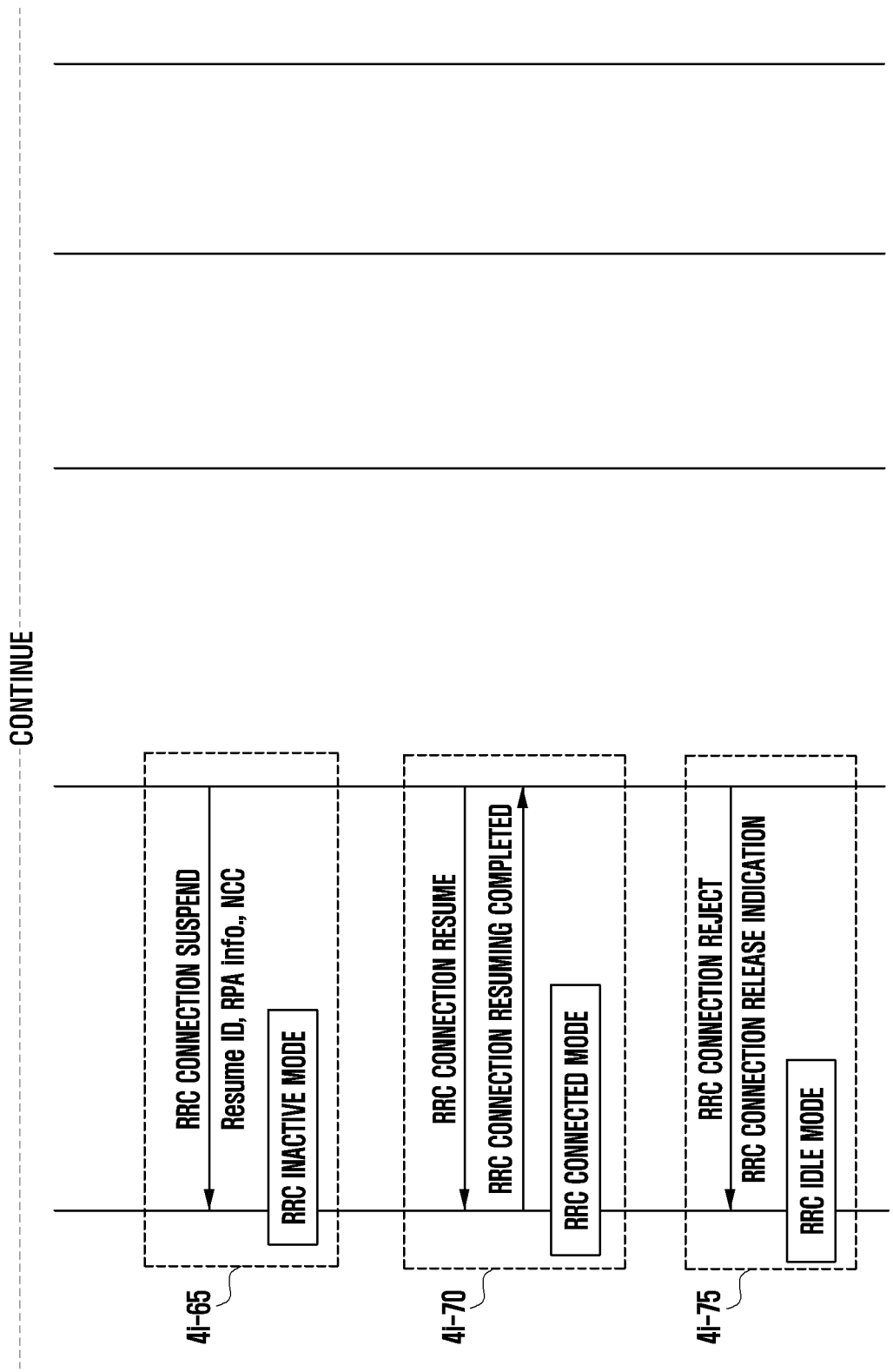

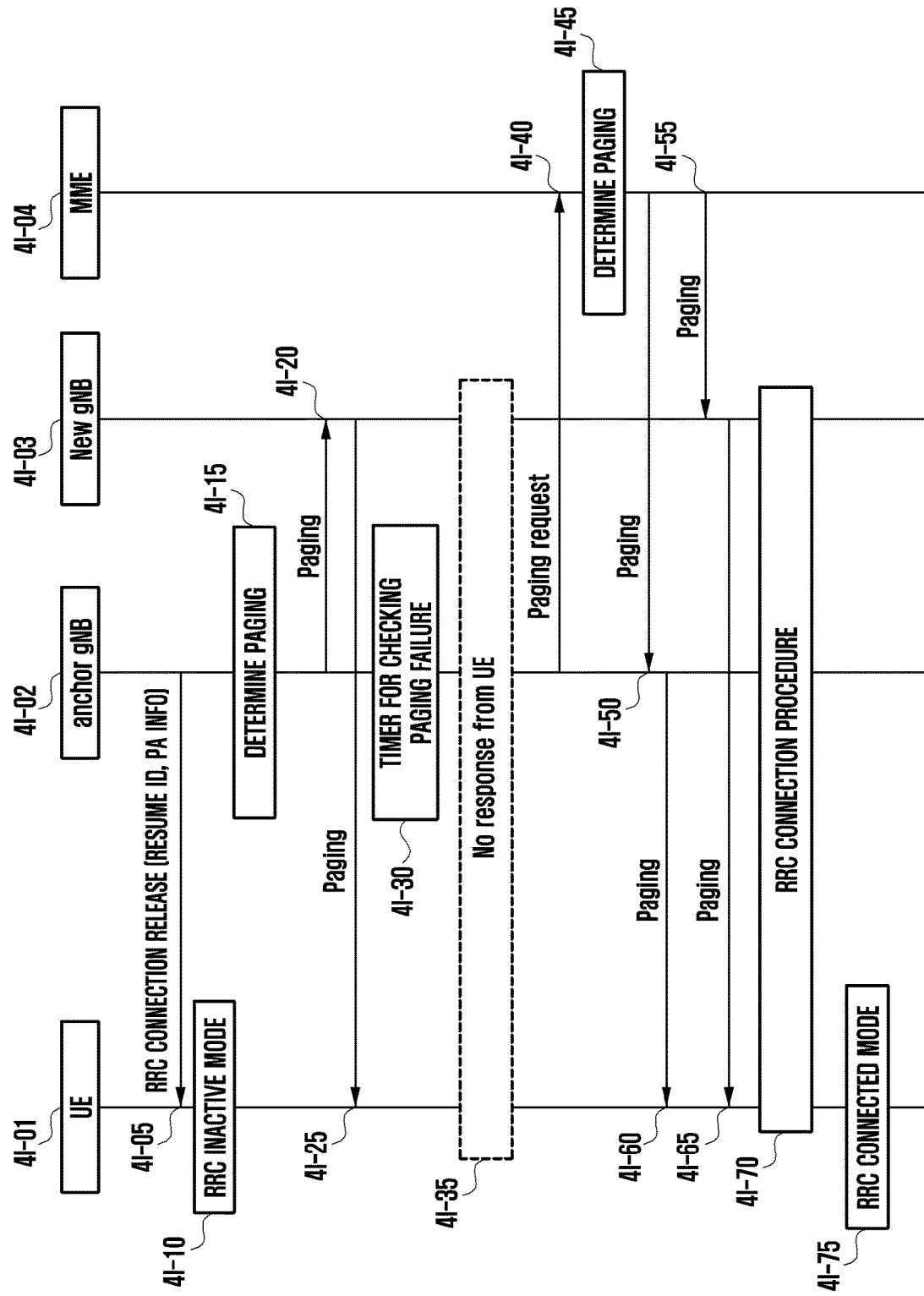

SCHEME FOR SOLVING RRC STATE MISMATCH

FIG. 5E
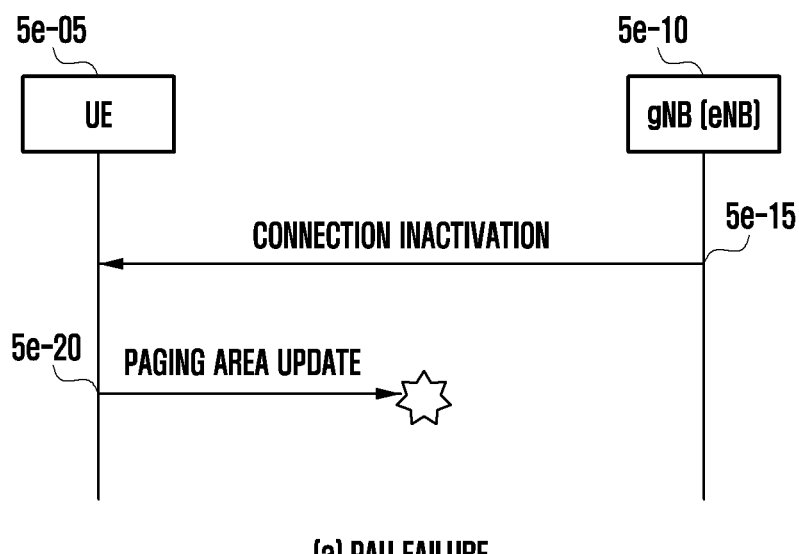
(a) PAU FAILURE
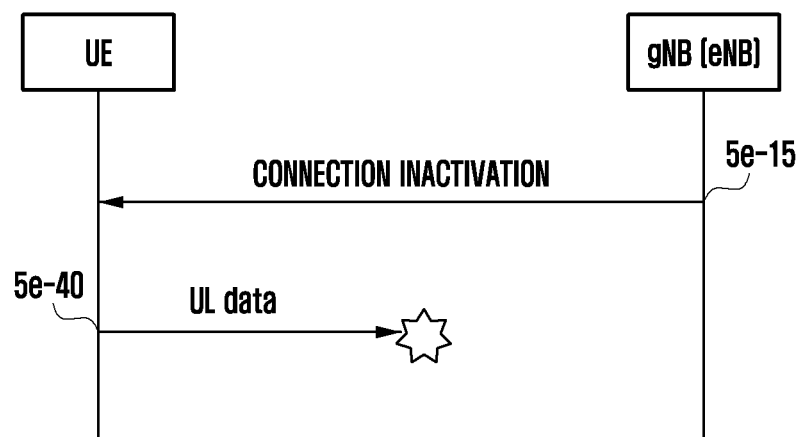
(b) UL DATA TRANSMISSION FAILURE

[a] PAU failure

FIG. 5G
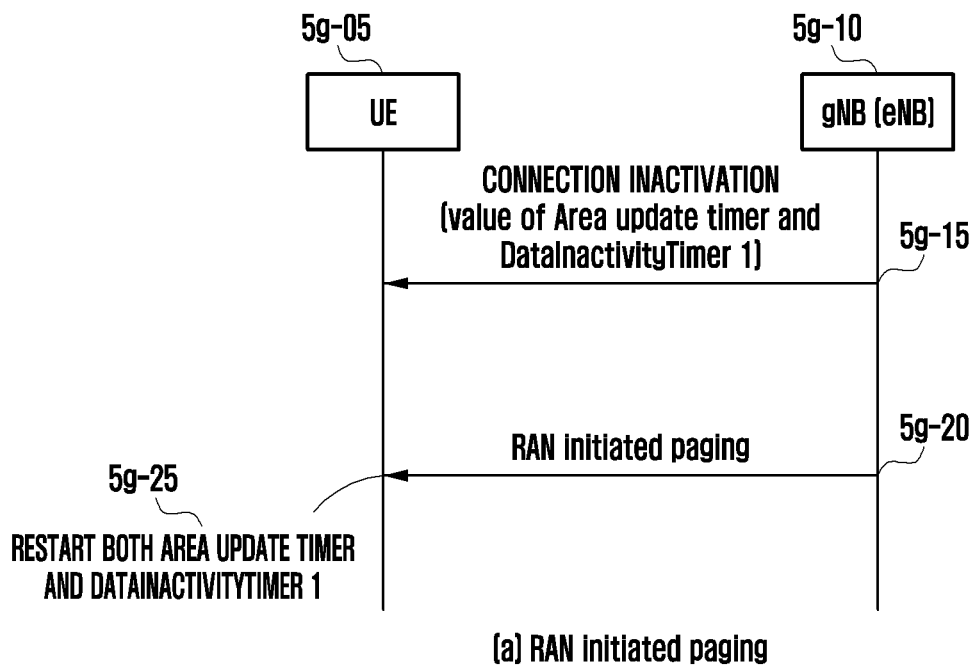
(a) RAN initiated paging
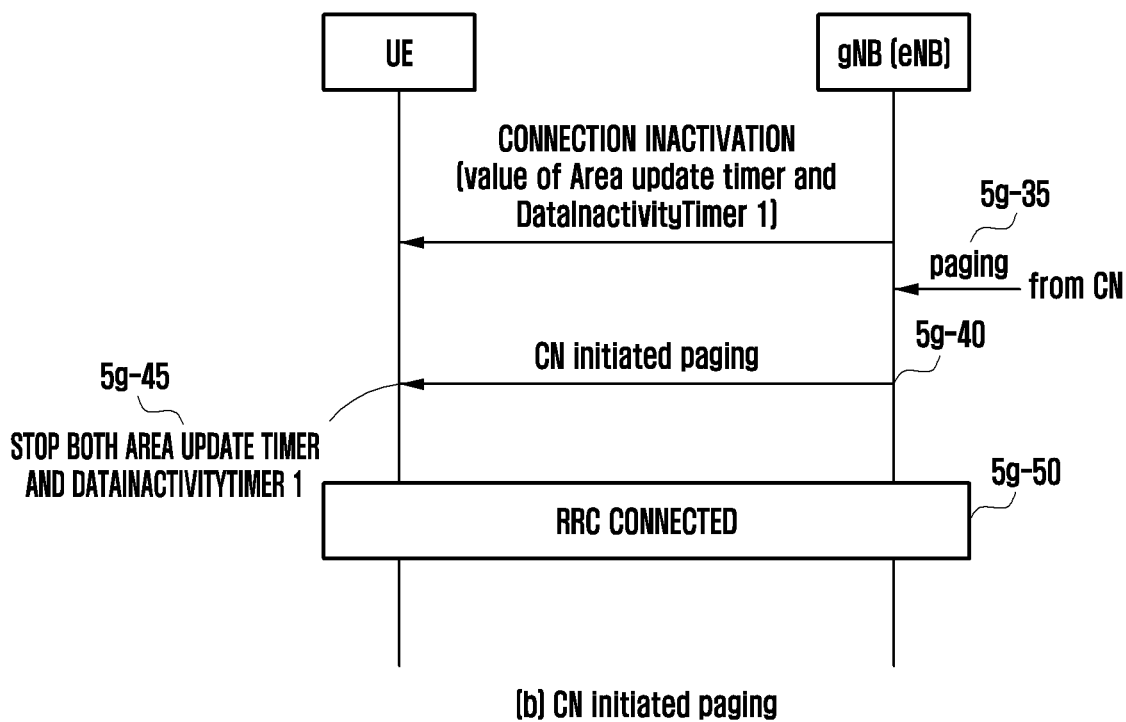
(b) CN initiated paging

METHOD FOR REPORTING MEASUREMENT RESULT BY USER EQUIPMENT TRANSCEIVING DATA BY FIRST RADIO ACCESS TECHNOLOGY AND SECOND RADIO ACCESS TECHNOLOGY, AND DEVICE THEREFOR

CROSS-REFERENCE TO RELATED APPLICATIONS

This application is a continuation of application Ser. No. 17/444,272 filed on Aug. 2, 2021, now U.S. Pat. No. 11,924,665, which is a continuation of application Ser. No. 16/495,809 which is the 371 National Stage of International Application No. PCT/KR2018/003519, filed Mar. 26, 2018, which claims priority to Korean Patent Application No. 10-2017-0037533, filed Mar. 24, 2017, the disclosures of which are herein incorporated by reference in their entirety.

BACKGROUND

1. Field

The disclosure relates to operations of a UE and a base station in a wireless communication system. For example, the disclosure relates to a method for measuring a cell and reporting the result by a UE configured to transmit/receive data by simultaneously using multiple radio access technologies (RATs).

In addition, the disclosure relates to a beam switching method in a next-generation mobile communication system that uses beams.

In addition, the disclosure relates to a method and a device for recovering a beam, based on a random access, in a next-generation mobile communication system.

In addition, the disclosure relates to a method and a device for determining an RRC mode, based on information included in a paging message, in a next-generation mobile communication system.

In addition, the disclosure relates to a method and a device for preventing a situation in which there is a mismatch between radio access statuses, in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid frequency shift key (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IOT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

An aspect of the disclosure is to propose a method wherein a UE, which transmits/receives data by simultaneously using multiple radio access technologies (RATs) in a wireless communication system, measures a cell and reports the result such that a base station can accurately add/release cells and determine a handover.

Another aspect of the disclosure is to propose a method wherein a network triggers beam switching in a multi-beam-based system.

Meanwhile, in a next-generation mobile communication system, multiple antennas may be used to form a narrow beam, in order to support a high data transmission rate, such that a beam formation gain can be obtained. Such a narrow beam may have a high beam formation gain but has a small coverage to support UEs. Accordingly, data needs to be transmitted/received after matching a beam of a UE with a beam of a base station. If an obstacle exists between the UE and the base station, or if mobility of the UE causes a mismatch between the beam of the UE and the beam of the base station, the signal strength may fall below an appropriate level. In addition, such a phenomenon may occur more frequency if a high frequency band is used. Therefore, another aspect of the disclosure is to propose a process wherein, if the transmission/reception strength between the beam of the UE and the beam of the base station is weak in a next-generation mobile communication system as mentioned above, the beams are corrected or recovered.

In addition, another aspect of the disclosure is to propose a method for determining whether to maintain an RRC inactivation mode, based on information included in a CN paging message, or to delete UE context and to transition to an RRC idle mode.

In addition, another aspect of the disclosure is to propose a method for solving the phenomenon of a mismatch between radio access statuses.

In accordance with an aspect of the disclosure, a method of a UE in a first communication system includes: transmitting a paging area update request message in an inactivated state; identifying whether a timer related to paging area update has expired; and transitioning to an idle state in case that a response message related to the paging area update request message has not been received until the timer expires.

In accordance with another aspect of the disclosure, a UE in a first communication system includes: a transceiver; and a controller configured to transmit a paging area update request message in an inactivated state, to identify whether or not a timer related to paging area update has expired, and to transition to an idle state in case that a response message related to the paging area update request message has not been received until the timer expires.

According to an embodiment of the disclosure, through the disclosure, a UE reports a measurement result such that a base station can perform accurate cell addition/release, handover commands, and the like.

In addition, according to another embodiment of the disclosure, the disclosure proposes a network triggering beam switching method in a next-generation mobile communication system such that operations of a UE and a base station necessary for beam switching operations can be reduced.

In addition, according to another embodiment of the disclosure, in the disclosure, if signal strength drops below an appropriate level in an environment wherein a beam of a UE and a beam of a base station are aligned with each other such that communication is conducted with at least an appropriate level of signal strength, the UE performs a random access procedure so as to perform a process of reselecting beams with the base station. The process of recovering at least an appropriate level of signal strength in the random access procedure is enabled through a MAC CE such that fast beam recovery is possible.

In addition, according to another embodiment of the disclosure, in the disclosure, when a network sends a CN paging message to a UE in an RRC inactive mode in a next-generation mobile communication system, the cause of paging is defined in the CN paging message such that the UE does not lose the advantages of the RRC inactive mode. Accordingly, the UE can determine whether to store UE context and maintain the RRC inactive mode or to delete the UC context and transition to the RRC idle mode.

In addition, according to another embodiment of the disclosure, the UE changes the radio access state based on a timer in the disclosure such that a radio access state mismatch can be prevented.

BRIEF DESCRIPTION OF DRAWINGS

FIG. 4H is a diagram illustrating a procedure wherein, if an RRC inactive mode UE moves out of a configured CN-based paging area (tracking area (TA)), the TA of the UE is updated in the disclosure.

FIG. 4L is a diagram illustrating a procedure performed when an anchor gNB transmits a RAN paging message to an RRC inactive mode UE and fails in the disclosure.

FIG. 4O illustrates a block configuration of a TRP in a wireless communication system to which an embodiment of the disclosure may be applied.

FIG. 5E is a diagram illustrating a radio access state mismatch occurring in a next-generation mobile communication system.

FIG. 5G is a diagram illustrating a timer operation when paging is received in a next-generation mobile communication system.

DETAILED DESCRIPTION

Figure 1A:
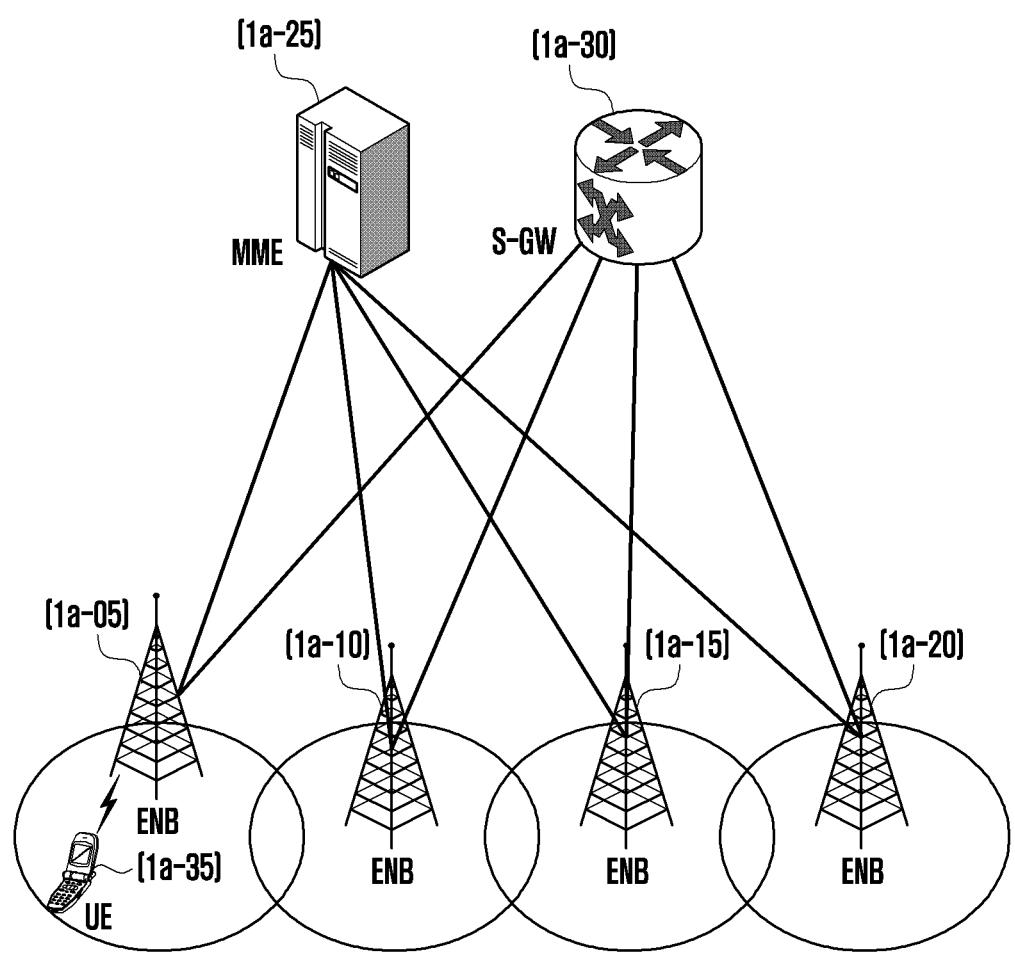
FIG. 1A is a diagram illustrating the structure of an LTE system which is referred to for description of the disclosure.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to make the disclosure complete and to inform those skilled in the art of the scope of the disclosure, and the disclosure is defined only by the scope of the appended claims. Throughout the specification, the same or like reference numerals designate the same or like elements.

First Embodiment

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

Terms for identifying access nodes, terms referring to network entities, terms referring to messages, terms referring to interfaces between network entities, and terms referring to various kinds of identification information, used in the following description, are examples for convenience of description. Therefore, the disclosure may not be limited by the terminologies provided below, and other terms that indicate subjects having equivalent technical meanings may be used.

Hereinafter, terms and names defined by the 3rd generation partnership project long term evolution (3GPP LTE), which is the latest standard among currently existing communication standards, will be used in the disclosure for convenience of description. However, the disclosure is not limited to the terms and names, and is identically applicable to other systems following different standards. Particularly, the disclosure is applicable to 3GPP new radio (NR) (5th generation mobile communication standard).

FIG. 1A is a diagram illustrating the structure of an LTE system which is referred to for description of the disclosure.

Referring to FIG. 1A, the wireless communication system includes multiple base stations 1a-05, 1a-10, 1a-15, and 1a-20, a mobility management entity (MME) 1a-20, and a serving-gateway (S-GW) 1a-30. A user equipment (hereinafter, referred to as UE or terminal) 1a-35 accesses an external network through the base stations 1a-05, 1a-10, 1a-15, and 1a-20 and the S-GW 1a-30.

The base stations 1a-05, 1a-10, 1a-15, and 1a-20 provide a radio access to UEs that access the network as access nodes of a cellular network. That is, the base stations 1a-05, 1a-10, 1a-15, and 1a-20 aggregate and schedule status information, such as the buffer status of the UEs, the available transmission power status, and the channel status, in order to accommodate traffic of users, thereby supporting connection between the UEs and a core network (CN). The MME 1a-25 is a device in charge of not only the mobility management function related to the UEs, but also various control functions, and is connected to multiple base stations. The S-GW 1a-30 is a device configured to provide a data bearer. In addition, the MME 1a-25 and the S-GW 1a-30 may further perform authentication of a UE that accesses the network, bearer management, and the like, and processes packets received from the base stations 1a-05, 1a-10, 1a-15, and 1a-20 or packets to be delivered to the base stations 1a-05, 1a-10, 1a-15, and 1a-20.

Figure 1B:
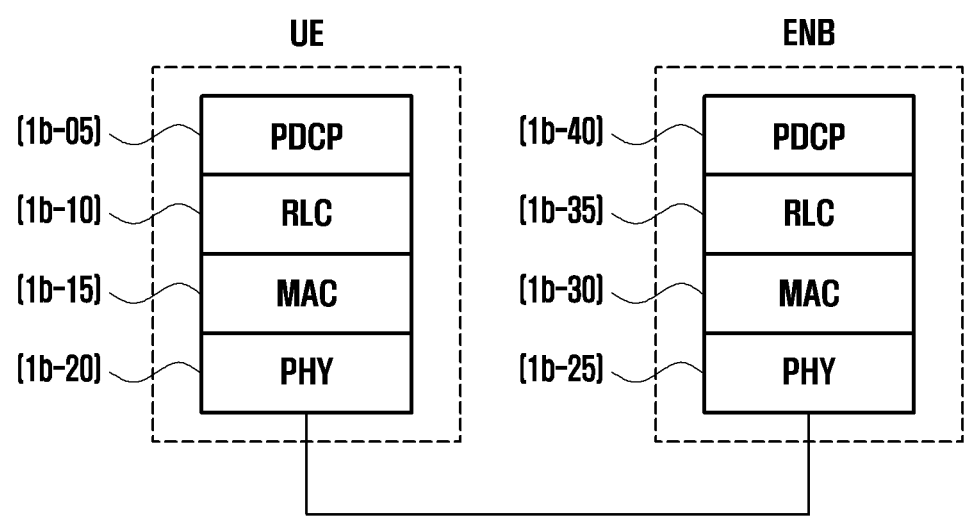
FIG. 1B is a diagram illustrating a wireless protocol structure of an LTE system which is referred to for description of the disclosure.

FIG. 1B is a diagram illustrating a wireless protocol structure of an LTE system which is referred to for description of the disclosure. The NR to be defined later may have a partially different structure from the wireless protocol structure in the diagram, but the same will be described for convenience of description of the disclosure.

Referring to FIG. 1B, the wireless protocol of the LTE system includes packet data convergence protocols (PDCP) 1b-05 and 1b-40, radio link controls (RLCs) 1b-10 and 1b-35, and medium access controls (MACs) 1b-15 and 1b-30 in a UE and in an eNB, respectively.

The PDCPs 1b-10 and 1b-40 are in charge of operations such as IP header compression/restoration. The RLCs 1b-10 and 1b-35 reconfigure a packet data unit (PDU) into an appropriate size.

The MACs 1b-15 and 1b-30 are connected to various RLC layer devices configured in a single UE, and perform operations of multiplexing RLC PDUs to a MAC PDU and demultiplexing the RCL PDUs from the MAC PDU. The physical layers 1b-20 and 1b-25 perform operations of channel-coding and modulating upper layer data, turning the same into an OFDM symbol, and transmitting the same through a wireless channel, or demodulating an OFDM symbol received through the wireless channel, channel-decoding the same, and delivering the same to the upper layer.

In addition, the physical layers also use a hybrid automatic repeat request (HARQ) for additional error correction, and the receiving end transmits one bit so as to indicate whether or not a packet transmitted by the transmitting end has been received. This is referred to as HARQ ACK/NACK information. Downlink HARQ ACK/NACK information regarding uplink transmission may be transmitted through a physical channel of a physical hybrid-ARQ indicator channel (PHCIH), and uplink HARQ ACK/NACK information regarding downlink transmission may be transmitted through a physical channel of a physical uplink control channel (PUCCH) or a physical uplink shared channel.

Meanwhile, each PHY layer may include a single frequency/carrier or multiple frequencies/carriers, and a technology by which a single base station simultaneously configures and uses multiple frequencies is referred to as carrier aggregation (CA). The CA technology refers to a technology wherein, unlike the conventional use of only one carrier for communication between a UE and a base station (E-UTRAN NodeB or eNB), a primary carrier and one secondary carrier or multiple secondary carriers are additionally used such that the amount of transmission can be substantially increased by the number of secondary carriers.

In the LTE, meanwhile, a cell using the primary carriers in a base station is referred to as a primary cell (PCell), and a cell using the secondary carriers is referred to as a secondary cell (SCell). A technology that expands the CA function to two base stations is referred to as dual connectivity (hereinafter, referred to as DC). According to the DC technology, a UE simultaneously connects and uses a master E-UTRAN NodeB (hereinafter, referred to as MeNB) and a secondary E-UTRAN NodeB (hereinafter, referred to as SeNB). Cells belonging to the MeNB are referred to as a master cell group (MCG), and cells belonging to the SeNB are referred to as a secondary cell group (SCG). Each of the cell groups has a representative cell. The representative cell of the MCG is referred to as a primary cell (hereinafter, referred to as PCell), and the representative cell of the SCG is referred to as a primary secondary cell (hereinafter, referred to as PSCell). When the above-mentioned NR is used, the MCG may use the LTE technology, and the SCG may use the NR such that the UE can simultaneously use LTE and NR.

Although not illustrated in the drawing, radio resource control (hereinafter, referred to as RRC) layers exist above the PDCP layers of the UE and the base station, respectively, and the RRC layers may exchange configuration control messages related to access and measurement for the sake of radio resource control. For example, the base station may instruct the UE to conduct a measurement by using the RRC layer message, and the UE may report the measurement result to the base station by using the RRC layer message.

Figure 1C:
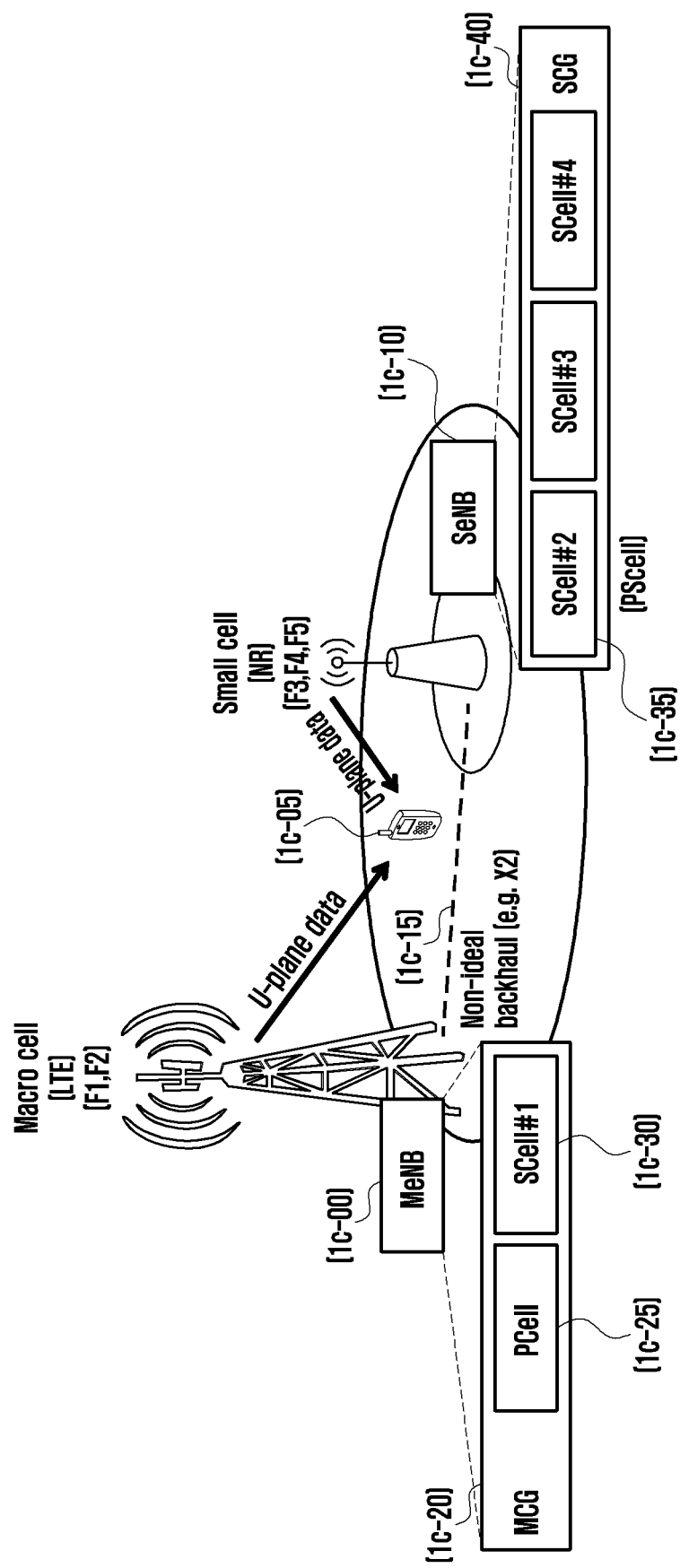
FIG. 1C is a diagram illustrating the concept of multi-connection in LTE and NR.

FIG. 1C is a diagram illustrating the concept of the dual connectivity.

By using the dual connectivity technology, a UE can simultaneously connect and use two base stations. This exemplary diagram illustrates a case in which a UE 1c-05 simultaneously connects a macro base station 1c-00 that uses LTE technology and a small cell base station 1c-10 that uses NR technology, and then transmits/receives data. The macro base station will be referred to as an MeNB, and the small cell base station will be referred to as an SeNB.

Multiple small cells may exist within the service area of the MeNB, and the MeNB is connected to the SeNBs through a wired backhaul network 1c-15. A set of serving cells provided from the MeNB is referred to as an MCG 1c-20, and one serving cell in the MCG is necessarily a PCell 1c-25 having all functions performed by an existing cell, such as connection establishment, connection re-establishment, and handover.

In the PCell, furthermore, an uplink control channel has a PUCCH. A serving cell other than the PCell is referred to as a SCell 1c-30. FIG. 1C illustrates a scenario wherein the MeNB provides one SCell, and the SeNB provides three SCells.

A set of serving cells provided by the SENB is referred to as an SCG 1c-40. When the UE transmits/receives data from two base stations, the MeNB transmits, to the SeNB, a command to add, change, or remove serving cells provided by the SeNB. In order to transmit such a command, the MeNB may configure the UE so as to measure serving cells and neighboring cells.

According to configuration information, the UE must report the measurement result to the MeNB. In order for the SeNB to efficiently transmit/receive data to the UE, a serving cell playing a similar role to that of the PCell of the MCG is necessary, and the same will be referred to as a PSCell in the disclosure. The PSCell is determined as one of the serving cells of the SCG, and is characterized by having a PUCCH, which is an uplink control channel. The PUCCH is used by the UE to transmit HARQ ACK/NACK information, channel status information (CSI) information, a scheduling request, and the like to the base station.

Figure 1D:
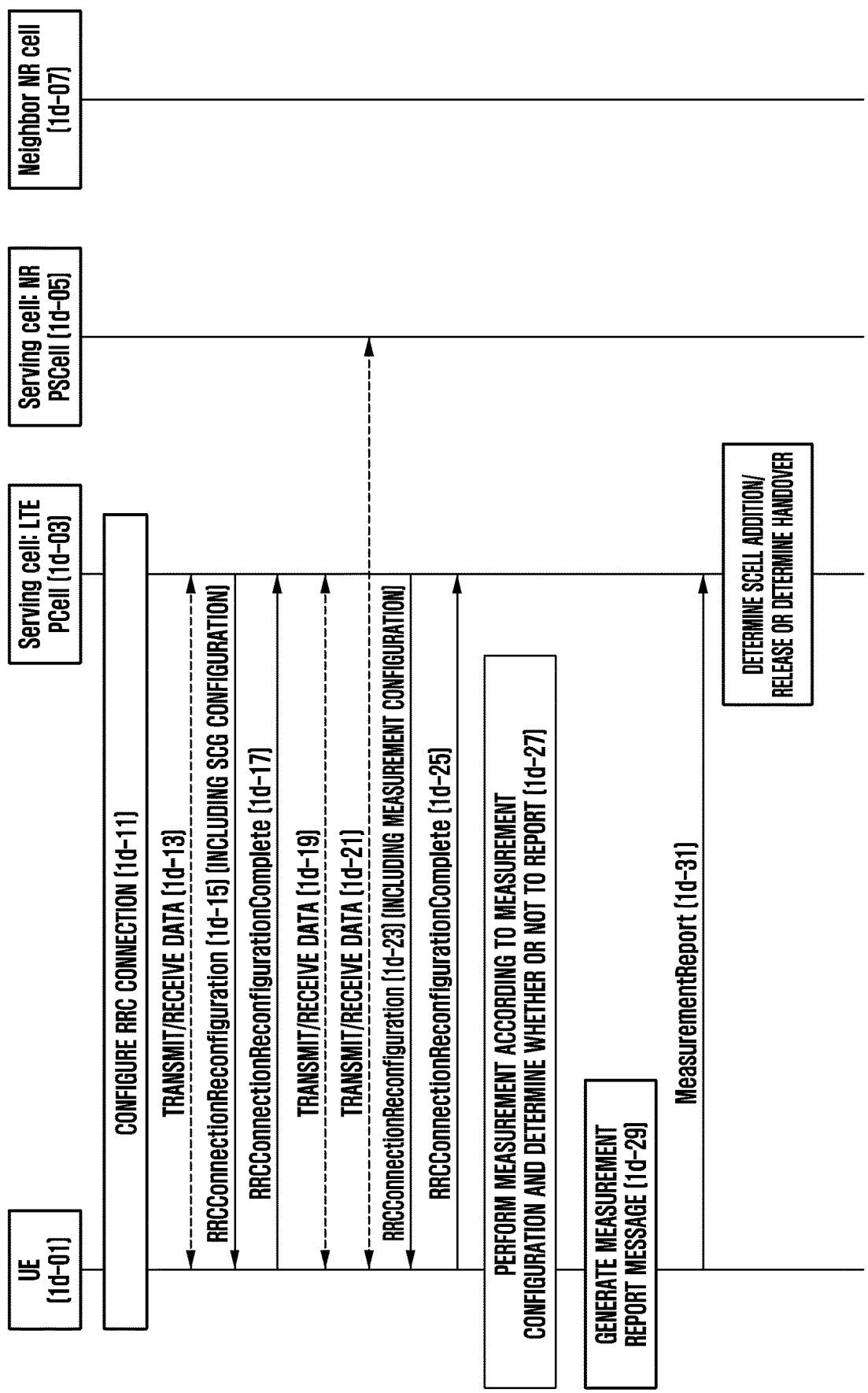
FIG. 1D is a diagram illustrating an example of a message flow between a UE and a base station when the disclosure is applied.

FIG. 1D is a diagram illustrating an example of a message flow between a UE, which transmits/receives data by simultaneously using multiple RATs proposed by the disclosure, and a base station when the UE uses a method of measuring a cell and reporting the result.

In the exemplary diagram, a UE 1d-01 in an idle mode (RRC_IDLE) performs an access to an LTE cell for a reason such as occurrence of data to be transmitted (1d-11). In the idle mode, the UE is not connected to a network, for the purpose of saving power consumed by the UE, for example, and thus cannot transmit data. A transition to a connected mode (RRC_CONNECTED) is necessary to transmit data. If the UE succeeds in a procedure of access to an LTE cell 1d-03, the status of the UE changes to a connected mode (RRC_CONNECTED). In the connected mode, the UE can transmit/receive data with the LTE cell (1d-13).

Thereafter, if the UE supports the DC, and if an NR cell is deemed to exist near the UE according to neighboring cell measurement report information from the UE, the base station transmits SCG information to the UE in order to configure the DC (1d-15). The SCG configuration information may include information regarding addition and release of SCells that are added to the SCG.

The SCG configuration information may be transmitted by using an RRCConnectionReconfiguration message in the RRC layer. Thereafter, the UE transmits a message confirming that the configuration information has been received, and the same may be transmitted by using an RRCConnectionReconfigurationComplete message (1d-17). Accordingly, the UE can transmit/receive data by simultaneously using the LTE cell 1d-03, which belongs to the MCG, and the NR cell 1d-05, which belongs to the SCG (1d-19)(1d-21).

Then, the base station configures, for the UE, measurement of cells near the UE (1d-23). The measurement configuration may include the measurement object (measObject), the report configuration, and the like.

The measurement object may include information regarding which frequency is to be measured. If the corresponding measurement frequency is a frequency at which an NR cell exists, an instruction may be issued to confirm whether cells existing at the corresponding frequency have a single beam or multiple beams, to determine, if there are multiple beams, detailed configuration information regarding the beams (for example, the number of beams, the identifier and measurement cycle of each beam, and the like), and to perform measurement with regard to specific beam identifiers only.

In addition, the report condition may include a configuration that instructs a periodic report of the measurement result to the base station, or to report the measurement result to the base station if the following conditions are satisfied:

Event A1 (if the serving cell measurement result is better than the threshold value)

Event A2 (if the serving cell measurement result is worse than the threshold value)

Event A3 (if the neighboring cell measurement result is better than the primary cell (PCell: the representative cell if the UE uses multiple serving cells) by an offset)

Event A4 (if the neighboring cell measurement result is better than the threshold value)

Event A5 (if the PCell measurement result is worse than the first threshold value, and if the neighboring cell measurement result is better than the second threshold value)

Event A6 (if the neighboring cell measurement result is better than the secondary cell (SCell: other cells than the PCell if the UE uses multiple serving cells) by an offset).

Meanwhile, a cell in the NR system may include a single beam or multiple beams, and the "cell measurement result" may correspond to a value calculated by using measurement result values of a beam of one cell. This may specifically instruct the base station on how to calculate the cell measurement result from the measurement configuration. For example, the base station may make a configuration such that only N beams, which have the best measurement results, among multiple beams measured from each cell are considered. In addition, the base station may instruct to calculate the "cell" measurement result by adding or averaging, for example, the N beam results. The measurement configuration may be transmitted by using an RRCConnectionReconfiguration message in the RRC layer. The UE then transmits a confirmation message regarding the configuration instruction (1d-25), and an RRCConnectionReconfigurationComplete message in the RRC layer may be used to this end.

After receiving the measurement configuration instruction, the UE determines whether or not to perform measurement with regard to each beam according to the received configuration, performs measurement, and determines whether or not the same conforms to the report configuration configured by the base station (1d-27). Accordingly, if the report configuration is satisfied (for example, if one of the events has been configured, or if the corresponding condition is satisfied for a predetermined time (also referred to as TimeToTrigger or TTT), the UE generates a message to report the measurement result to the base station (1d-29). If CA or DC has been configured for the UE, the measurement result includes measurement results regarding all configured cells. Accordingly, if different RATs have been configured as in this exemplary diagram, the UE has the following information included in the measurement result:

measResultPCell: LTE PCell measurement result measResultNeighCells: NR/E-UTRA/UTRA/GERAN measurement result (which is determined according to measObject configured by the base station, and which corresponds to a neighboring cell measurement result)

MeasResultServFreqList1 (for the SCell of LTE MCG; A value measured with regard to a bandwidth configured by the base station in connection with a predetermined reference signal (for example, common reference signal) defined in the LTE technology)
   ServCellIndex (serving cell index: configured by the base station with regard to each SCell)
   measResultSCell: LTE measurement result
   measResultBestNeighCell: LTE measurement result (the best measurement result of a neighboring cell having the same frequency with the corresponding SCell)

MeasResultServFreqList2 (for the PSCell and SCell of NR SCG; a value measured with regard to a predetermined reference signal (for example, NR-synchronization signal) determined in the NR technology across the entire band, through which the predetermined signal is transmitted)
   ServCellIndex (serving cell index: configured by the base station with regard to each SCell)
   measResultSCell: NR measurement result
   measResultBestNeighCell: NR measurement result (the best measurement result of a neighboring cell having the same frequency with the corresponding SCell)

The UE transmits the generated measurement result to the base station (1d-31). Accordingly, the LTE cell (PCell) may determine whether to add a new NR cell to the corresponding UE, to release the existing LTE cell or NR SCell, or to handover the same (that is, move the same to another cell).

Figure 1E:
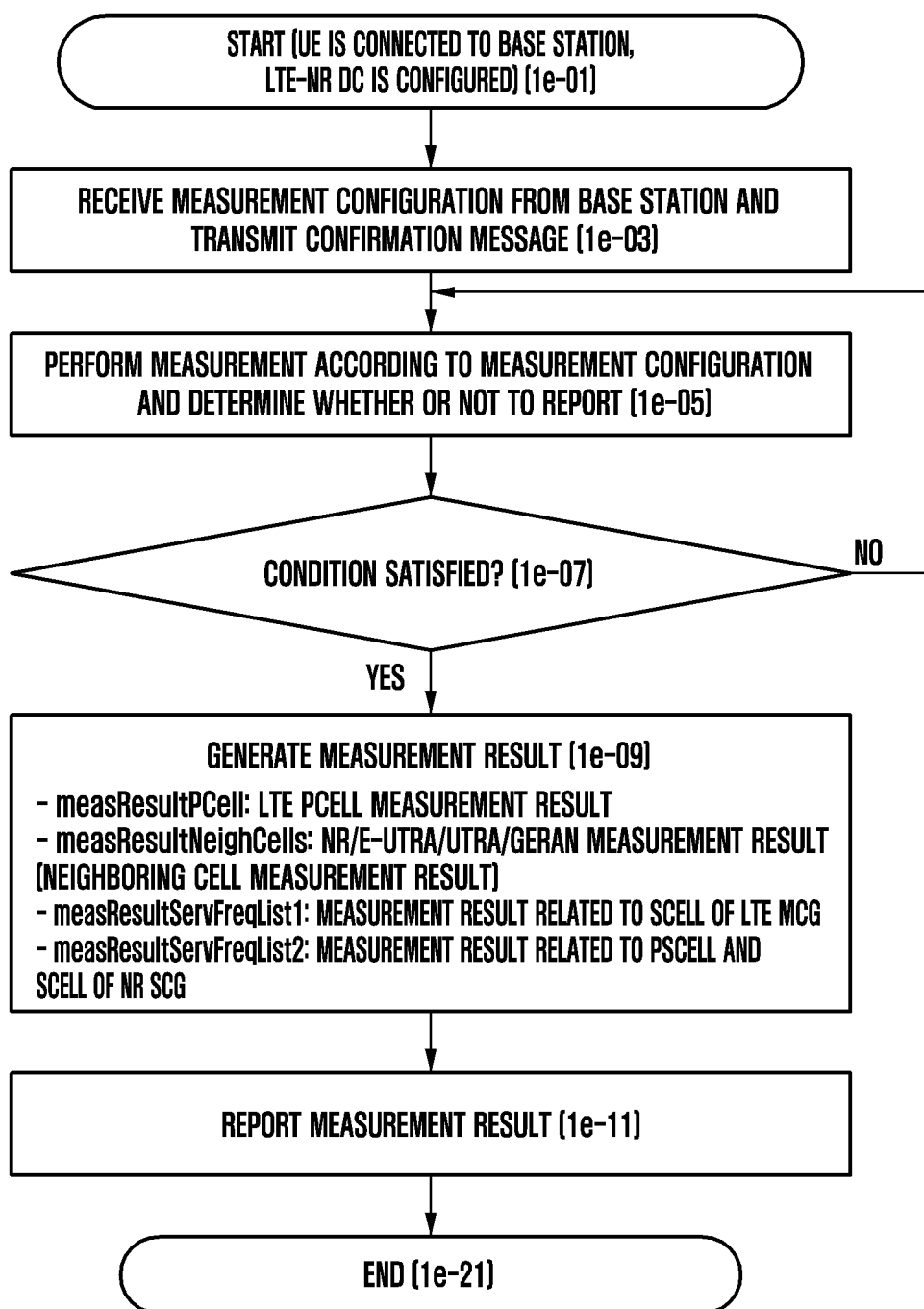
FIG. 1E is a diagram illustrating an example of the operating order of a UE when the disclosure is applied.

FIG. 1E is a diagram illustrating an example of the operating order of a UE when the disclosure is applied thereto.

FIG. 1E assumes a state in which the UE is connected to an LTE base station and is in a connected mode (RRC_CONNECTED), and further assumes a scenario wherein an NR cell is configured as an SCG such that the UE can transmit/receive data with an LTE MCG and an NR SCG (1e-01).

Then, the base station configures the UE so as to measure cells near the UE (1e-03). The measurement configuration may include the measurement object, the report configuration, and the like.

The measurement object may include information regarding which frequency is to be measured. An instruction may be issued to confirm whether cells existing at the corresponding frequency have a single beam or multiple beams, to determine, if there are multiple beams, detailed configuration information regarding the beams (for example, the number of beams, the identifier and measurement cycle of each beam, and the like), and to perform measurement with regard to specific beam identifiers only.

In addition, the report configuration may include a configuration that instructs a periodic report of the measurement result to the base station, or to report the measurement result to the base station if the following conditions are satisfied:
   Event A1 (if the serving cell measurement result is better than the threshold value)
   Event A2 (if the serving cell measurement result is worse than the threshold value)
   Event A3 (if the neighboring cell measurement result is better than the primary cell (PCell: the representative cell if the UE uses multiple serving cells) by an offset)
   Event A4 (if the neighboring cell measurement result is better than the threshold value)
   Event A5 (if the PCell measurement result is worse than the first threshold value, and if the neighboring cell measurement result is better than the second threshold value)
   Event A6 (if the neighboring cell measurement result is better than the secondary cell (SCell: other cells than the PCell if the UE uses multiple serving cells) by an offset).

Meanwhile, a cell in the NR system may include a single beam or multiple beams, and the "cell measurement result" may correspond to a value calculated by using measurement result values of a beam of one cell. This may specifically instruct the base station on how to calculate the cell measurement result from the measurement configuration. For example, the base station may make a configuration such that only N beams, which have the best measurement results, among multiple beams measured from each cell are considered. In addition, the base station may instruct to calculate the "cell" measurement result by adding or averaging, for example, the N beam results. The measurement configuration may be transmitted by using an RRCConnectionReconfiguration message in the RRC layer. The UE then transmits a confirmation message regarding the configuration instruction, and an RRCConnectionReconfigurationComplete message in the RRC layer may be used to this end.

After receiving the measurement configuration instruction, the UE determines whether or not to perform measurement with regard to each beam according to the received configuration, performs measurement, and determines whether or not the same conforms to the report configuration configured by the base station (1e-05). Accordingly, if the report configuration is satisfied (for example, if one of the events has been configured, or if the corresponding condition is satisfied for a predetermined time (also referred to as TimeToTrigger or TTT) (1e-07), the UE generates a message to report the measurement result to the base station (1e-09). If CA or DC has been configured for the UE, the measurement result includes measurement results regarding all configured cells. Accordingly, if different RATs have been configured as in this exemplary diagram, the UE has the following information included in the measurement result:
   measResultPCell: LTE PCell measurement result
   measResultNeighCells: NR/E-UTRA/UTRA/GERAN measurement result (which is determined according to measObject configured by the base station, and which corresponds to a neighboring cell measurement result)
   MeasResultServFreqList1 (for the SCell of LTE MCG; A value measured with regard to a bandwidth configured by the base station in connection with a predetermined reference signal (for example, common reference signal) defined in the LTE technology)
      ServCellIndex (serving cell index: configured by the base station with regard to each SCell)
      measResultSCell: LTE measurement result
      measResultBestNeighCell: LTE measurement result (the best measurement result of a neighboring cell having the same frequency with the corresponding SCell)
   MeasResultServFreqList2 (for the PSCell and SCell of NR SCG; a value measured with regard to a predetermined reference signal (for example, NR synchronization signal (CRS)) determined in the NR technology across the entire band, through which the predetermined signal is transmitted)
      ServCellIndex (serving cell index: configured by the base station with regard to each SCell)

measResultSCell: NR measurement result measResultBestNeighCell: NR measurement result (the best measurement result of a neighboring cell having the same frequency with the corresponding SCell)

Then, the UE transmits the generated measurement result to the base station (1e-11).

Thereafter, according to the report content, the base station may determine whether to add a new NR cell to the corresponding UE, to release the existing LTE cell or NR SCell, or to handover the same (that is, move the same to another cell).

Figure 1F:
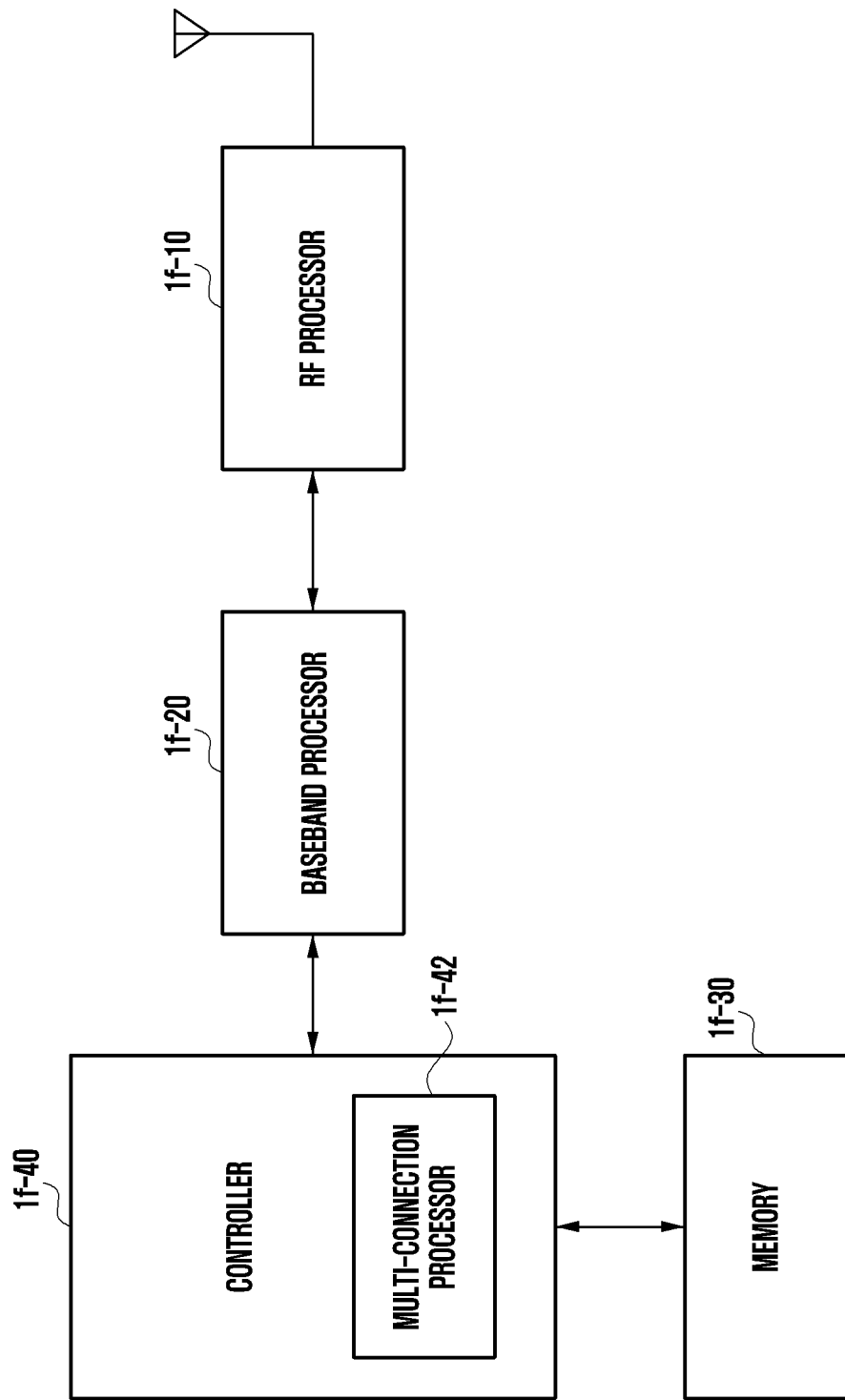
FIG. 1F is a diagram illustrating an exemplary block configuration of a UE according to an embodiment of the disclosure.

FIG. 1F illustrates a block configuration of a UE according to an embodiment of the disclosure.

Referring to FIG. 1F, the UE includes a radio frequency (RF) processor 1f-10, a baseband processor 1f-20, a memory 1f-30, and a controller 1f-40.

The RF processor 1f-10 performs functions for transmitting/receiving signals through a wireless channel, such as signal band conversion, amplification, and the like. Specifically, the RF processor 1f-10 up-converts a baseband signal provided from the baseband processor 1f-20 into an RF band signal, transmits the same through an antenna, and down-converts an RF band signal received through the antenna into a baseband signal. For example, the RF processor 1f-10 may include a transmission filter, a reception filter, an amplifier, a mixer, an oscillator, a digital-to-analog converter (DAC), an analog-to-digital converter (ADC), and the like. Although only one antenna is illustrated in FIG. 1E, the UE may include multiple antennas. In addition, the RF processor 1f-10 may include multiple RF chains. Moreover, the RF processor 1f-10 may perform beamforming. For the sake of the beamforming, the RF processor 1f-10 may adjust the phase and magnitude of signals transmitted/received through multiple antennas or antenna elements.

The baseband processor 1f-20 performs a function of conversion between a baseband signal and a bit string according to the physical layer specification of the system. For example, during data transmission, the baseband processor 1f-20 encodes and modulates a transmission bit string, thereby generating complex symbols. In addition, during data reception, the baseband processor 1f-20 demodulates and decodes a baseband signal provided from the RF processor 1f-10, thereby restoring a reception bit string. For example, when an orthogonal frequency division multiplexing (OFDM) scheme is followed, during data transmission, the baseband processor 1f-20 encodes and modulates a transmission bit string so as to generate complex symbols, maps the complex symbols to subcarriers, and then configures OFDM symbols through an inverse fast Fourier transform (IFFT) operation and cyclic prefix (CP) insertion. In addition, during data reception, the baseband processor 1f-20 divides a baseband signal provided from the RF processor 1f-10 in an OFDM symbol unit, restores signals mapped to subcarriers through a fast Fourier transform (FFT) operation, and then restores the reception bit string through demodulation and decoding.

The baseband processor 1f-20 and the RF processor 1f-10 transmit and receive signals as described above. Accordingly, the baseband processor 1f-20 and the RF processor 1f-10 may be referred to as transmitter, receiver, transceiver, or communication units. In addition, at least one of the baseband processor 1f-20 and the RF processor 1f-10 may include different communication modules in order to process signals in different frequency bands. The different frequency bands may include a super high frequency (SHF) (for example, 2.5 GHz or 5 GHz) band and a millimeter wave (for example, 60 GHz) band.

The memory 1f-30 stores data for operation of the UE, such as a basic program, an application program, and configuration information.

The controller 1f-40 controls the overall operations of the UE. For example, the controller 1f-40 receives/transmits signals through the baseband processor 1f-20 and the RF processor 1f-10. In addition, the controller 1f-40 records and reads data in the memory 1f-40. To this end, the controller 1f-40 may include at least one processor. For example, the controller 1f-40 may include a communication processor (CP) that performs control for communication, and an application processor (AP) that controls the upper layer, such as an application program. According to an embodiment of the disclosure, the controller 1f-40 includes a multi-connection processor 1f-42 that performs processing for operating in a multi-connection mode. For example, the controller 1f-40 may control the UE so as to perform the procedure of operations of the UE illustrated in FIG. 1E.

According to an embodiment of the disclosure, the UE receives a message that instructs measurement from the base station. After receiving the same, the controller performs measurement according to measurement events and conditions configured by the base station and a handover command therefrom. If multiple RATs have been configured, the controller generates a measurement result report message including information regarding the result of measurement regarding each RAT, and transmits the same to the base station.

Methods according to embodiments described in the claims or specifications of the disclosure may be implemented as hardware, software, or a combination of hardware and software.

When the methods are implemented as software, a computer-readable storage medium for storing one or more programs (software modules) may be provided. The one or more programs stored in the computer-readable storage medium is configured for execution by one or more processors within an electronic device. The one or more programs include instructions that cause the electronic device to perform the methods according to embodiments described in the claims or specification of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, the programs may be stored in a memory including a combination of some or all of the same. Further, a plurality of each constituent memory may be included.

In addition, the programs may be stored in an attachable storage device which may access the electronic device through a communication network such as the Internet, Intranet, local area network (LAN), wide LAN (WLAN), or storage area network (SAN), or a communication network including a combination thereof. Such a storage device may access the device that performs embodiments of the disclosure through an external port. Further, a separate storage device on the communication network may access the device that performs embodiments of the disclosure.

In the above-described detailed embodiments of the disclosure, a constituent element included in the disclosure is expressed in the singular or plural form according to a presented specific embodiment. However, the singular or plural expressions are selected to conform to presented situations for convenience of description, and the disclosure is not limited to the singular or plural constituent elements. A constituent element expressed in a plural form may be configured as a singular element, or a constituent element expressed in a singular form may be configured as a plurality of elements.

Although detailed embodiments have been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

Second Embodiment

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification. Terms for identifying access nodes, terms referring to network entities, terms referring to messages, terms referring to interfaces between network entities, and terms referring to various kinds of identification information, used in the following description, are examples for convenience of description. Therefore, the disclosure may not be limited by the terminologies provided below, and other terms that indicate subjects having equivalent technical meanings may be used.

Hereinafter, terms and names defined by the 3rd generation partnership project long term evolution (3GPP LTE), or terms and names modified based thereon will be used in the disclosure for convenience of description. However, the disclosure is not limited to the terms and names, and is identically applicable to other systems following different standards.

Figure 2A:
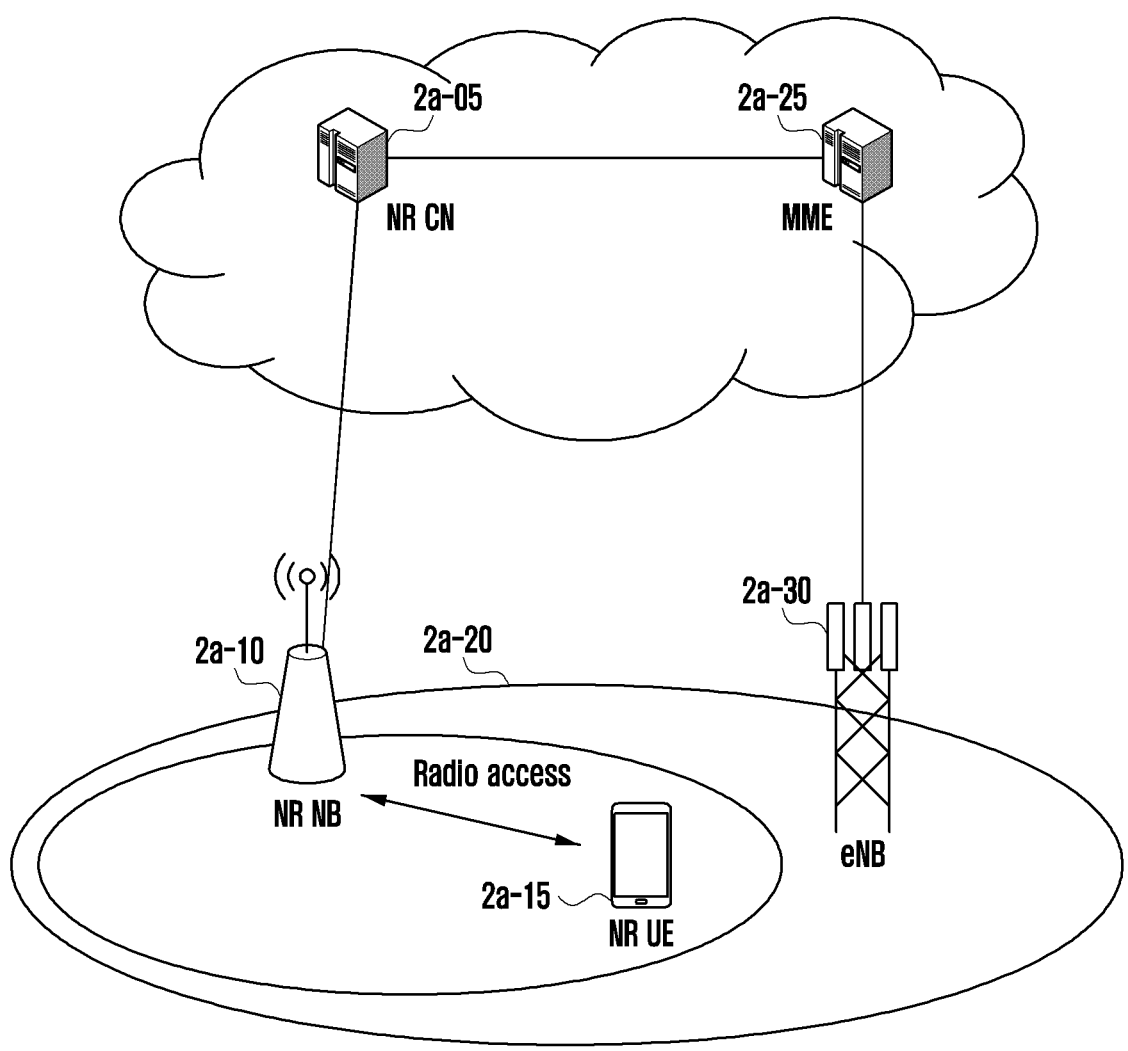
FIG. 2A is a diagram illustrating the structure of a next-generation mobile communication system to which the disclosure is applied.

FIG. 2A is a diagram illustrating the structure of a next-generation mobile communication system to which the disclosure is applied.

Referring to FIG. 2A, the radio access network of the next-generation mobile communication system includes a new radio Node B (hereinafter, referred to as NR gNB or NR base station) 2a-10 and a new radio core network (NR CN) 2a-05, as illustrated. A new radio user equipment (hereinafter, referred to as NR UE or terminal) 2a-15 accesses an external network through the NR gNB 2a-10 and the NR CN 2a-05.

In FIG. 2A, the NR gNB 2a-10 corresponds to an evolved Node B (eNB) of an existing LTE system. The NR gNB 2a-10 is connected to the NR UE 2a-15 through a wireless channel, and is capable of providing a better service than an existing node B. In the next-generation mobile communication system, all user traffics are provided through a shared channel, and there is accordingly a need for a device for aggregating and scheduling status information such as the buffer status of UEs, the available transmission power status, and the channel status, and the same is handled by the NR gNB 2a-10.

A single NR gNB 2a-10 normally controls multiple cells. In order to implement super-high data transmission compared with the LTE, the next-generation mobile communication system may have at least the existing maximum bandwidth, and a beamforming technology may be additionally combined, based on orthogonal frequency division multiplexing (hereinafter, referred to as OFDM) as a radio access technology. In addition, an adaptive modulation & coding (hereinafter, referred to as AMC) scheme is applied, which determines the modulation scheme and the channel coding rate according to the channel status of the UE.

The NR CN 2a-05 performs functions such as mobility support, bearer configuration, and QoS configuration. The NR CN is a device in charge of not only the UE mobility management function, but also various control functions, and is connected to multiple base stations. In addition, the next-generation mobile communication system may interwork with an existing LTE system, and the NR CN is connected to an MME 2a-25 through a network interface. The MME is connected to an eNB 2a-30, which is an existing base station.

Figure 2B:
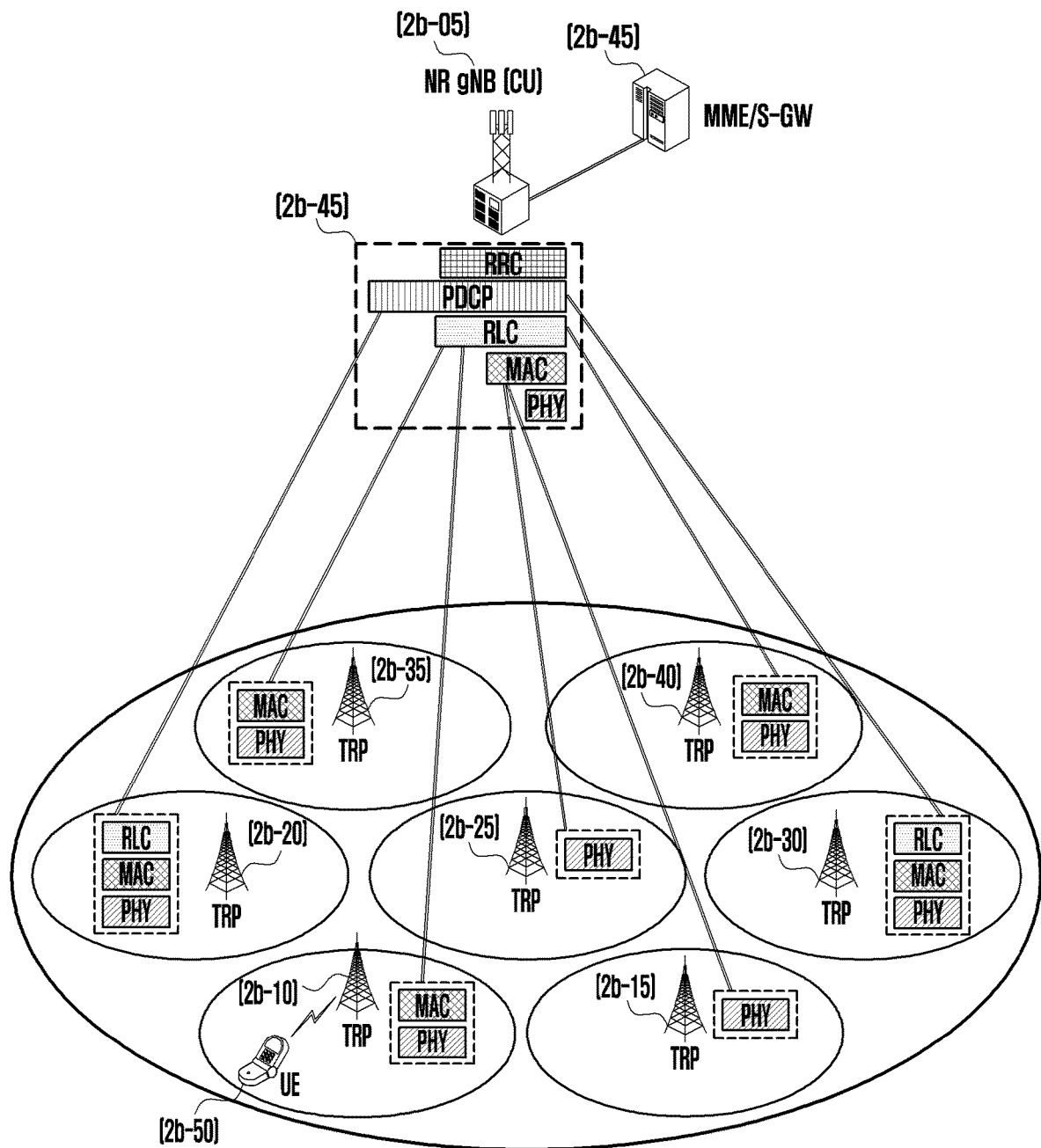
FIG. 2B is a diagram illustrating the structure of another next-generation mobile communication system to which the disclosure may be applied.

FIG. 2B is a diagram illustrating the structure of another next-generation mobile communication system to which the disclosure may be applied.

Referring to FIG. 2B, a cell provided by an NR gNB 2b-05 that operates based on beams may include multiple transmission reception points (TRPs) 2b-10, 2b-15, 2b-20, 2b-25, 2b-30, 2b-35, and 2b-40. The TRPs 2b-10 to 2b-40 refer to blocks configured by separating some functions for transmitting/receiving physical signals from existing LTE eNBs, and include multiple antennas. The NR gNB 2b-05 may be expressed as a central unit (CU), and the TRPs may be expressed as distributed units (DUs).

Functions of the NR gNB 2b-05 and the TRPs may be configured by separating respective layers from such a PDCP/RLC/MAC/PHY layer as 2b-45. That is, the TRPs may perform a function of the corresponding layer only by the PHY layer (2b-15 and 2b-25), the TRPs may perform the function of the corresponding layers only by the PHY layer and the MAC layer (2b-10, 2b-35, and 2b-40), and the TRPs may perform the function of the corresponding layers only by the PHY layer, the MAC layer, and the RLC layer (2b-20 and 2b-30).

Particularly, the TRPs 2b-10 to 2b-40 may use a beamforming technology of transmitting/receiving data by generating narrow beams in multiple directions by using multiple transmitting/receiving antennas. The UE 2b-50 accesses the NR gNB 2b-05 and an external network through the TRPs 2b-10 to 2b-40. In order to provide users with a service, the NR gNB 2b-05 aggregates and schedules status information, such as the buffer status of UEs, the available transmission power status, and channel status, thereby supporting connection between the UEs and a core network (CN).

Figure 2C:
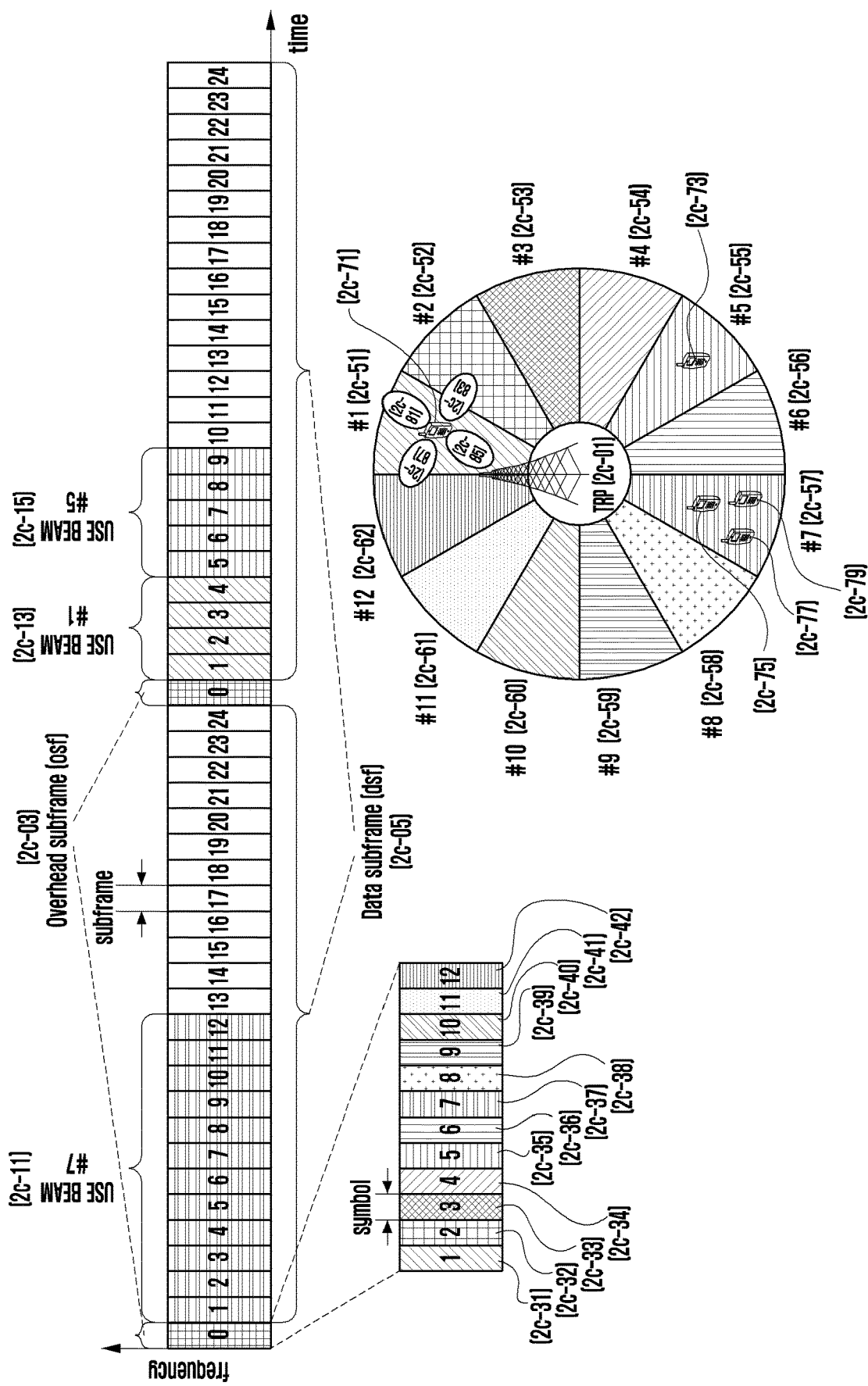
FIG. 2C is a diagram illustrating an example of a frame structure used by an NR system to which the disclosure is applied.

FIG. 2C is a diagram illustrating an example of a frame structure used by an NR system to which the disclosure is applied.

The NR system aims at a higher transmission rate than that of LTE, and considers a scenario wherein the same operates at a high frequency in order to secure a broad frequency bandwidth. Particularly, it is possible to consider a scenario, at a high frequency, wherein a directional beam is generated such that data is transmitted to UEs at a high data transmission rate.

Accordingly, a scenario may be considered wherein, when an NR base station or a TRP 2c-01 communicates with UEs 2c-71, 2c-73, 2c-75, 2c-77, and 2c-79 inside a cell, different beams may be used for communication. That is, this exemplary diagram assumes a scenario wherein the first UE 2c-71 communicates by using beam #1 2c-51, the second UE 2c-73 communicates by using beam #5 2c-55, and the third, fourth, and fifth UEs 2c-75, 2c-77, and 2c-79 communicate through beams #7 2c-57.

In order to measure which beam is used by a UE to communicate with a TRP, an overhead subframe (hereinafter, referred to as osf) 2c-03, through which a common overhead signal is transmitted, exists temporally. The osf includes a primary synchronization signal for acquiring the timing of an OFDM symbol, a secondary synchronization signal (SSS) for detecting a cell ID, an extended synchronization signal (ESS) for acquiring the timing of a subframe, and a beam reference signal (BRS) for identifying a beam.

In addition, a physical broadcast channel (PBCH) including system information, a master information block (MIB), or information necessary for a UE to access a system (for example, the bandwidth of a downlink beam, the system frame number, and the like are contained), may be transmitted.

In addition, in the osf, the base station transmits a reference signal by using different beams with regard to respective symbols (or across multiple symbols). A beam index value for distinguishing respective beams may also be derived from the reference signal. This exemplary diagram assumes that the base station transmits twelve beams including #1 2c-51 to #12 2c-62 and, in the osf, a different beam is swept and transmitted with regard to each symbol. That is, each beam is transmitted with regard to each symbol inside the osf (for example, beam #1 2c-51 is transmitted through the first symbol 2c-31), a UE measures the osf, and it is accordingly possible to determine through which beam transmitted inside the osf the signal is strongest.

This exemplary diagram assumes a scenario wherein the corresponding osf is repeated every 25 subframes, and the remaining 24 subframes are data subframes (hereinafter, referred to a dsf) 2c-05 through which normal data is transmitted/received. Accordingly, a scenario is assumed wherein, according to scheduling of the base station, the third, fourth, and fifth UEs 2c-75, 2c-77, and 2c-79 communicate by commonly using beam #7 (2c-11), the first UE 2c-71 communicates by using beam #1 (2c-13), and the second UE 2c-73 communicates by using beam #5 (2c-15).

Although transmission beams #1 2c-51 to #12 2c-62 of the base station have been mainly illustrated schematically in this exemplary diagram, reception beams of the UE (for example, 2c-81, 2c-83, 2c-85, and 2c-87 of the first UE 2c-71) for receiving the transmission beams of the base station may be additionally considered.

In this exemplary diagram, the first UE has four beams 2c-81, 2c-83, 2c-85, and 2c-87, and performs beam sweeping in order to determine which beam exhibits the best reception performance. In this case, if multiple beams cannot be used simultaneously, the UE may use a single reception beam with regard to each osf such that, by receiving multiple osfs in number to the reception beams, the optical transmission beam of the base station and the reception beam of the UE can be found.

Figure 2D:
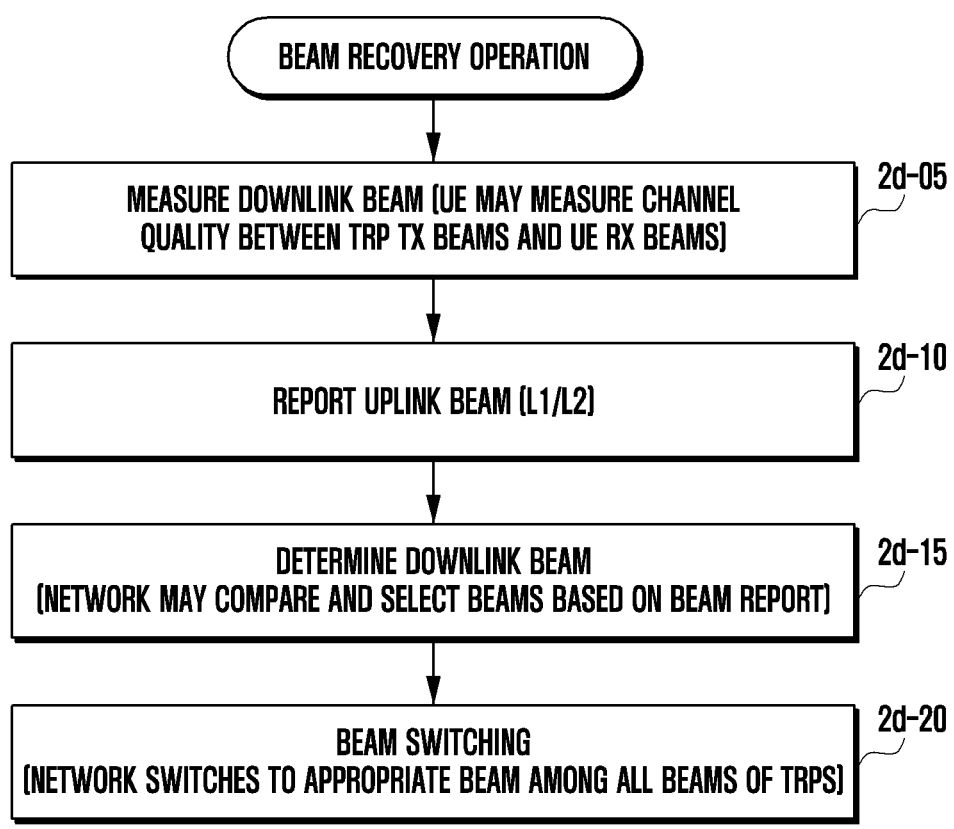
FIG. 2D is a diagram illustrating a beam management procedure in a next-generation mobile communication system to which the disclosure is applied.

FIG. 2D is a diagram illustrating a beam recovery procedure in a next-generation mobile communication system to which the disclosure is applied.

If an RLF occurs between a UE and a network because beam connection is not performed appropriately in the case of a method for mobility and connection controlled by a network in an NR system, a procedure for enabling a new beam connection is necessary, and the procedure may be referred to as a beam recovery. RRC-based mobility management is applicable to an inter-cell handover, and mobility management involving no RRC is performed by a method of determining and selecting an optical transmission/reception beam between an NR UE and NR TRPs. The beam recovery procedure will be described with regard to the following steps:

Initially, in step 2d-05, the NR UE may measure the strength of a downlink transmission beam from adjacent TRPs. In this step, TRP transmission beams may be measured with regard to each reception beam of the NR UE, and a beam sweeping method is used herein. That is, the NR UE uses each reception beam so as to change the reception beam with regard to each osf, and measures transmission beams from the TRP that is swept with regard to each symbol in the corresponding osf. In this regard, downlink transmission beams transmitted from multiple TRPs may be transmitted through different codes or frequency resources, and the NR UE may accordingly distinguish the same.

In step 2d-10, the UE reports one downlink beam measurement value or multiple downlink beam measurement values to the NR gNB. The report may include the list and beam strength of downlink transmission beams that the NR UE can receive through the current reception beam, or may include the list and beam strength of downlink transmission beams that can be received with regard to each of the entire reception beam.

In step 2d-15, the NR gNB determines a downlink beam. In this step, the NR gNB compares measurement value report results received from the NR UE, and selects a beam to be used for actual downlink transmission.

In step 2d-20, the NR gNB switches to the most appropriate beam (beam determined in the above step) among all TRPs, and transmits a signal to the NR UE through the corresponding beam.

Figure 2E:
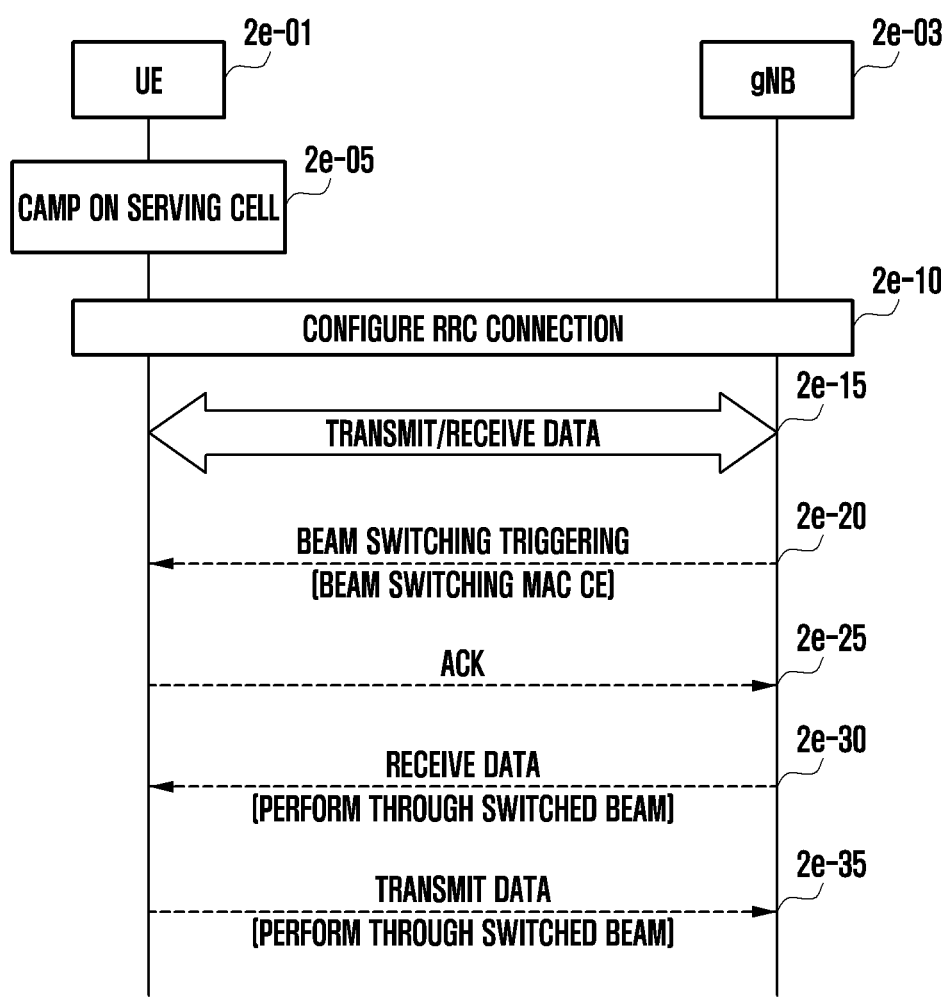
FIG. 2E is a diagram illustrating the entire operation if network triggering beam switching through a MAC CE applied to the disclosure is successfully performed.

FIG. 2E is a diagram illustrating the entire operation if network triggering beam switching through a MAC CE applied to the disclosure is successfully performed.

A UE 2e-01 in an idle mode (RRC_IDLE) finds an appropriate cell and camps on the corresponding base station 2c-03 (2e-05), and then accesses the base station 2e-03 for a reason such as occurrence of data to be transmitted (2e-10). In the idle mode, the UE is not connected to a network, for the purpose of saving power consumed by the UE, for example, and thus cannot transmit data. A transition to a connected mode (RRC_CONNECTED) is necessary to transmit data. In addition, the term "camping" means that the UE stays in the corresponding cell and is receiving a paging message in order to determine whether or not data is coming through the downlink. If the UE succeeds in a procedure of accessing the base station 2e-3, the status of the UE changes to a connected mode (RRC_CONNECTED). In the connected mode, the UE can transmit/receive data with the base station (2e-15).

Thereafter, if a predetermined specific situation occurs to the base station, that is, if there is a need to explicitly instruct the UE to conduct beam switching to a specific beam, the base station causes the UE to trigger beam switching through a MAC CE (2e-20). If the UE is to receive the MAC CE, the UE delivers information regarding whether or not the MAC CE is received to the base station through an ACK or NACK (2e-25). If the UE transmits an ACK, and if the base station successfully receives the same, the UE changes the downlink reception beam according to beam switching information received through the MAC CE, and receives data delivered from the base station (2e-30). Then, uplink data transmission is conducted after a change to a beam configured by the MAC CE (2e-35).

Figure 2F:
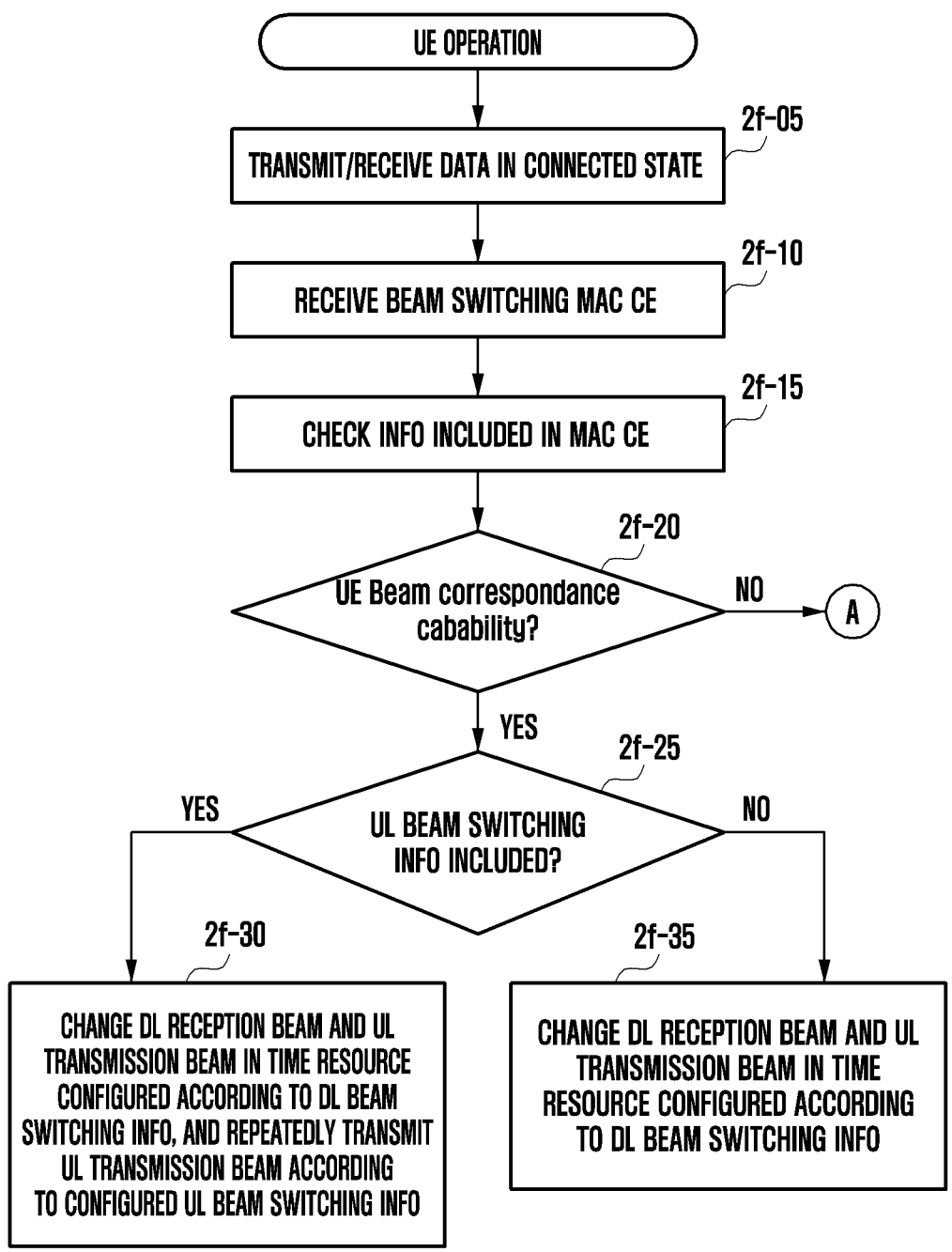
FIG. 2FA and FIG. 2FB are diagrams illustrating UE operations if network triggering beam switching through a MAC CE proposed in the disclosure has been successfully performed.
Figure 2F:
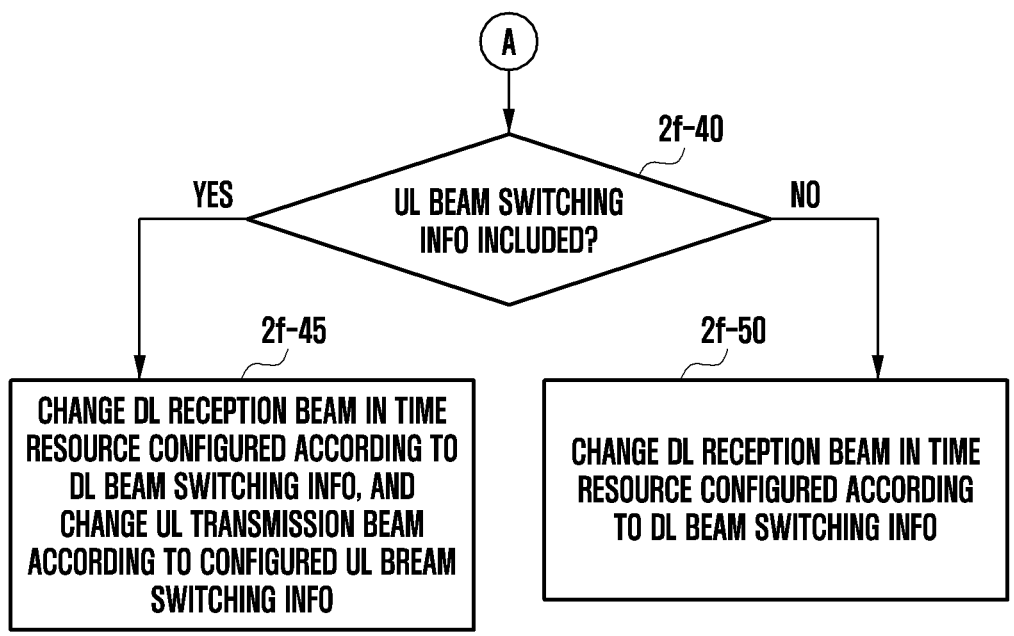

The above-mentioned network triggering beam switching MAC CE includes the following information:
- DL beam switch info: DL link reception beam index, information regarding a time at which beam switching occurs (which can be explicitly designated, for example, to come after k subframes or after k ms; the corresponding information can be preconfigured through RRC signaling)
- UL beam sweeping info: UL beam alignment type (repeated transmission, beam sweeping), UL transmission beam transmission time resource (which can be explicitly designated, for example, to come after x subframes or after x ms; the corresponding information can be preconfigured through RRC signaling), transmission time, and the like FIG. 2FA and FIG. 2FB are diagrams illustrating UE operations if network triggering beam switching through a MAC CE proposed in the disclosure has been successfully performed.

A UE in an RRC-connected state transmits/receives data from a network (2f-05). If the network transmits a MAC CE related to network triggering beam switching under a specific condition, the UE receives the same (2f-10). If the MAC CE has been successfully received in the above process, the UE checks information related to network triggering beam switching included in the MAC CE (2f-15).

According to whether or not the UE has a beam correspondence capability, uplink beam switching may also be necessary during downlink beam switching, or may not be necessary (2f-20). The beam correspondence capability refers to a capability of the UE to automatically configure an appropriate uplink transmission beam according to a received downlink reception beam configuration.

If the UE has the beam correspondence capability, the UE performs a beam switching first operation and a beam switching second operation according to whether or not a network triggering beam switching MAC CE received from the base station includes uplink beam switching information (2f-25).

According to the beam switching first operation of the UE, the UE changes the DL reception beam and the UL transmission beam in a time resource (n+k, wherein n is a MAC CE receiving point) configured according to DL beam switching info, and repeatedly transmits the UL transmission beam according to the configured UL beam switching info (2f-30). In this case, the beam alignment type of the UL beam switching info received by the UE is configured as repeated transmission, and the UE can automatically change the UL transmission beam according to the capability. In addition, the UE repeatedly transmits the UL transmission beam in the n+x time resource such that the base station can determine the UL reception beam.

According to the beam switching second operation of the UE, the UE changes the DL reception beam and the UL transmission beam in the time resource configured according to DL beam switching info (2f-35). Since the beam switching second operation is performed when the UL beam switching information is not included, no related operation is performed.

If the UE does not have the beam correspondence capability, the UE performs a beam switching third operation and a beam switching fourth operation according to whether or not the network triggering beam switching MAC CE received from the base station includes UL beam switching info (2f-40).

According to the beam switching third operation of the UE, the UE changes the DL reception beam in a time resource (n+k, wherein n is a MAC CE receiving point) configured according to DL beam switching info, and performs a UL transmission beam sweeping operation according to the configured UL beam switching info (2f-45). In this case, the beam alignment type of the UL beam switching info received by the UE is configured as beam sweeping, and the UE cannot automatically change the UL transmission beam according to the capability. That is, the UE may sweep the UL transmission beam in a n+y time resource according to the configured beam seeping configuration, and may receive an UL transmission beam indicator from the base station in a time resource n+y+a (wherein y and a values may be predetermined values, or may be included in the UL beam sweeping info of the MAC CE).

According to the beam switching fourth operation of the UE, the UE changes the DL reception beam in a time resource (n+k, wherein n is a MAC CE reception point) configured according to DL beam sweeping info. Since the beam switching fourth operation is performed when the UL beam switching info is not included, no related operation is performed.

Table 1 below is a summary of the above process.

TABLE 1

| DL beam switch info | UL beam sweeping info | UE beam correspondence capability | Corresponding operation |
| --- | --- | --- | --- |
| Yes | No | Yes | Change DL Rx beam, UL Tx beam in n + k |
| Yes | No | No | Change DL Rx beam in n + k |
| Yes | Y (UL beam alignment type = repeated transmission, UL beam transmission resource, transmission recovery) | Yes | Change DL Rx beam and UL Tx beam in n + k Repeatedly transmit UL Tx beam in n + k (such that base station can determine UL Rx beam) |
| Yes | Y (UL beam alignment type = beam sweeping, UL beam transmission resource, transmission recovery) | No | Change DL Rx beam in n + k Sweep UL Tx beam in n + y Receive UL Tx beam in n + y + a Change UL Tx beam in n + y + k |

Figure 2G:
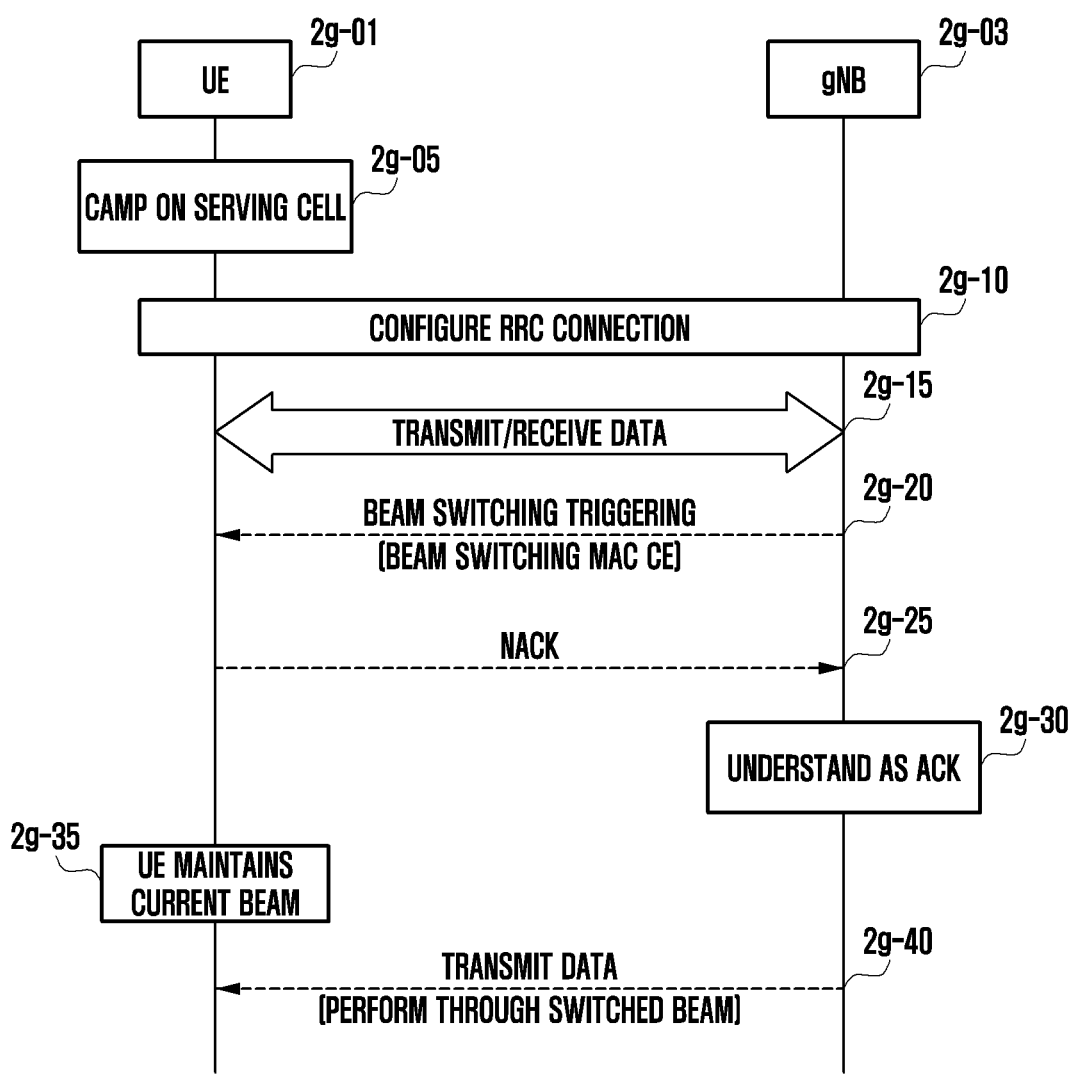
FIG. 2G is a diagram illustrating all operations of a first embodiment in which network triggering beam switching through a MAC CE applied to the disclosure is not performed appropriately.

FIG. 2G is a diagram illustrating all operations of a first embodiment in which network triggering beam switching through a MAC CE applied to the disclosure is not performed appropriately.

A UE 2g-01 in an idle mode (RRC_IDLE) finds an appropriate cell and camps on the corresponding base station 2g-03 (2g-05), and then accesses the base station 2g-03 for a reason such as occurrence of data to be transmitted (2g-10). In the idle mode, the UE is not connected to a network, for the purpose of saving power consumed by the UE, for example, and thus cannot transmit data. A transition to a connected mode (RRC_CONNECTED) is necessary to transmit data. In addition, the term "camping" means that the UE stays in the corresponding cell and is receiving a paging message in order to determine whether or not data is coming through the downlink.

If the UE succeeds in a procedure of accessing the base station 2g-03, the status of the UE changes to a connected mode (RRC_CONNECTED). In the connected mode, the UE can transmit/receive data with the base station (2g-15).

Thereafter, if a predetermined specific situation occurs to the base station, that is, if there is a need to explicitly instruct the UE to conduct beam switching to a specific beam, the base station causes the UE to trigger beam switching through a MAC CE (2g-20). If the UE fails to receive the MAC CE, the UE delivers a NACK indicating whether or not the same has been received to the base station (2g-25).

If the UE transmits a NACK, and if the base station determines that the same is an ACK (2g-30), the UE maintains the current beam (2g-35) (that is, does not switch to the beam designated by the MAC CE), and receives data delivered from the base station (2g-40). Such a situation as described above is defined as first mismatch occurrence.

If the first mismatch (UE old beam, base station new beam) occurs, the UE is likely to experience an RLF. Alternatively, the UE may again report the problem of the current beam to the base station through a random access process. In addition, if the UE is supposed to experience the RLF after beam switching, the UE and the base station may perform a beam recovery operation. The beam recovery operation follows what has been described with reference to FIG. 2D.

Figure 2H:
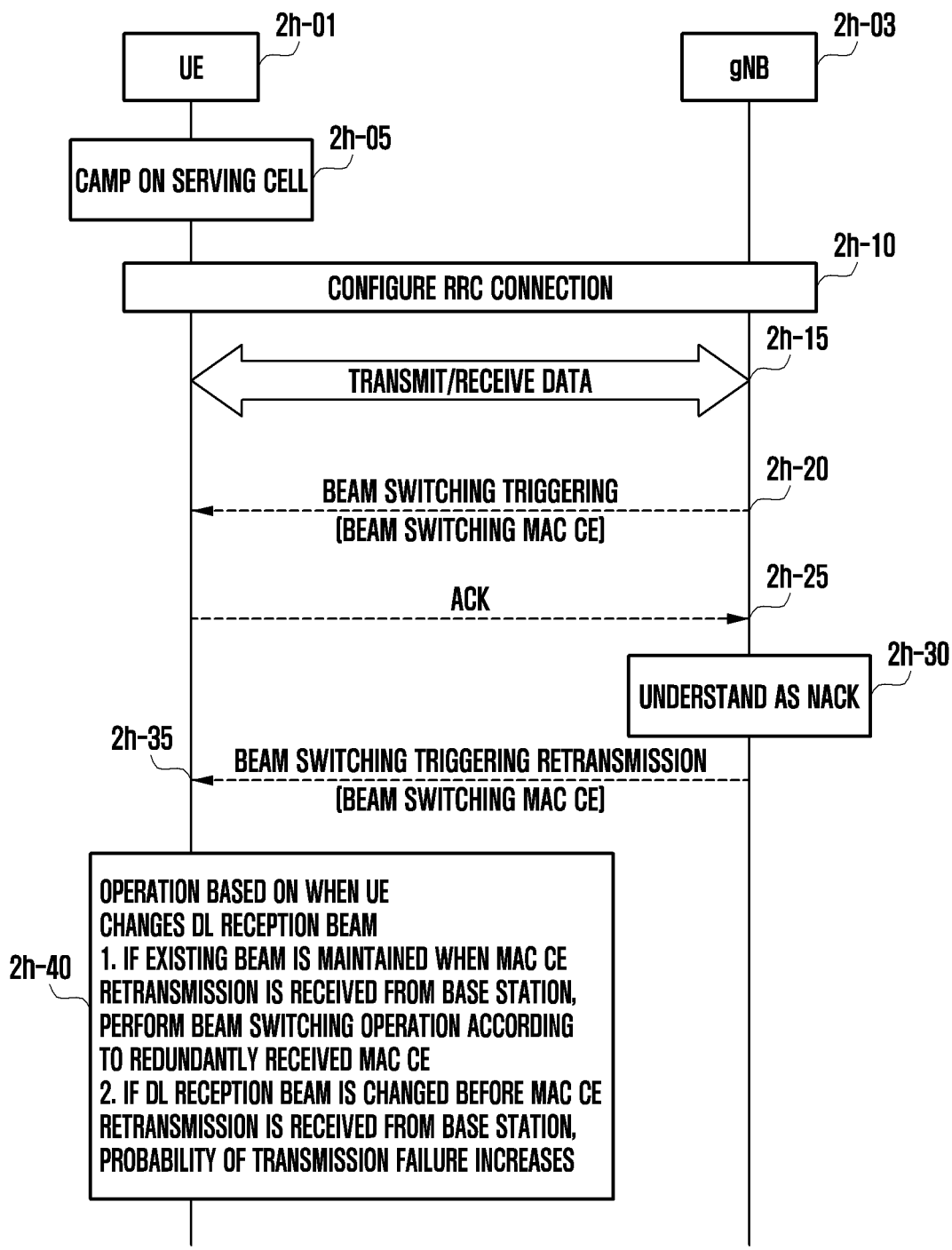
FIG. 2H is a diagram illustrating all operations of a second embodiment in which network triggering beam switching through a MAC CE applied to the disclosure is not performed appropriately.

The above-mentioned network triggering beam switching MAC CE includes the following information:
 DL beam switch info: DL link reception beam index, information regarding a time at which beam switching occurs (which can be explicitly designated, for example, to come after k subframes or after k ms; the corresponding information can be preconfigured through RRC signaling)
 UL beam sweeping info: UL beam alignment type (repeated transmission, beam sweeping), UL transmission beam transmission time resource (which can be explicitly designated, for example, to come after x subframes or after x ms; the corresponding information can be preconfigured through RRC signaling), transmission time, and the like FIG. 2H is a diagram illustrating all operations of a second embodiment in which network triggering beam switching through a MAC CE applied to the disclosure is not performed appropriately.

A UE 2h-01 in an idle mode (RRC_IDLE) finds an appropriate cell and camps on the corresponding base station 2h-03 (2h-05), and then accesses the base station 2h-03 for a reason such as occurrence of data to be transmitted (2h-10). In the idle mode, the UE is not connected to a network, for the purpose of saving power consumed by the UE, for example, and thus cannot transmit data. A transition to a connected mode (RRC_CONNECTED) is necessary to transmit data. In addition, the term "camping" means that the UE stays in the corresponding cell and is receiving a paging message in order to determine whether or not data is coming through the downlink. If the UE succeeds in a procedure of accessing the base station 2h-3, the status of the UE changes to a connected mode (RRC_CONNECTED). In the connected mode, the UE can transmit/receive data with the base station (2h-15).

Thereafter, if a predetermined specific situation occurs to the base station, that is, if there is a need to explicitly instruct the UE to conduct beam switching to a specific beam, the base station causes the UE to trigger beam switching through a MAC CE (2h-20). If the UE successfully receives the MAC CE, the UE delivers an ACK or a NACK indicating whether or not the same has been received to the base station (2h-25).

If the UE transmits an ACK, and if the base station determines that the same is a NACK (2h-30), the base station will retransmit the corresponding MAC CE (2h-35), and the following operation of the UE will vary based on when the beam switching operation will be performed.

If the MAC CE is retransmitted from the base station before performing beam switching, the UE will receive the same redundantly. Redundant reception itself is not a serious problem, and the UE has only to consider the most recently received switching command. However, if the retransmission by the base station is too late, in other words, if the base station retransmits the MAC CE after the UE has already performed beam switching, the base station may be informed, with reference to a retransmission failure, that a problem has occurred (2h-40). Such a situation as described above is defined as second mismatch occurrence.

If the second mismatch (UE new beam, base station old beam) occurs, the UE is likely to fail to receive scheduling for a considerable period of time. Alternatively, the base station may determine that the UE has suddenly disappeared. In addition, if the UE fails to receive scheduling for a predetermined period of time after beam switching, the UE and the base station may perform a beam recovery operation. The beam recovery operation follows what has been described with reference to FIG. 2D.

Figure 2I:
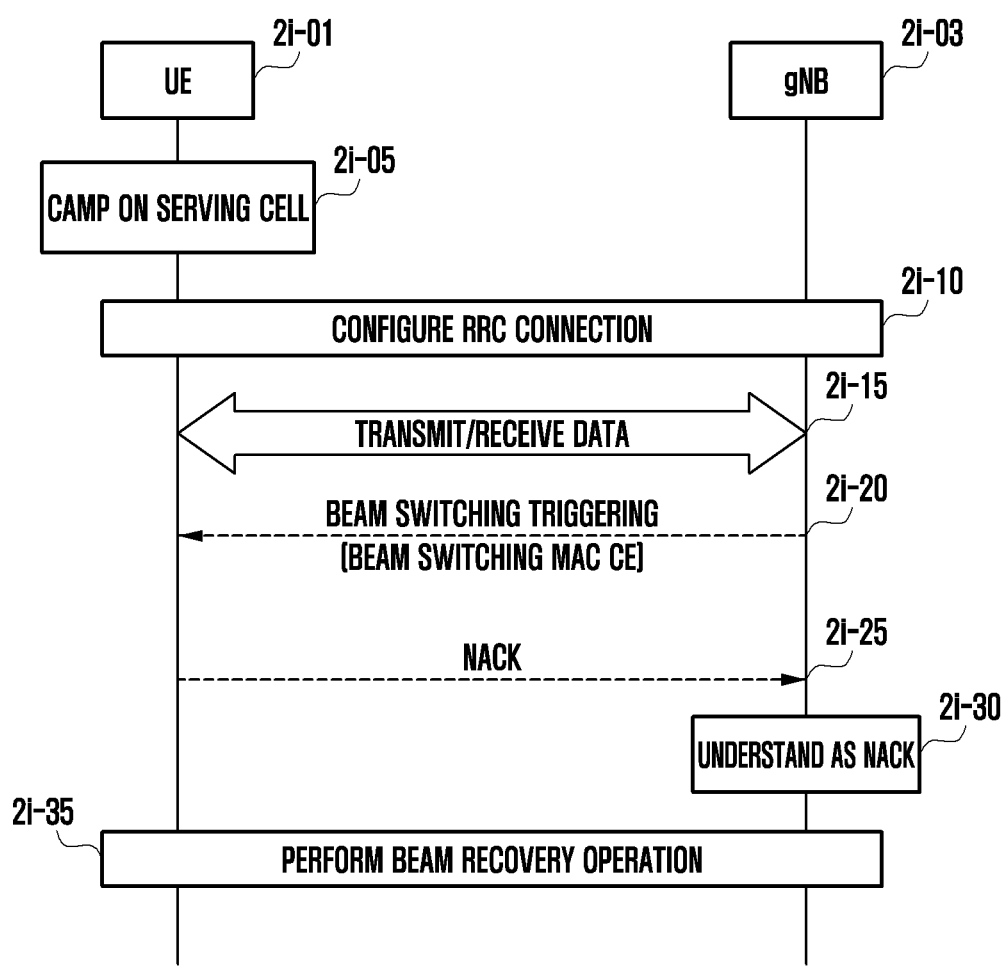
FIG. 2I is a diagram illustrating all operations of a third embodiment in which network triggering beam switching through a MAC CE applied to the disclosure is not performed appropriately.

The above-mentioned network triggering beam switching MAC CE includes the following information:
 DL beam switch info: DL link reception beam index, information regarding a time at which beam switching occurs (which can be explicitly designated, for example, to come after k subframes or after k ms; the corresponding information can be preconfigured through RRC signaling)
 UL beam sweeping info: UL beam alignment type (repeated transmission, beam sweeping), UL transmission beam transmission time resource (which can be explicitly designated, for example, to come after x subframes or after x ms; the corresponding information can be preconfigured through RRC signaling), transmission time, and the like FIG. 2I is a diagram illustrating all operations of a third embodiment in which network triggering beam switching through a MAC CE applied to the disclosure is not performed appropriately.

A UE 2i-01 in an idle mode (RRC_IDLE) finds an appropriate cell and camps on the corresponding base station 2i-03 (2i-05), and then accesses the base station 2i-03 for a reason such as occurrence of data to be transmitted (2i-10). In the idle mode, the UE is not connected to a network, for the purpose of saving power consumed by the UE, for example, and thus cannot transmit data. A transition to a connected mode (RRC_CONNECTED) is necessary to transmit data. In addition, the term "camping" means that the UE stays in the corresponding cell and is receiving a paging message in order to determine whether or not data is coming through the downlink. If the UE succeeds in a procedure of accessing the base station 2i-03, the status of the UE changes to a connected mode (RRC_CONNECTED). In the connected mode, the UE can transmit/receive data with the base station (2i-15).

Thereafter, if a predetermined specific situation occurs to the base station, that is, if there is a need to explicitly instruct the UE to conduct beam switching to a specific beam, the base station causes the UE to trigger beam switching through a MAC CE (2*i*-20). If the UE fails to receive the MAC CE, the UE delivers a NACK indicating whether or not the same has been received to the base station (2*i*-25). If the UE transmits a NACK, and if the base station determines that the same is a NACK (2*i*-30), the UE and the base station may perform a beam recovery operation (2*i*-35). The beam recovery operation follows what has been described with reference to FIG. 2D.

The above-mentioned network triggering beam switching MAC CE includes the following information:

DL beam switch info: DL link reception beam index, information regarding a time at which beam switching occurs (which can be explicitly designated, for example, to come after k subframes or after k ms; the corresponding information can be preconfigured through RRC signaling)

UL beam sweeping info: UL beam alignment type (repeated transmission, beam sweeping), UL transmission beam transmission time resource (which can be explicitly designated, for example, to come after x subframes or after x ms; the corresponding information can be preconfigured through RRC signaling), transmission time, and the like The following table enumerates all cases according to whether or not the network triggering switching operation through the MAC CE is successful, and provides a summary of an additional operation in each case.

TABLE 2

|  | NW switch | NW does not switch |
|---|---|---|
| UE switch | Case in which MAC CE is successfully transmitted | UE sent ACK, but base station regards same as NACK (second mismatch occurrence) Base station will retransmit, and UE will redundantly receive. Redundant reception itself is no big problem. UE has only to consider most recently received switching command. If retransmission of base station is too late, that is, if transmission is made after UE has already switched, base station will know from retransmission failure that problem occurred. |
| UE does not switch | UE sent NACK, but base station misunderstands same as ACK (first mismatch occurrence) UE maintains current beam, but base station moves to new beam. Since current beam situation gradually degrades, UE is likely to announce failure | MAC CE transmission finally fails Recovery procedure needs to be initiated |

Figure 2J:
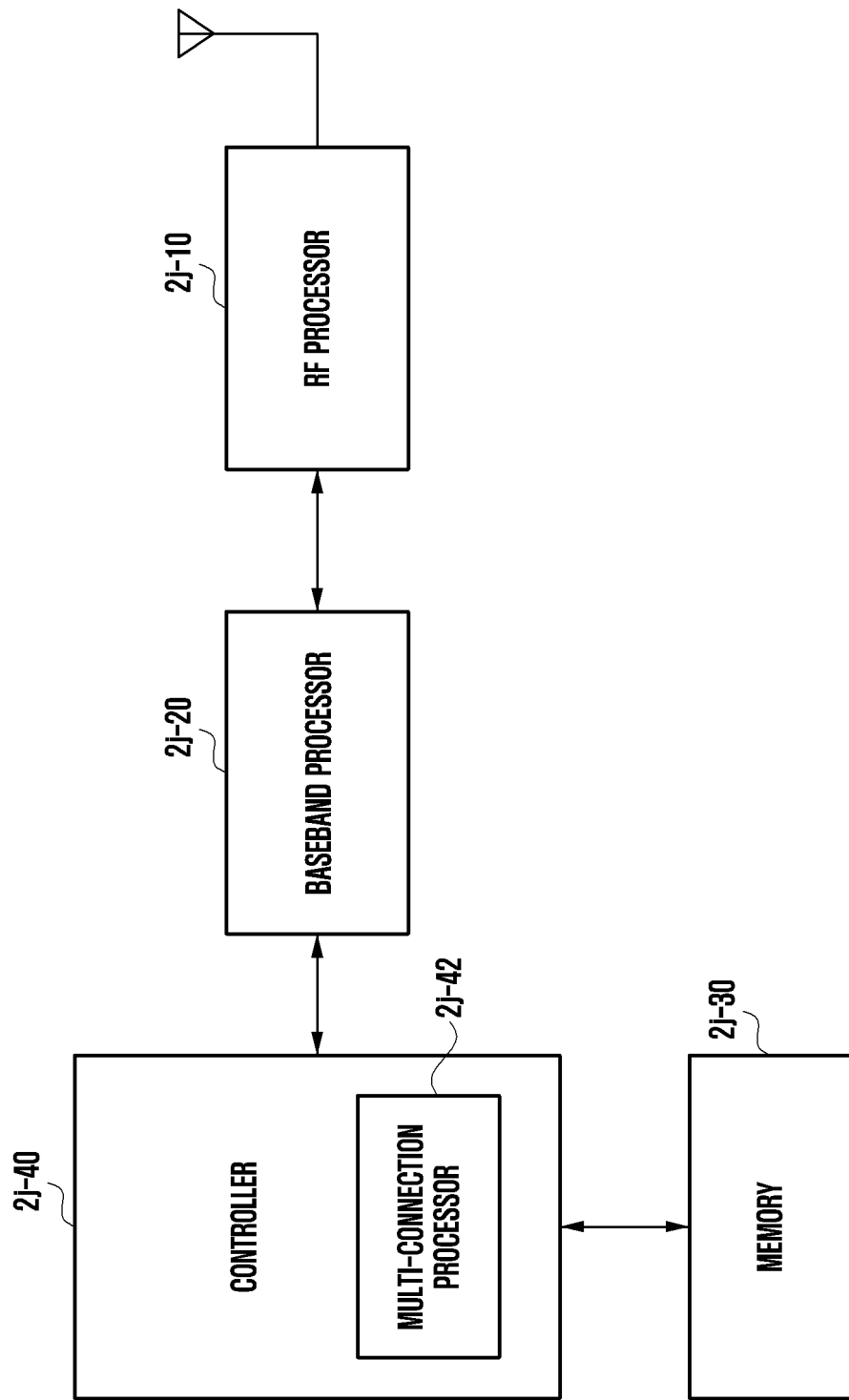
FIG. 2J is a block diagram illustrating the internal structure of a UE to which the disclosure is applied.

FIG. 2J is a block diagram illustrating the internal structure of a UE to which the disclosure is applied.

Referring to the diagram, the UE includes a radio frequency (RF) processor 2*j*-10, a baseband processor 2*j*-20, a memory 2*j*-30, and a controller 2*j*-40.

The RF processor 2*j*-10 performs functions for transmitting/receiving signals through a wireless channel, such as signal band conversion, amplification, and the like. Specifically, the RF processor 2*j*-10 up-converts a baseband signal provided from the baseband processor 1*f*-20 into an RF band signal, transmits the same through an antenna, and down-converts an RF band signal received through the antenna into a baseband signal. For example, the RF processor 2*j*-10 may include a transmission filter, a reception filter, an amplifier, a mixer, an oscillator, a digital-to-analog converter (DAC), an analog-to-digital converter (ADC), and the like. Although only one antenna is illustrated in the diagram, the UE may include multiple antennas. In addition, the RF processor 2*j*-10 may include multiple RF chains. Moreover, the RF processor 2*j*-10 may perform beamforming. For the sake of the beamforming, the RF processor 2*j*-10 may adjust the phase and magnitude of signals transmitted/received through multiple antennas or antenna elements. In addition, the RF processor may perform MIMO, and may receive multiple layers when performing the MIMO operation.

The baseband processor 2*j*-20 performs a function of conversion between a baseband signal and a bit string according to the physical layer specification of the system. For example, during data transmission, the baseband processor 2*j*-20 encodes and modulates a transmission bit string, thereby generating complex symbols. In addition, during data reception, the baseband processor 2*j*-20 demodulates and decodes a baseband signal provided from the RF processor 2*j*-10, thereby restoring a reception bit string. For example, when an orthogonal frequency division multiplexing (OFDM) scheme is followed, during data transmission, the baseband processor 2*j*-20 encodes and modulates a transmission bit string so as to generate complex symbols, maps the complex symbols to subcarriers, and then configures OFDM symbols through an inverse fast Fourier transform (IFFT) operation and cyclic prefix (CP) insertion. In addition, during data reception, the baseband processor 2*j*-20 divides a baseband signal provided from the RF processor 2*j*-10 in an OFDM symbol unit, restores signals mapped to subcarriers through a fast Fourier transform (FFT) operation, and then restores the reception bit string through demodulation and decoding.

The baseband processor 2*j*-20 and the RF processor 2*j*-10 transmit and receive signals as described above. Accordingly, the baseband processor 2*j*-20 and the RF processor 2*j*-10 may be referred to as transmitter, receiver, transceiver, or communication units. In addition, at least one of the baseband processor 2*j*-20 and the RF processor 2*j*-10 may include multiple communication modules in order to support multiple different radio access technologies. Furthermore, at least one of the baseband processor 2*j*-20 and the RF processor 2*j*-10 may include different communication modules in order to process signals in different frequency bands. For example, the different radio access technologies may include a wireless LAN (for example, IEEE 802.11), a cellular network (for example, LTE), and the like. In addition, the different frequency bands may include a super high frequency (SHF) (for example, 2.NRHz, NRhz) band and a millimeter wave (for example, 60 GHz) band.

The memory 2*j*-30 stores data for operation of the UE, such as a basic program, an application program, and configuration information. Particularly, the memory 2*j*-30 may store information regarding a second access node that performs wireless communication by using a second radio access technology. In addition, the memory 2*j*-30 provides stored data at a request of the controller 2*j*-40.

The controller 2*j*-40 controls the overall operations of the UE. For example, the controller 2*j*-40 receives/transmits signals through the baseband processor 2*j*-20 and the RF processor 2*j*-10. In addition, the controller 2*j*-40 records and reads data in the memory 2*j*-40. To this end, the controller 2*j*-40 may include at least one processor. For example, the controller 2*j*-40 may include a communication processor (CP) that performs control for communication, and an application processor (AP) that controls the upper layer, such as an application program.

Figure 2K:
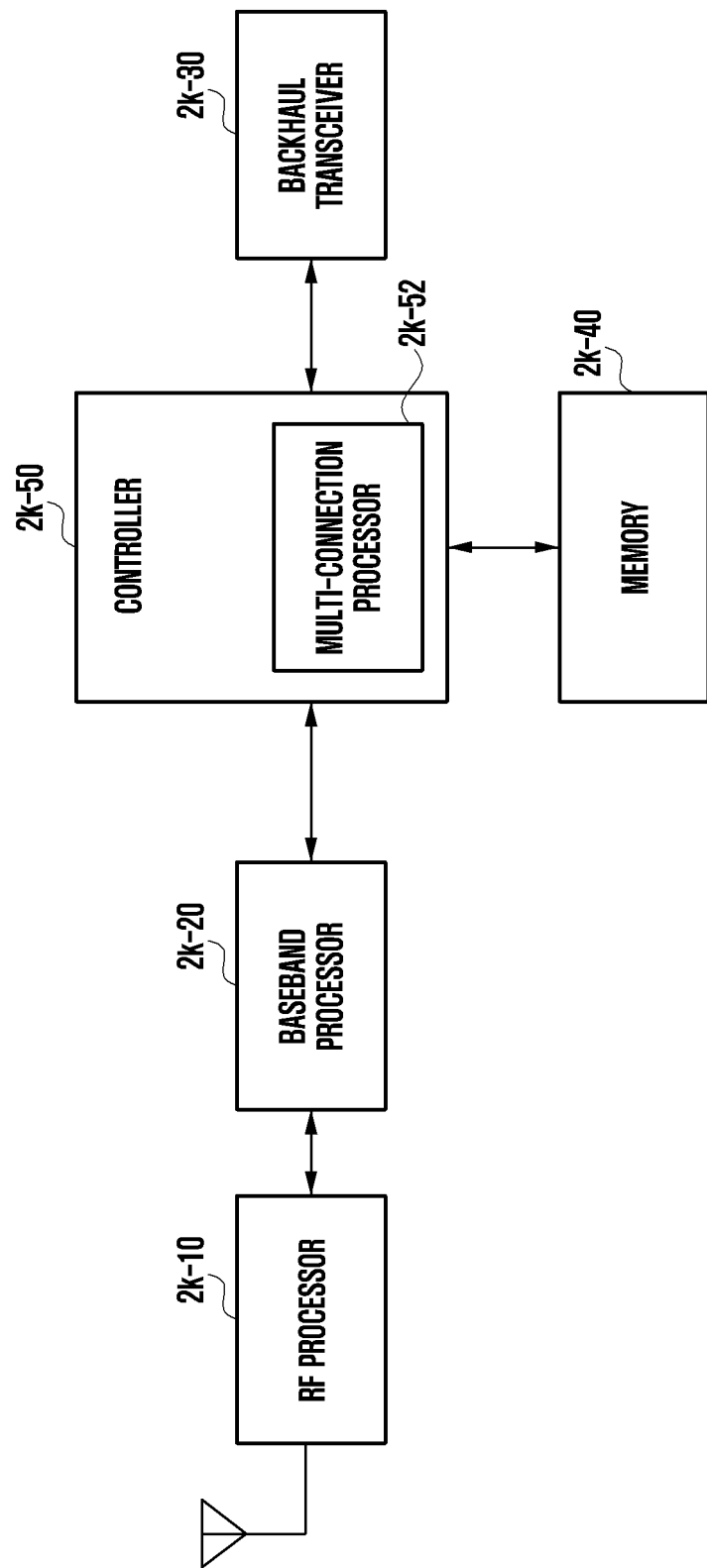
FIG. 2K is a block diagram illustrating the configuration of an NR base station according to the disclosure.

FIG. 2K is a block diagram illustrating the configuration of an NR base station according to the disclosure.

As illustrated in the diagram, the base station includes an RF processor 2*k*-10, a baseband processor 2*k*-20, a backhaul transceiver 2*k*-30, a memory 2*k*-40, and a controller 2*k*-50.

The RF processor 2*k*-10 performs functions for transmitting/receiving signals through a wireless channel, such as signal band conversion, amplification, and the like. Specifically, the RF processor 2*k*-10 up-converts a baseband signal provided from the baseband processor 2*k*-20 into an RF band signal, transmits the same through an antenna, and down-converts an RF band signal received through the antenna into a baseband signal. For example, the RF processor 2*k*-10 may include a transmission filter, a reception filter, an amplifier, a mixer, an oscillator, a DAC, an ADC, and the like. Although only one antenna is illustrated in the diagram, the first access node may include multiple antennas. In addition, the RF processor 2*k*-10 may include multiple RF chains. Moreover, the RF processor 2*k*-10 may perform beamforming. For the sake of the beamforming, the RF processor 2*k*-10 may adjust the phase and magnitude of signals transmitted/received through multiple antennas or antenna elements. The RF processor may perform a downlink MIMO operation by transmitting at least one layer.

The baseband processor 2*k*-20 performs a function of conversion between a baseband signal and a bit string according to the physical layer specification of the first radio access technology. For example, during data transmission, the baseband processor 2*k*-20 encodes and modulates a transmission bit string, thereby generating complex symbols. In addition, during data reception, the baseband processor 2*k*-20 demodulates and decodes a baseband signal provided from the RF processor 2*k*-10, thereby restoring a reception bit string. For example, when an OFDM scheme is followed, during data transmission, the baseband processor 2*k*-20 encodes and modulates a transmission bit string so as to generate complex symbols, maps the complex symbols to subcarriers, and then configures OFDM symbols through an IFFT operation and CP insertion. In addition, during data reception, the baseband processor 2*k*-20 divides a baseband signal provided from the RF processor 2*k*-10 in an OFDM symbol unit, restores signals mapped to subcarriers through a fast Fourier transform (FFT) operation, and then restores the reception bit string through demodulation and decoding. The baseband processor 2*k*-20 and the RF processor 2*k*-10 transmit and receive signals as described above. Accordingly, the baseband processor 2*k*-20 and the RF processor 2*k*-10 may be referred to as transmitter, receiver, transceiver, communication units, or wireless communication units.

The backhaul transceiver 2*k*-30 provides an interface for communicating with other nodes inside the network. That is, the backhaul transceiver 2*k*-30 converts a bit string transmitted from the main base station to another node, for example, an auxiliary base station or a core network, into a physical signal, and converts a physical signal received from the other node into a bit string.

The memory 2*k*-40 stores data for operation of the main base station, such as a basic program, an application program, and configuration information. Particularly, the memory 2*k*-40 may store information regarding a bearer allocated to an accessed UE, a measurement result reported from the accessed UE, and the like. In addition, the memory 2*k*-40 may store information serving as a criterion to determine whether to provide the UE with multi-connection or to discontinue the same. In addition, the memory 2*k*-40 provides stored data at a request of the controller 2*k*-50.

The controller 2*k*-50 controls the overall operations of the main base station. For example, the controller 2*k*-50 receives/transmits signals through the baseband processor 2*k*-20 and the RF processor 2*k*-10, or through the backhaul transceiver 2*k*-30. In addition, the controller 2*k*-50 records and reads data in the memory 2*k*-40. To this end, the controller 2*k*-50 may include at least one processor.

Third Embodiment

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Terms for identifying access nodes, terms referring to network entities, terms referring to messages, terms referring to interfaces between network entities, and terms referring to various kinds of identification information, used in the following description, are examples for convenience of description. Therefore, the disclosure may not be limited by the terminologies provided below, and other terms that indicate subjects having equivalent technical meanings may be used.

Hereinafter, terms and names defined by the 3rd generation partnership project long term evolution (3GPP LTE) will be used in the disclosure for convenience of description. However, the disclosure is not limited to the terms and names, and is identically applicable to other systems following different standards. In the disclosure, an eNB may be used interchangeably with a gNB for convenience of description. That is, a base station described as an eNB may refer to a gNB.

Figure 3A:
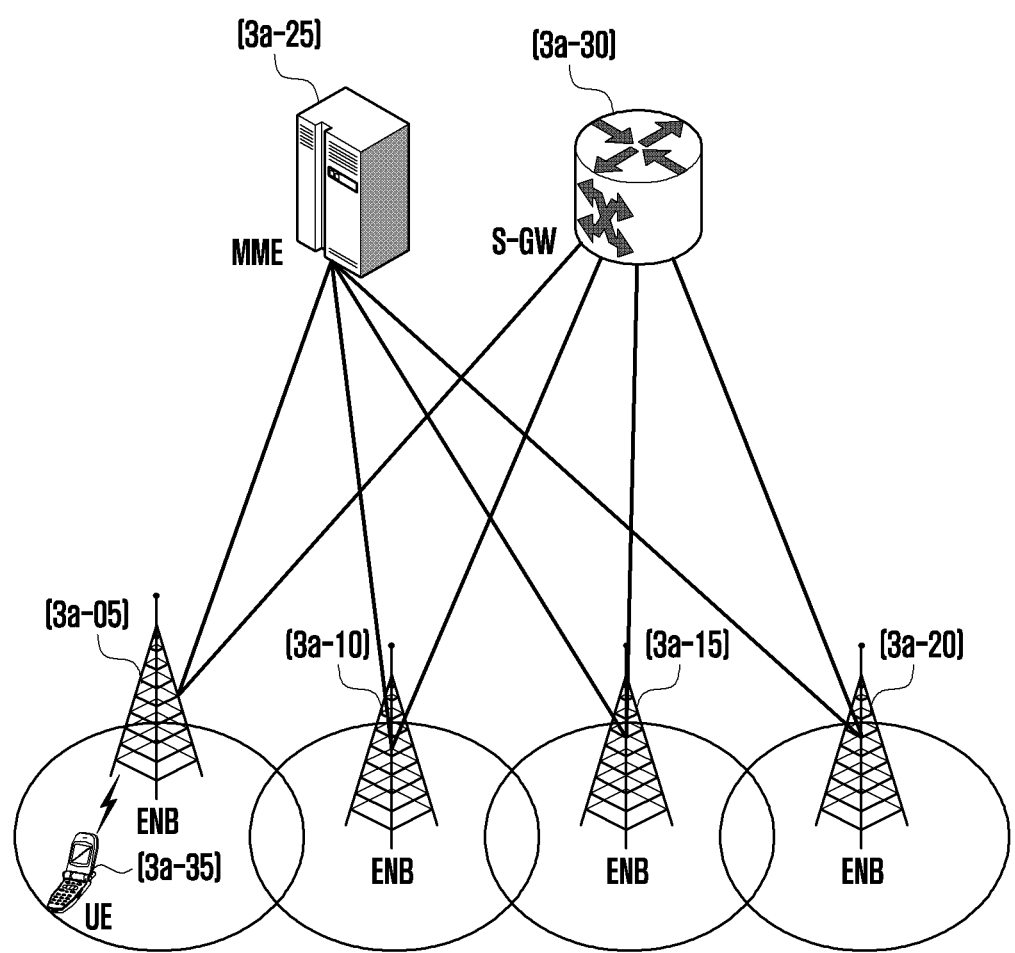
FIG. 3A is a diagram illustrating the structure of an LTE system to which the disclosure may be applied.

FIG. 3A is a diagram illustrating the structure of an LTE system to which the disclosure can be applied.

Referring to FIG. 3A, the radio access network of the LTE system includes evolved nodes B (hereinafter, referred to as ENBs, Nodes B, or base stations) 3*a*-05, 3*a*-10, 3*a*-15, and 3*a*-20, an MME 3*a*-25, and a S-GW 3*a*-30. A user equipment (UE or terminal) 3a-35 accesses an external network through the ENBs 3a-05 to 3a-20 and the S-GW 3a-30.

In FIG. 3A, the ENBs 3a-05 to 3a-20 correspond to existing nodes B of a UMTS system. The ENBs are connected to the UE 3a-35 through a wireless channel, and play more complicated roles than existing nodes B. In the LTE system, all user traffics including a real-time service such as voice over IP (VOIP) through the Internet Protocol are provided through a shared channel, and there is accordingly a need for a device for aggregating and scheduling status information such as the buffer status of UEs, the available transmission power status, and the channel status, and the same is handled by the ENBs 3a-05 to 3a-20.

A single ENB normally controls multiple cells. In order to implement a transmission rate of 100 Mbps, for example, the LTE system uses OFDM as a radio access technology at a bandwidth of 20 MHz, for example. In addition, an adaptive modulation & coding (hereinafter, referred to as AMC) scheme is applied, which determines the modulation scheme and the channel coding rate according to the channel status of the UE. The S-GW 3a-30 is a device configured to provide a data bearer, and generates or removes the data bearer under the control of the MME 3a-25. The MME is a device in charge of not only the UE mobility management function, but also various kinds of control functions, and is connected to multiple base stations.

Figure 3B:
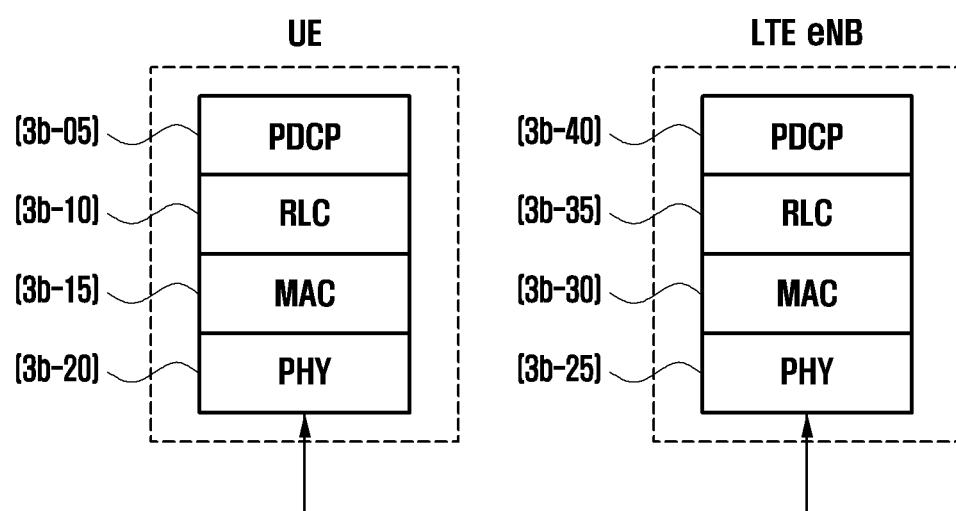
FIG. 3B is a diagram illustrating a wireless protocol structure in an LTE system to which the disclosure may be applied.

FIG. 3B is a diagram illustrating a wireless protocol structure in an LTE system to which the disclosure can be applied.

Referring to FIG. 3B, the wireless protocol of the LTE system includes PDCPs 3b-05 and 3b-40, RLCs 3b-10 and 3b-35, and MACs 3b-15 and 3b-30 in a UE and in an ENB, respectively. The PDCPs 3b-05 and 3b-40 are in charge of operations such as IP header compression/restoration. Major functions of the PDCPs are summarized as follows:
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The radio link controls (RLCs) 3b-10 and 3b-35 reconfigure the PDCP PDUs into appropriate sizes and perform ARQ operations and the like. Major functions of the RLCs are summarized as follows:
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MACs 3b-15 and 3b-30 are connected to multiple RLC layer devices configured in a single UE, and perform operations of multiplexing RLC PDUs to a MAC PDU and demultiplexing the RLC PDUs from the MAC PDU. Major functions of the MACs are summarized as follows:
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding The physical layers 3b-20 and 3b-25 perform operations of channel-coding and modulating upper layer data, generating an OFDM symbol, and transmitting the same through a wireless channel, or demodulating an OFDM symbol received through the wireless channel, channel-decoding the same, and delivering the same to the upper layer.

Figure 3C:
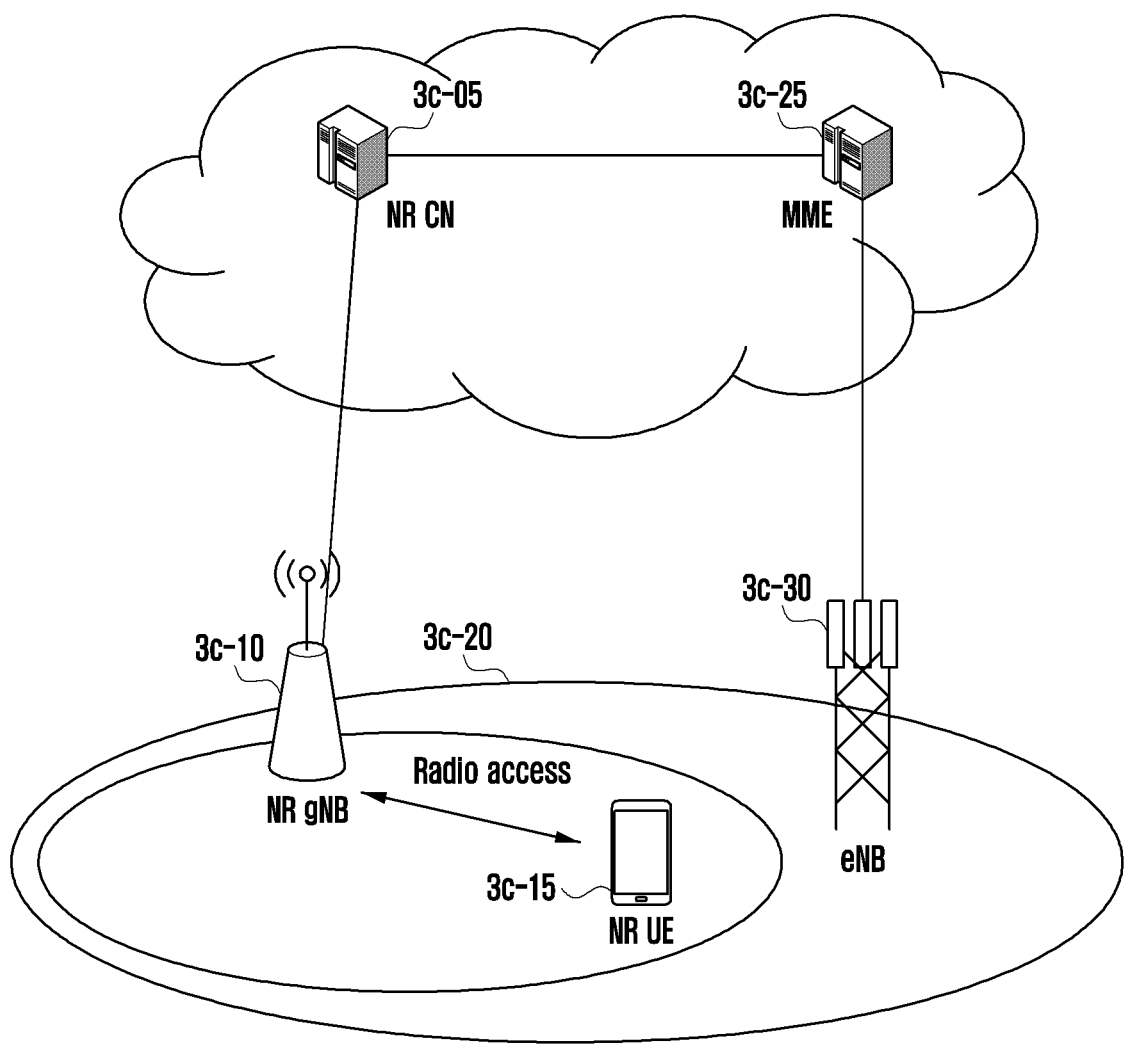
FIG. 3C is a diagram illustrating the structure of a next-generation mobile communication system to which the disclosure may be applied.

FIG. 3C a diagram illustrating the structure of a next-generation mobile communication system to which the disclosure can be applied.

Referring to FIG. 3C, the radio access network of the next-generation mobile communication system (hereinafter, referred to as NR or 5G) includes a NR gNB or NR base station 3c-10 and a new radio core network (NR CN) 3c-05, as illustrated. A new radio user equipment (hereinafter, referred to as NR UE or terminal) 3c-15 accesses an external network through the NR gNB 3c-10 and the NR CN 3c-05.

In FIG. 3C, the NR gNB 3c-10 corresponds to an evolved Node B (eNB) of an existing LTE system. The NR gNB is connected to the NR UE 3c-15 through a wireless channel, and is capable of providing a better service than an existing node B. In the next-generation mobile communication system, all user traffics are provided through a shared channel, and there is accordingly a need for a device for aggregating and scheduling status information such as the buffer status of UEs, the available transmission power status, and the channel status, and the same is handled by the NR gNB 3c-10.

A single NR gNB normally controls multiple cells. In order to implement super-high data transmission compared with the current LTE, the next-generation mobile communication system may have at least the existing maximum bandwidth, and a beamforming technology may be additionally combined, based OFDM as a radio access technology. In addition, an AMC scheme is applied, which determines the modulation scheme and the channel coding rate according to the channel status of the UE.

The NR CN 3c-05 performs functions such as mobility support, bearer configuration, and QoS configuration. The NR CN is a device in charge of not only the UE mobility management function, but also various control functions, and is connected to multiple base stations. In addition, the next-generation mobile communication system may interwork with an existing LTE system, and the NR CN is connected to an MME 3c-25 through a network interface. The MME is connected to an eNB 3c-30, which is an existing base station.

Figure 3D:
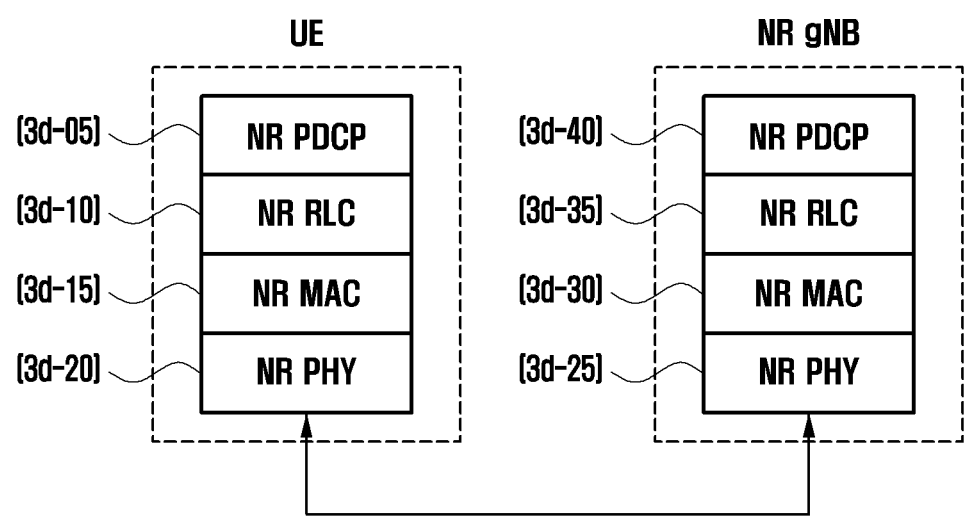
FIG. 3D is a diagram illustrating a wireless protocol structure in a next-generation mobile communication system to which the disclosure may be applied.

FIG. 3D a diagram illustrating a wireless protocol structure in a next-generation mobile communication system to which the disclosure can be applied.

Referring to FIG. 3D, the wireless protocol of the next-generation mobile communication system includes NR PDCPs 3*d*-05 and 3*d*-40, NR RLCs 3*d*-10 and 3*d*-35, and NR MACs 3*d*-15 and 3*d*-30 in a UE and in a NR base station, respectively. Major functions of the NR PDCPs 3*d*-05 and 3*d*-40 may include some of the following functions:

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

The above-mentioned reordering of the NR PDCP device refers to a function of reordering PDCP PDUs received from the lower layer, based on a PDCP sequence number (SN), may include a function of delivering the reordered data to the upper layer, may include a function of recording PDCP PDUs that are lost as a result of reordering, may include a function of reporting the status of the lost PDCP PDUs to the transmitting side, and may include a function of requesting retransmission of the lost PDCU PDUs.

Major functions of the NR RLCs 3*d*-10 and 3*d*-35 may include some of the following functions:

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The above-mentioned in-sequence delivery of the NR RLC device refers to a function of delivering RLC PDUs received from the lower layer to the upper layer in a sequence. If a single RLC SDU has been segmented into multiple RLC SDUs and then received, the in-sequence delivery may include a function of reassembling and delivering the same. The in-sequence delivery may also include: a function of reordering received RLC PDUs with reference to the RLC sequence number (SN) or PDCP SN; a function of recording PDCP PDUs that are lost as a result of reordering; a function of reporting the status of the lost RLC PDUs to the transmitting side; and a function of requesting retransmission of the lost RLC PDUs. If there is a lost RLC SDU, the in-sequence delivery may include a function of delivering only RLC SDUs that precede the lost RLC SDU to the upper layer in a sequence. Alternatively, if a predetermined timer has expired although there is a lost RLC SDU, the in-sequence delivery may include a function of delivering all RLC SDUs received before the timer has started to the upper layer in a sequence. Alternatively, if a predetermined timer has expired although there is a lost RLC SDU, the in-sequence delivery may include a function of delivering all currently received RLC SDUs to the upper layer in a sequence. In addition, the RLC PDUs may be processed in the receiving order (in the arriving order, regardless of the sequence number) and delivered to the PDCP device regardless of the sequence (out-of-sequence delivery). In the case of segments, segments stored in a buffer or segments to be received later may be received such that the same are reconfigured into a single complete PLC PDU and delivered to the PDCP device.

The NR RLC layer may not include the concatenation function, and the function may be performed in the NR MAC layer or replaced with a multiplexing function of the NR MAC layer.

The out-of-sequence delivery of the NR RLC device refers to a function of delivering RLC SDUs received from the lower layer directly to the upper layer regardless of the sequence. If a single RLC SDU has been segmented into multiple RLC SDUs and then received, the out-of-sequence delivery may include a function of reassembling and delivering the same. The out-of-sequence delivery may include a function of storing the RLC SN or PDCP SN of received RLC PDUs, reordering the same, and recording lost RLC PDUs.

The NR MACs 3*d*-15 and 3*d*-30 may be connected to multiple NR RLC layer devices configured in a single UE, and major functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 3*d*-20 and 3*d*-25 may perform operations of channel-coding and modulating upper layer data, turning the same into an OFDM symbol, and transmitting the same through a wireless channel, or demodulating an OFDM symbol received through the wireless channel, channel-decoding the same, and delivering the same to the upper layer.

Figure 3E:
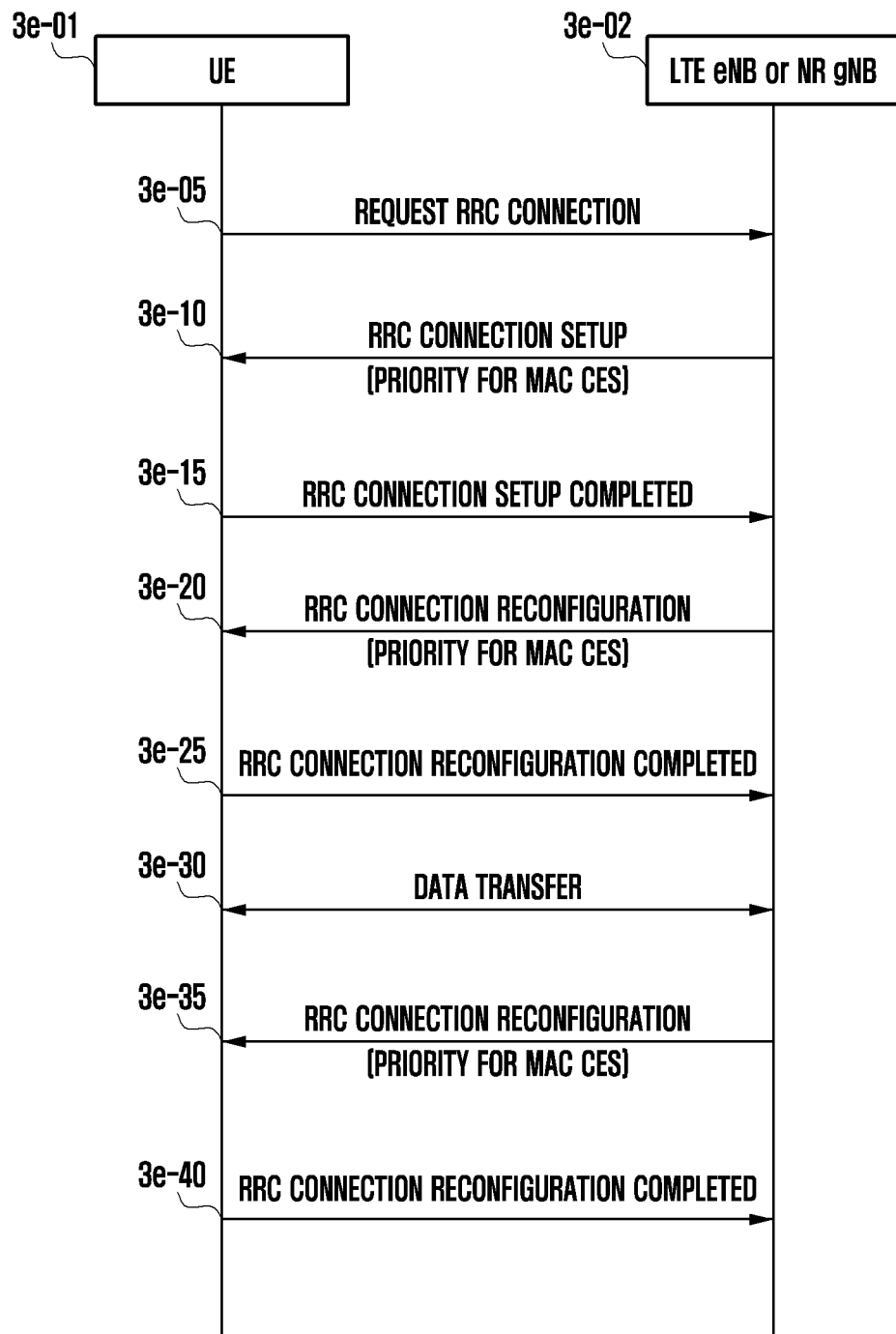
FIG. 3E is a diagram illustrating a procedure wherein a UE configures respective layer entities (hereinafter, referred to entities) and bearers in a next-generation mobile communication system of the disclosure.

FIG. 3E is a diagram illustrating a procedure wherein a UE configures respective layer entities (hereinafter, referred to entities) and bearers in a next-generation mobile communication system of the disclosure.

FIG. 3E is a diagram illustrating a procedure wherein a UE configures a connection with a network in order to transmit/receive data, and configures entities of respective layers (hereinafter, referred to as entities) in the disclosure.

If data to be transmitted is generated, a UE 3*e*-1 currently having no established connection (hereinafter, referred to as an idle mode UE) performs an RRC connection establishment process with an LTE base station or a NR base station 3*e*-02.

The UE establishes backward transmission synchronization with the base station through a random access process, and transmits an RRCConnectionRequest message to the base station (3*e*-05). The message contains the reason to establish a connection with the identifier of the UE, and the like.

The base station transmits an RRCConnectionSetup message such that an RRC connection is configured for UE (3*e*-10). The message may contain RRC connection configuration information, each layer's configuration information, and the like. That is, the message may include configuration information regarding a PHY or NY PHY entity, a MAC or NR MAC entity, a RLC or NR RLC entity, and a PDCP or NR PDCP entity, and may include information that instructs configuration regarding specific functions among functions supported by the layer entities (layer-specific functions described with reference to FIG. 3B or FIG. 3D). In addition, the message may include information regarding mapping between logical channels (LCHs) and logical channel groups (LCGs); priority information for logical channels or logical channel groups; priority information for specific MAC CEs; scheduling request (SR) transmission resource (time/frequency pattern and the like) for a scheduling request; configuration, priority, and information regarding a MAC CE to be used for a beam recovery request (BRR); information regarding mapping between logical channels or logical channel groups and a TTI; and an indication indicating whether or not a service is a URLLC service in connection with logical channels or logical channel groups. The RRC connection is also referred to as a signaling radio bearer (SRB), and is used to transmit/receive an RRC message, which is a control message between a UE and a base station.

After configuring the RRC connection, the UE transmits an RRCConnectionSetupComplete message to the base station (3e-15).

The base station transmits an RRCConnectionReconfiguration message to the UE in order to configure a data radio bearer (DRB) (3e-20). The message may contain RRC connection configuration information, each layer's configuration information, and the like. That is, the message may include configuration information regarding a PHY or NY PHY entity, a MAC or NR MAC entity, a RLC or NR RLC entity, and a PDCP or NR PDCP entity, and may include information that instructs configuration regarding specific functions among functions supported by the layer entities (layer-specific functions described with reference to FIG. 3B or FIG. 3D). In addition, the message may include information regarding mapping between logical channels (LCHs) and logical channel groups (LCGs); priority information regarding logical channels or logical channel groups; priority information regarding specific MAC CEs; scheduling request (SR) transmission resource (time/frequency pattern and the like) for a scheduling request; configuration, priority, and information regarding a MAC CE to be used for a beam recovery request (BRR); information regarding mapping between logical channels or logical channel groups and a TTI; and an indication indicating whether or not a service is a URLLC service in connection with logical channels or logical channel groups.

In addition, the message includes configuration information of a DRB to process user data. The UE applies the information so as to configure the DRB and to configure functions of respective layers, and transmits an RRCConnectionReconfigurationComplete message to the base station (3e-25). If the above processes are all completed, the UE transmits/receives data with the base station (3e-30).

In addition, while transmitting/receiving data, the base station may retransmit an RRCConnectionReconfiguration message to the UE, if necessary (3e-35), such that configuration information of each layer of the UE and the like can be reconfigured. The message may contain RRC connection configuration information, each layer's configuration information, and the like. That is, the message may include configuration information regarding a PHY or NY PHY entity, a MAC or NR MAC entity, a RLC or NR RLC entity, and a PDCP or NR PDCP entity, and may include information that instructs configuration regarding specific functions among functions supported by the layer entities (layer-specific functions described with reference to FIG. 3B or FIG. 3D). In addition, the message may include information regarding mapping between logical channels and logical channel groups; priority information regarding logical channels or logical channel groups; priority information regarding specific MAC CEs; SR transmission resource (time/frequency pattern and the like) for a scheduling request; configuration, priority, and information regarding a MAC CE to be used for a beam recovery request (BRR); information regarding mapping between logical channels or logical channel groups and a TTI; and an indication indicating whether or not a service is a URLLC service in connection with logical channels or logical channel groups.

After completing configuration of respective layer entities according to the message, the UE transmits an RRCConnectionReconfigurationComplete message to the base station (3e-40).

Figure 3F:
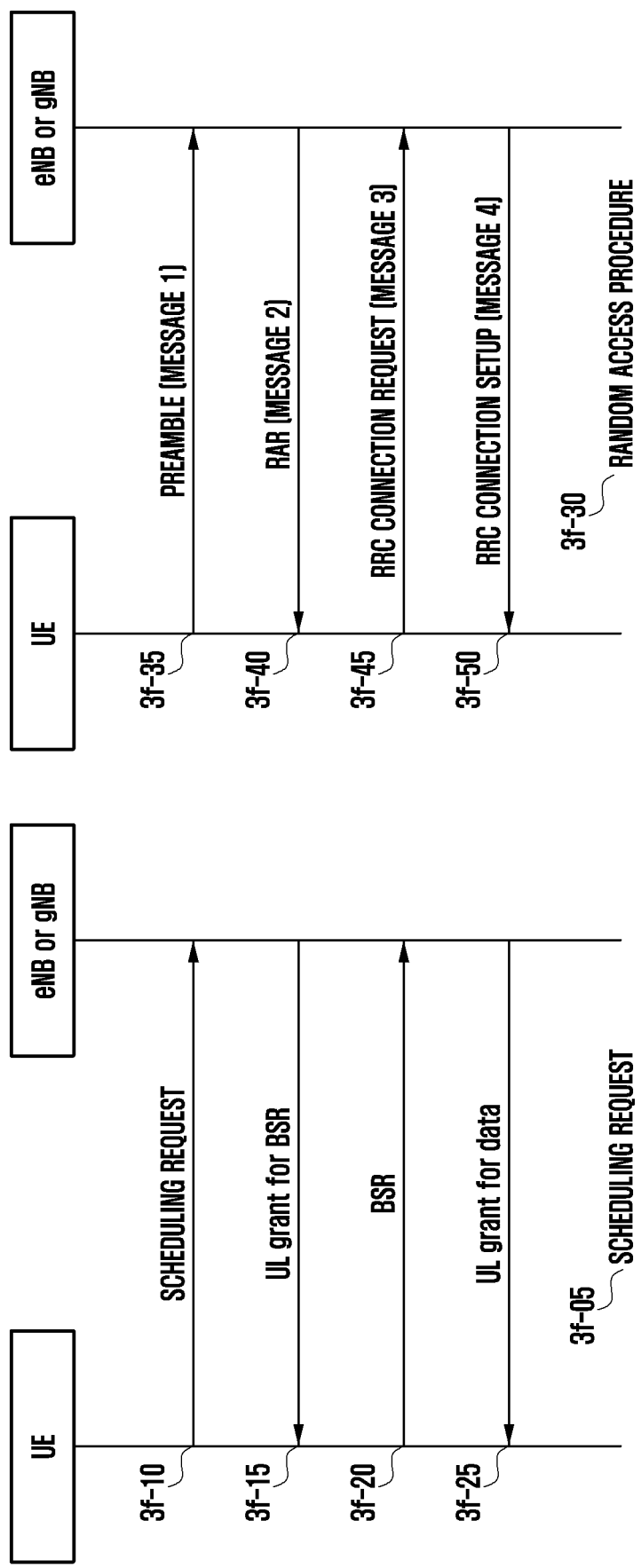
FIG. 3F is a diagram illustrating a procedure wherein a UE requests a base station to provide a transmission resource in order to transmit uplink data in the disclosure.

FIG. 3F is a diagram illustrating a procedure wherein a UE requests a base station to provide a transmission resource in order to transmit uplink data in the disclosure.

In FIG. 3F, if data to be transmitted through the uplink is generated, the UE initially confirms whether or not a transmission resource for an SR has been allocated to the UE. If a transmission resource for an SR has been allocated, the UE performs a scheduling request procedure (3f-05). The UE transmits a scheduling request to the base station by using the transmission resource allocated for the SR (3f-10). Since the base station has already allocated the SR transmission resource to the UE, it is possible to identify which UE has requested scheduling if a scheduling request is received by using the SR transmission resource.

In response to the scheduling request, the base station allocates an uplink transmission resource such that the UE can transmit buffer status information (3f-15). That is, the base station may indicate a transmission resource to transmit buffer status information on the time/frequency by using a control signal.

After the uplink transmission resource is allocated to the UE, the UE transmits a buffer status report (BSR) regarding logical channels or logical channel groups currently held by the UE to the base station by using the transmission resource (3f-20). If the uplink transmission resource is sufficient in this case, the UE may transmit uplink transmission data together.

After receiving the BSR, the base station allocates a transmission resource for uplink data transmission to the UE (3f-25). That is, the base station may indicate a transmission resource to transmit data on the time/frequency by using a control signal. If an uplink transmission resource is generated in the UE, and if no SR transmission resource has already been allocated to the UE, the UE may perform a random access procedure (3f-30). That is, the UE may transmit a preamble to the base station (3f-35), may receive a random access response (RAR) (3f-40), and may transmit an RRCConnectionRequest message (third message), thereby sending a connection request to the base station (3f-45).

If the base station is to allow the UE to access, the base station may transmit an RRCConnectionSetup message (fourth message) so as to inform the UE that the random access procedure has been successfully performed.

After receiving the fourth message, the UE may transmit a fifth message to complete the connection configuration. If the transmission resource is sufficient, the UE may transmit a BSR together with the fifth message, may complete the RRC connection configuration, and may transmit/receive data.

A rule and a procedure to trigger a BSR in the disclosure are as follows:

A (3-1)th embodiment for triggering a BSR in the disclosure is as follows:

In the (3-1)th embodiment, the UE may have a first BSR, a second BSR, and a third BSR.

The first BSR is a regular BSR and is triggered if a first condition is satisfied, and the first BSR triggers an SR. That is, the UE sends a scheduling request to the base station by using a preconfigured SR transmission resource. If there is no preconfigured SR transmission resource, the UE may perform a random access procedure. Alternatively, if the UE fails to receive an uplink transmission resource (UL grant) after performing SR transmission n times, the UE may perform a random access procedure.

The first condition corresponds to a case wherein data newly generated by the UE is generated in a logical channel or a logical channel group having higher priority than other pieces of data that have already been generated and stored in a buffer, to a case wherein there is no data in the existing buffer, and new data is generated for the first time, or to a case wherein the BSR retransmission timer has expired. The BSR retransmission timer (retxBSR-Timer) is updated every time one of the three BSRs is transmitted, and the timer value may be configured by the base station. For example, the timer value may be configured in step 3e-10, step 3e-20, or step 3e-35 in FIG. 3E.

The second BSR is a padding BSR, and may be transmitted to the base station together with data if a second condition is satisfied.

The second condition refers to a case wherein there is a remaining transmission resource even after the UE inserts all uplink transmission data to be transmitted into the transmission resource allocated from the base station, or to a case wherein the size of the added padding is larger than the sum of the size of the BSR and the size of the header for the BSR.

The third BSR is a periodic BSR and may be transmitted to the base station if a third condition is satisfied, and if the UE has an uplink transmission resource.

The third condition refers to a case wherein a timer for a periodic BSR (PeriodicBSR-Timer) has expired. The periodicBSR-Timer is updated every time one of the three BSRs is transmitted, and the timer value may be configured by the base station. For example, the timer value may be configured in step 3e-10, step 3e-20, or step 3e-35 in FIG. 3E.

In the (3-1)th embodiment, only the first BSR can trigger an SR, and the second BSR and the third BSR can be transmitted if an uplink transmission resource has been allocated.

Figure 3G:
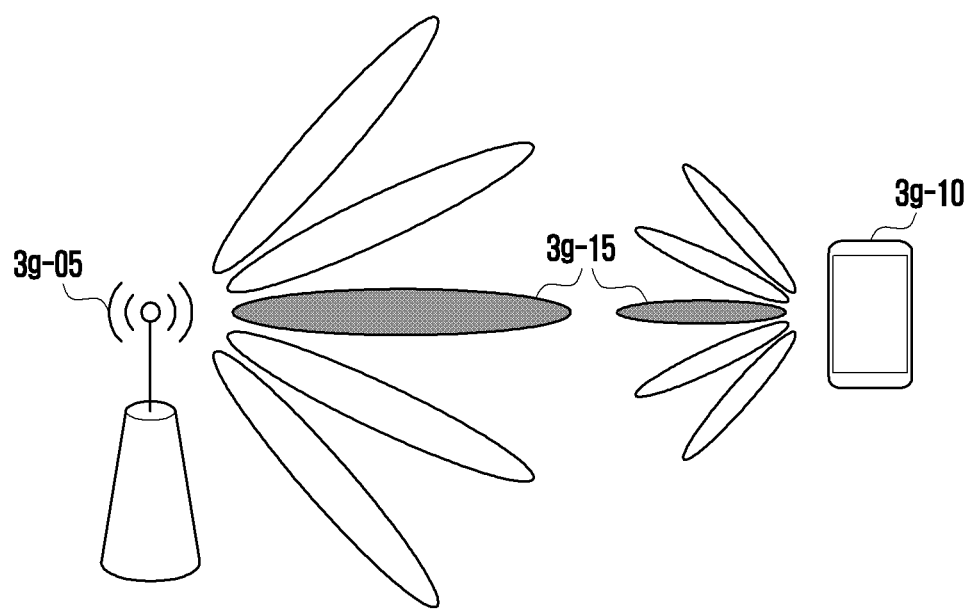
FIG. 3G is a diagram illustrating a process wherein a next-generation mobile communication system provides a service to a UE through a beam in the disclosure.

FIG. 3G is a diagram illustrating a process wherein a next-generation mobile communication system provides a service to a UE through a beam in the disclosure.

In the next-generation mobile communication system, multiple antennas may be used to form a narrow beam, in order to support a high data transmission rate, such that a beam formation gain can be obtained. Such a narrow beam may have a high beam formation gain but has a small coverage to support a UE. Accordingly, there is a need to transmit/receive data while a beam of the UE 3g-05 and a beam of the base station 3g-10 are aligned with each other as illustrated in 3g-15. If there is an obstacle between the UE and the base station, or if the mobility of the UE causes misalignment between the beam of the UE and the bream of the base station, the signal strength may fall below an appropriate level. Such a phenomenon may occur more frequently if a high frequency band is used. Therefore, if the transmission/reception strength between the beam of the UE and the beam of the base station in the next-generation mobile communication system is weak, a process of correcting the beams or recovering the same is necessary.

Accordingly, when initially accessing the network, the UE may perform a procedure of selecting a base station and a beam during a random access procedure. The beam selecting procedure refers to a process of selecting a combination of beams having the best signal strength or having at least a predetermined level of signal strength from beams that the UE may have and from beams that the base station may have, and the procedure may be performed by exchanging a message between the base station and the UE. A message including information for beam configuration may be exchanged through a MAC control element (MAC CE) that is transmitted and received by a MAC entity. In addition, a PHY entity may exchange information for beam configuration through L1 signaling.

After the procedure of finding a combination of beams of the UE and the base station in the random access procedure is completed, the UE and the base station may transmit a UE identifier, may confirm the same, may exchange information such as timing advance (TA), thereby completing the random access procedure, and may proceed to an RRC connection configuration procedure.

The disclosure proposes a (3-2)th embodiment of a rule and a procedure for BSR triggering such that a beam recovery procedure can be performed if there is a misalignment between the beam of the UE and the beam of the base station, or if the signal strength of a beam corresponding to a combination of current beams of the UE and the base station is equal to or lower than a predetermined level, as follows:

The (3-2)th embodiment is characterized in that priority is assigned to specific MAC CEs, like logical channels. The specific MAC CEs may be MAC CEs for a newly defined beam recovery request, and information regarding the MAC CEs and priority information corresponding thereto may be configured in step 3e-10, step 3e-20, or 3e-35 in FIG. 3E.

The above description that priority is assigned to a specific MAC CE means that, if a MAC CE having priority assigned thereto is generated, the UE can request a regular BSR, like a logical channel or a logical channel group, despite being a MAC CE. In other words, due to the specific MAC CE generated, the UE can request an uplink transmission resource.

The (3-2)th embodiment is characterized in that the network assigns priority to a specific MAC CE as mentioned above. If a specific MAC CE is generated, the network may assign high priority such that a regular BSR can be triggered.

In the (3-2)th embodiment, if a specific MAC CE having high priority is generated, the UE triggers a regular BSR. However, the (3-2)th embodiment is characterized in that, if the specific MAC CE is a MAC CE for a beam recovery request, the UE instantly performs a random access procedure without performing SR transmission, even if the SR transmission resource has been configured. This is because the fact that a beam recovery request MAC CE has been generated means that the signal strength of the beam combination between the base station and the UE is currently weak, in other words, the current connection is not good. Accordingly, this means that, if the SR transmission resource configured in the current connection is used, there is a very high possibility of a failure due to the weak signal strength. Therefore, although SR transmission has been configured, the UE triggers a regular BSR, if a MAC CE for a beam recovery request is generated, and instantly performs a random access procedure such that a beam adjustment procedure is performed.

The (3-2)th embodiment is characterized in that, if a random access procedure is performed as a result of the beam recovery request MAC CE, the UE transmits the beam recovery request MAC CE through a third message. That is, if the UE sends a preamble, and if the UE receives a RAR in response thereto, the UE may instantly transmit a beam recovery request MAC CE in order to perform a beam adjustment procedure.

The beam recovery request MAC CE may include information such as beam identifiers, results of measuring respective beams, an indication for requesting beam recovery, UE beam configuration information for beam adjustment, and the number of beams.

A detailed procedure of the (3-2)th embodiment of the disclosure is as follows:

In the (3-2)th embodiment, the UE may have a first BSR, a second BSR, and a third BSR.

If a first condition is satisfied, the UE triggers a first BSR, which is a regular BSR, and the first BSR triggers an SR. That is, the UE sends a scheduling request to the base station by using a preconfigured SR transmission resource. If there is no preconfigured SR transmission resource, the UE may perform a random access procedure. Alternatively, if the UE fails to receive an uplink transmission resource (UL grant) after performing SR transmission n times, the UE may perform a random access procedure.

If a second condition is satisfied, the UE triggers the first BSR (regular BSR) and performs a random access procedure even if the UE has an SR transmission resource configured therein (regardless of whether or not the SR transmission resource is configured) such that a beam adjustment procedure is performed.

The first condition corresponds to a case wherein data newly generated by the UE is generated in a logical channel or a logical channel group having higher priority than other pieces of data that have already been generated and stored in a buffer, to a case wherein there is no data in the existing buffer, and new data is generated for the first time, or to a case wherein the BSR retransmission timer has expired. The BSR retransmission timer (retxBSR-Timer) is updated every time one of the three BSRs is transmitted, and the timer value may be configured by the base station. For example, the timer value may be configured in step 3*e*-10, step 3*e*-20, or step 3*e*-35 in FIG. 3E.

The second condition corresponds to a case wherein a beam recovery request MAC CE having high priority is generated in the UE. The condition to generate a beam recovery request MAC CE corresponds to a case wherein the signal strength of the combination of the beam of the UE and the beam of the base station is currently below a predetermined level. The beam recovery request MAC CE may include information such as beam identifiers, results of measuring respective beams, an indication for requesting beam recovery, UE beam configuration information for beam adjustment, and the number of beams.

The second BSR is a padding BSR, and may be transmitted to the base station together with data if a second condition is satisfied.

The second condition refers to a case wherein there is a remaining transmission resource even after the UE inserts all uplink transmission data to be transmitted into the transmission resource allocated from the base station, or to a case wherein the size of the added padding is larger than the sum of the size of the BSR and the size of the header for the BSR.

The third BSR is a periodic BSR and may be transmitted to the base station if a third condition is satisfied, and if the UE has an uplink transmission resource.

The third condition refers to a case wherein a timer for a periodic BSR (PeriodicBSR-Timer) has expired. The periodicBSR-Timer is updated every time one of the three BSRs is transmitted, and the timer value may be configured by the base station. For example, the timer value may be configured in step 3*e*-10, step 3*e*-20, or step 3*c*-35 in FIG. 3E.

In the (3-1)th embodiment, only the first BSR can trigger an SR, and the second BSR and the third BSR can be transmitted if an uplink transmission resource has been allocated.

Figure 3H:
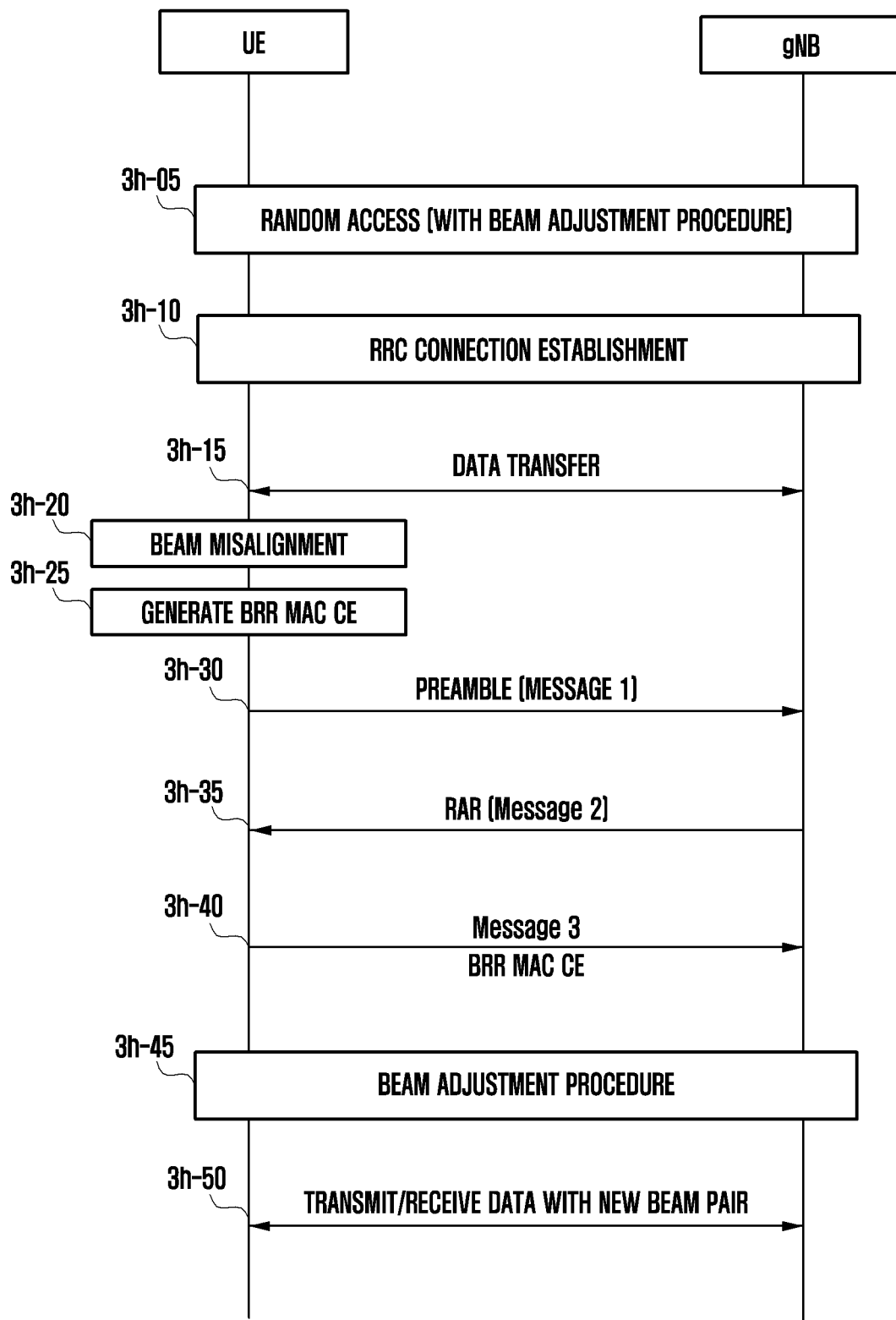
FIG. 3H is a diagram illustrating a procedure of recovering a beam misalignment between a UE and a base station in the disclosure.

FIG. 3H is a diagram illustrating a procedure of recovering a beam misalignment between a UE and a base station in the disclosure.

In FIG. 3H, the UE may perform a random access procedure with the current cell/base station in order to access a network. Since the next-generation mobile communication system supports a UE based on a beam, a combination of beams having the best signal strength or having at least a predetermined level of beam strength may be selected from beams supported by the base station and from beams supported by the UE (3*h*-05). Such a procedure may be referred to as a beam adjustment procedure. The threshold value for determining whether or not the combination has at least a predetermined level of beam strength may be configured in step 3*e*-10, step 3*e*-20, or step 3*e*-35 in FIG. 3E. In addition, the beam adjustment procedure may be performed while transmitting/receiving MAC CEs between the UE and the base station. Alternatively, the beam adjustment procedure may be performed by L1 signaling. The MAC CEs or L1 signaling may include beam identifiers, results of measuring respective beams, each beam's transmission time/frequency information, UE beam configuration information for beam adjustment, base station beam configuration information for beam adjustment, and the like.

After a beam is configured in step 3*h*-05, the UE may perform an RRC connection establishment procedure with the base station (3*h*-10), and may transmit/receive data (3*h*-15). The UE may periodically measure beam strength while transmitting/receiving data in the RRC-connected mode. While measuring the beam strength, the UE may compare the same with a pre-promised threshold value so as to confirm whether or not the beam strength degrades. The threshold value may be configured in step 3*e*-10, step 3*e*-20, or step 3*e*-35 in FIG. 3E. The threshold value may indicate the minimum SNR, SINR, or RSRP value necessary for communication between the UE and the base station. If the signal strength of the combination of beams of the UE and the base station is smaller than the threshold value, the UE may determine that the beam of the UE and the beam of the base station are currently invalid, and may consider the same as a beam misalignment (3*h*-20).

Then, the UE may generate a MAC CE for a BRR (3*h*-25). Since the generated MAC CE has high priority, the same triggers a regular BRR, and the UE may instantly perform a random access procedure regardless of whether or not an SR transmission resource is configured (because the current connection, that is, the combination of beams of the UE and the base station is invalid).

In the random access procedure, the UE may transmit a preamble (first message) (3*h*-30), may receive an RAR (second message) in response thereto (3*h*-35), may insert a beam recovery request MAC CE to a third message, in order to perform a beam recovery request, and may transmit the same (3*h*-40). The third message may include the UE's identifier (C-RNTI), a BSR, a beam identifier, results of measuring respective beams, each beam's transmission time/frequency information, UE beam configuration information for beam adjustment, and the like.

If the base station receives the beam recovery request MAC CE, the base station may perform a beam adjustment procedure in order to update and refine the combination of beams of the UE and the base station, thereby selecting a new combination of beams having good signal strength (3h-45). After a combination of beams having good signal strength is selected, the UE and base station may again transmit/receive data (3h-50).

Table 3 below summarizes another embodiment of the disclosure.

TABLE 3

| UE <-> gNB | Configure RRC connection |
|---|---|
| UE <- gNB | Base station configures MAC configuration info, mapping info of logical channel and LCG, beam recovery request MAC CE, and priority regarding BRR MAC CE. For example, base station configures high priority for BRR MAC CE. This is because such configuration will trigger regular BSR and perform SR/RACH if BRR MAC CE occurs in MAC. Scheduling request configuration info (time/frequency/pattern etc.) |
| UE <-> gNB | Data transmission/reception |
| UE | Trigger regular BSR if high priority DCCH/DTCH data occurs |
| UE -> GNB | Transmits scheduling request |
| UE <- GNB | UL grant |
| UE -> GNB | Transmit MAC PDU |
| UE | Trigger regular BSR if high priority DCCH/DTCH data occurs |
| UE -> GNB | Initiate random access procedure if UL grant fails to be received after scheduling request is transmitted n times |
| UE <-> gNB | Resume data transmission/reception after completing random access |
| UE <-> gNB | Transmit/receive data |
| UE | Beam misalignment occurred (quality of serving beam degrades below predetermined reference) |
| UE | Generate BRR MAC CE (may include indication that beam recovery is necessary, measurement info regarding other beams newly measured by UE, etc.) |
| UE | Consider that scheduling request resource is no longer valid, and initiate random access process |
| UE <-> gNB | Transmit/receive data through new beam pair after completing random access (BRR MAC CE is inserted into this MAC PDU and then transmitted) |

Figure 3I:
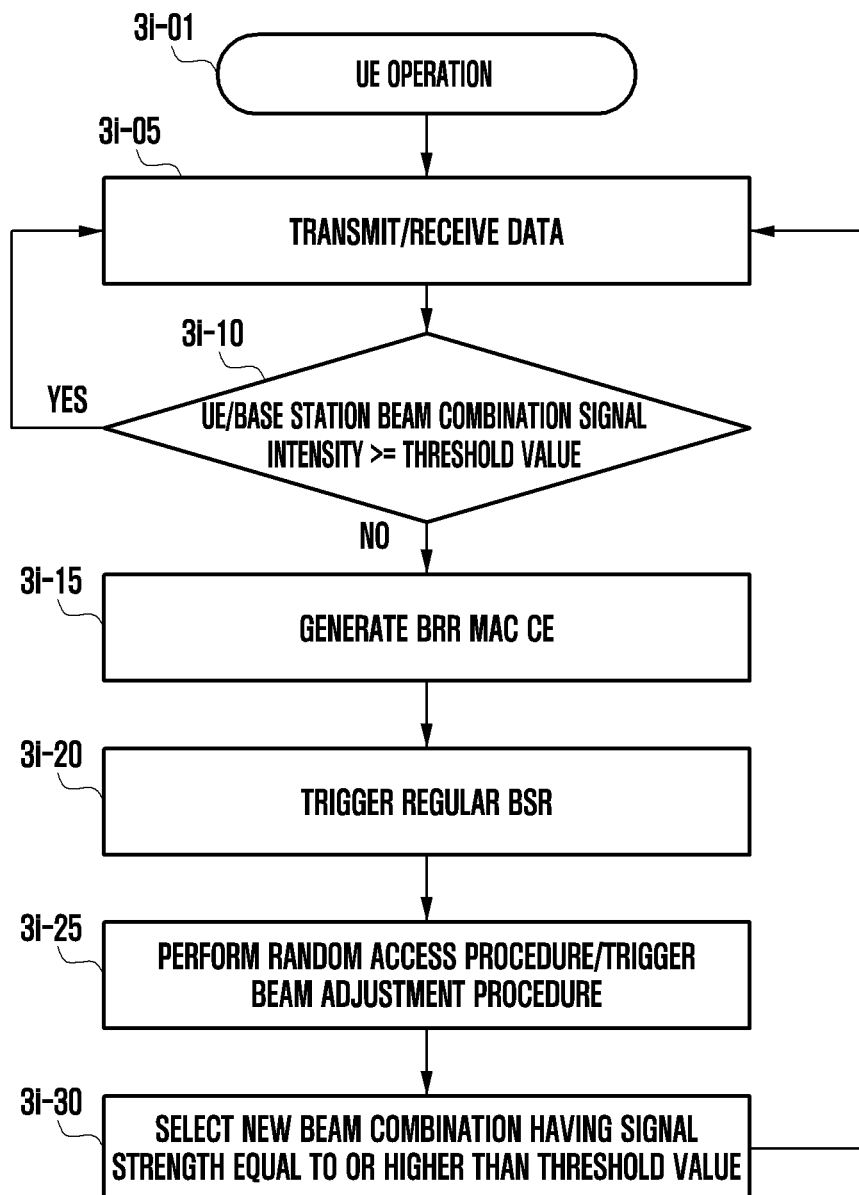
FIG. 3I is a diagram illustrating operations of a UE performing a beam recovery procedure in the disclosure.

FIG. 3I is a diagram illustrating operations of a UE performing a beam recovery procedure in the disclosure.

The UE may perform a random access procedure with the current cell/base station in order to access a network. Since the next-generation mobile communication system supports a UE based on a beam, a combination of beams having the best signal strength or having at least a predetermined level of beam strength may be selected from beams supported by the base station and from beams supported by the UE. Such a procedure may be referred to as a beam adjustment procedure. The threshold value for determining whether or not the combination has at least a predetermined level of beam strength may be configured in step 3e-10, step 3e-20, or step 3e-35 in FIG. 3E.

After an appropriate beam combination is selected, the UE may perform an RRC connection establishment procedure with the base station, and may transmit/receive data (3i-05).

The UE may periodically measure beam strength while transmitting/receiving data in the RRC-connected mode. While measuring the beam strength, the UE may compare the same with a pre-promised threshold value so as to confirm whether or not the beam strength degrades (3i-10). The threshold value may be configured in step 3e-10, step 3e-20, or step 3e-35 in FIG. 3E. The threshold value may indicate the minimum SNR, SINR, or RSRP value necessary for communication between the UE and the base station. If the signal strength of the combination of beams of the UE and the base station is smaller than the threshold value, the UE may determine that the beam of the UE and the beam of the base station are currently invalid, and may consider the same as a beam misalignment.

Then, the UE generates a MAC CE for a BRR (3i-15). Since the generated MAC CE has high priority, the same triggers a regular BRR (3i-20), and the UE may instantly perform a random access procedure regardless of whether or not an SR transmission resource is configured (3i-25) (because the current connection, that is, the combination of beams of the UE and the base station is invalid).

In the random access procedure, the UE may transmit a preamble (first message), may receive an RAR (second message) in response thereto, may insert a beam recovery request MAC CE to a third message, in order to perform a beam recovery request, and may transmit the same.

If the base station receives the beam recovery request MAC CE, the base station may perform a beam adjustment procedure in order to update and refine the combination of beams of the UE and the base station, thereby selecting a new combination of beams having good signal strength (3i-25 and 3i-30). After a combination of beams having good signal strength is selected, the UE and base station may again transmit/receive data (3i-05).

Figure 3J:
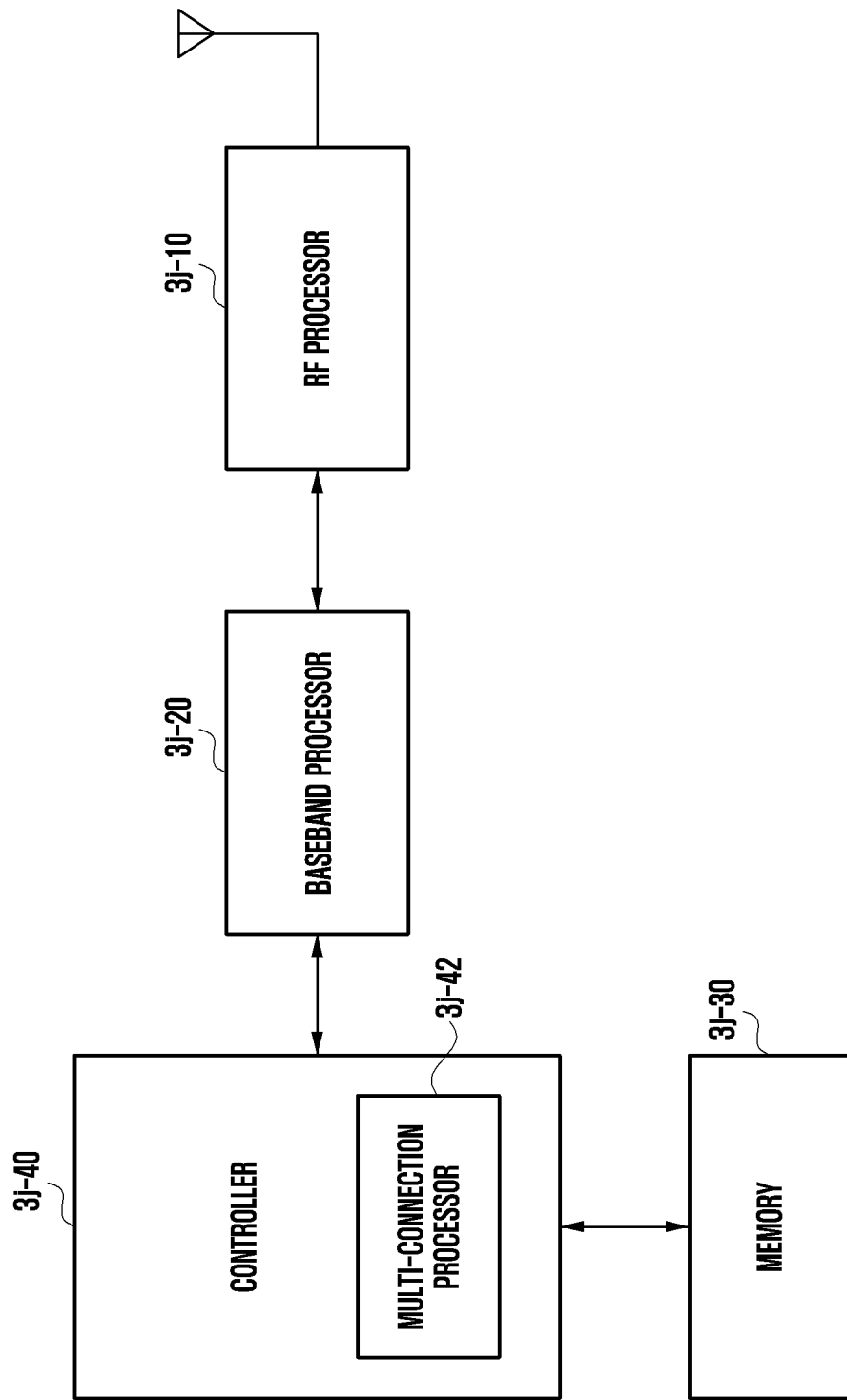
FIG. 3J illustrates the structure of a UE to which an embodiment of the disclosure may be applied.

FIG. 3J illustrates the structure of a UE to which an embodiment of the disclosure can be applied.

Referring to the diagram, the UE includes a radio frequency (RF) processor 3j-10, a baseband processor 3j-20, a memory 3j-30, and a controller 3j-40.

The RF processor 3j-10 performs functions for transmitting/receiving signals through a wireless channel, such as signal band conversion, amplification, and the like. Specifically, the RF processor 3j-10 up-converts a baseband signal provided from the baseband processor 3j-20 into an RF band signal, transmits the same through an antenna, and down-converts an RF band signal received through the antenna into a baseband signal. For example, the RF processor 3j-10 may include a transmission filter, a reception filter, an amplifier, a mixer, an oscillator, a digital-to-analog converter (DAC), an analog-to-digital converter (ADC), and the like. Although only one antenna is illustrated in the diagram, the UE may include multiple antennas. In addition, the RF processor 3j-10 may include multiple RF chains. Moreover, the RF processor 3j-10 may perform beamforming. For the sake of the beamforming, the RF processor 3j-10 may adjust the phase and magnitude of signals transmitted/received through multiple antennas or antenna elements. In addition, the RF processor may perform MIMO, and may receive multiple layers when performing the MIMO operation. The RF processor 3j-10 may appropriately select multiple antennas or antenna elements under the control of the controller, thereby performing reception beam sweeping, or may adjust the direction of a reception beam and the width of the beam such that the reception beam is coordinated with the transmission beam.

The baseband processor 3j-20 performs a function of conversion between a baseband signal and a bit string according to the physical layer specification of the system. For example, during data transmission, the baseband processor 3j-20 encodes and modulates a transmission bit string, thereby generating complex symbols. In addition, during data reception, the baseband processor 3j-20 demodulates and decodes a baseband signal provided from the RF processor 3j-10, thereby restoring a reception bit string. For example, when an orthogonal frequency division multiplexing (OFDM) scheme is followed, during data transmission, the baseband processor 3j-20 encodes and modulates a transmission bit string so as to generate complex symbols, maps the complex symbols to subcarriers, and then configures OFDM symbols through an inverse fast Fourier transform (IFFT) operation and cyclic prefix (CP) insertion. In addition, during data reception, the baseband processor 3j-20 divides a baseband signal provided from the RF processor 3j-10 in an OFDM symbol unit, restores signals mapped to subcarriers through a fast Fourier transform (FFT) operation, and then restores the reception bit string through demodulation and decoding.

The baseband processor 3j-20 and the RF processor 3j-10 transmit and receive signals as described above. Accordingly, the baseband processor 3j-20 and the RF processor 3j-10 may be referred to as transmitter, receiver, transceiver, or communication units. In addition, at least one of the baseband processor 3j-20 and the RF processor 3j-10 may include multiple communication modules in order to support multiple different radio access technologies. Furthermore, at least one of the baseband processor 3j-20 and the RF processor 3j-10 may include different communication modules in order to process signals in different frequency bands. For example, the different radio access technologies may include an LTE network, an NR network, and the like. In addition, the different frequency bands may include a super high frequency (SHF) (for example, 2.5 GHz, 5 GHZ) band and a millimeter wave (for example, 60 GHz) band.

The memory 3j-30 stores data for operation of the UE, such as a basic program, an application program, and configuration information. The memory 3j-30 provides stored data at a request of the controller 3j-40.

The controller 3j-40 controls the overall operations of the UE. For example, the controller 3j-40 receives/transmits signals through the baseband processor 3j-20 and the RF processor 3j-10. In addition, the controller 3j-40 records and reads data in the memory 3j-40. To this end, the controller 3j-40 may include at least one processor. For example, the controller 3j-40 may include a communication processor (CP) that performs control for communication, and an application processor (AP) that controls the upper layer, such as an application program.

Figure 3K:
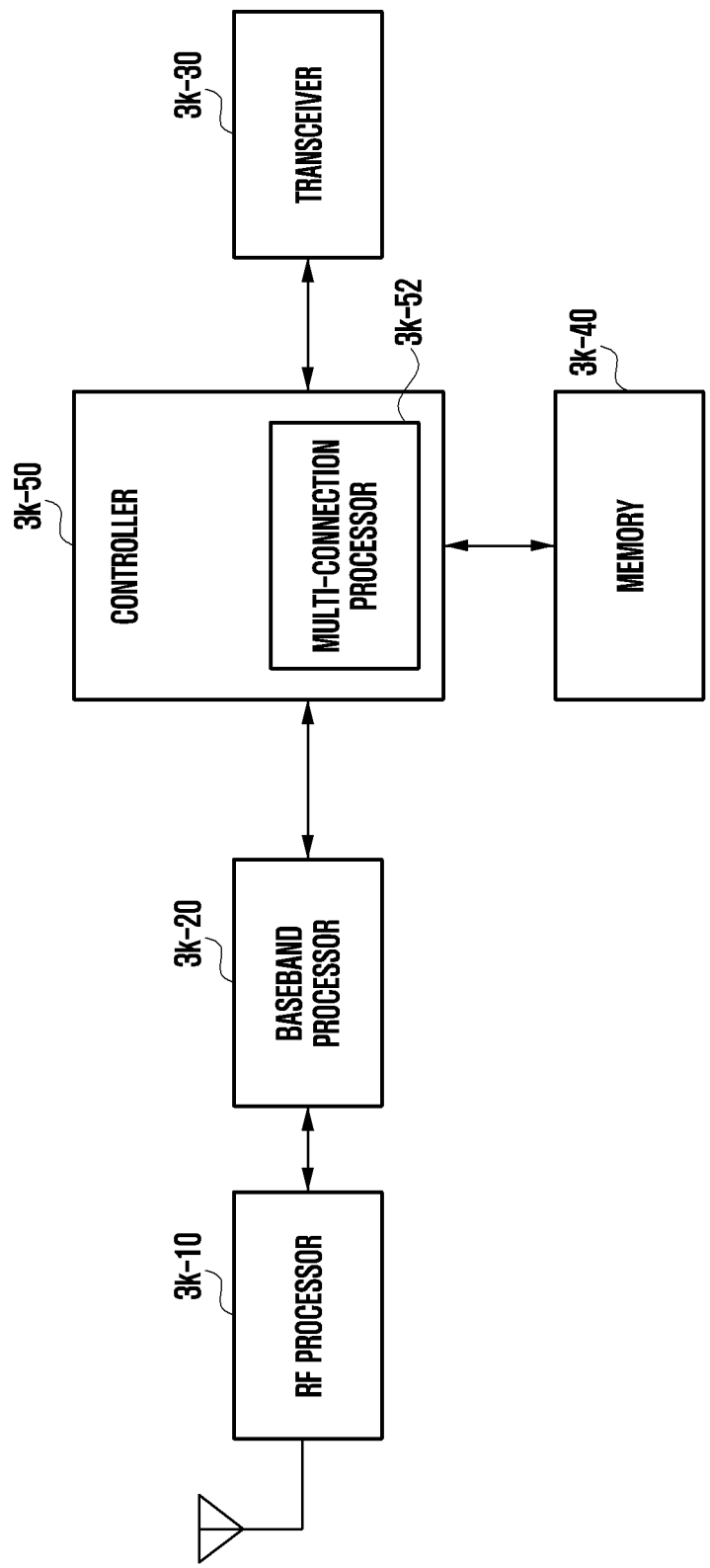
FIG. 3K illustrates a block configuration of a TRP in a wireless communication system to which an embodiment of the disclosure may be applied.

FIG. 3K illustrates a block configuration of a TRP in a wireless communication system to which an embodiment of the disclosure can be applied.

As illustrated in the diagram, the base station includes an RF processor 3k-10, a baseband processor 3k-20, a backhaul transceiver 3k-30, a memory 3k-40, and a controller 3k-50.

The RF processor 3k-10 performs functions for transmitting/receiving signals through a wireless channel, such as signal band conversion, amplification, and the like. Specifically, the RF processor 3k-10 up-converts a baseband signal provided from the baseband processor 3k-20 into an RF band signal, transmits the same through an antenna, and down-converts an RF band signal received through the antenna into a baseband signal. For example, the RF processor 3k-10 may include a transmission filter, a reception filter, an amplifier, a mixer, an oscillator, a DAC, an ADC, and the like. Although only one antenna is illustrated in the diagram, the first access node may include multiple antennas. In addition, the RF processor 3k-10 may include multiple RF chains. Moreover, the RF processor 3k-10 may perform beamforming. For the sake of the beamforming, the RF processor 3k-10 may adjust the phase and magnitude of signals transmitted/received through multiple antennas or antenna elements. The RF processor may perform a downlink MIMO operation by transmitting at least one layer.

The baseband processor 3k-20 performs a function of conversion between a baseband signal and a bit string according to the physical layer specification of the first radio access technology. For example, during data transmission, the baseband processor 3k-20 encodes and modulates a transmission bit string, thereby generating complex symbols. In addition, during data reception, the baseband processor 3k-20 demodulates and decodes a baseband signal provided from the RF processor 3k-10, thereby restoring a reception bit string. For example, when an OFDM scheme is followed, during data transmission, the baseband processor 3k-20 encodes and modulates a transmission bit string so as to generate complex symbols, maps the complex symbols to subcarriers, and then configures OFDM symbols through an IFFT operation and CP insertion. In addition, during data reception, the baseband processor 3k-20 divides a baseband signal provided from the RF processor 3k-10 in an OFDM symbol unit, restores signals mapped to subcarriers through a FFT operation, and then restores the reception bit string through demodulation and decoding. The baseband processor 3k-20 and the RF processor 3k-10 transmit and receive signals as described above. Accordingly, the baseband processor 3k-20 and the RF processor 3k-10 may be referred to as transmitter, receiver, transceiver, or communication units.

The transceiver 3k-30 provides an interface for communicating with other nodes inside the network.

The memory 3k-40 stores data for operation of the main base station, such as a basic program, an application program, and configuration information. Particularly, the memory 3k-40 may store information regarding a bearer allocated to an accessed UE, a measurement result reported from the accessed UE, and the like. In addition, the memory 3k-40 may store information serving as a criterion to determine whether to provide the UE with multi-connection or to discontinue the same. In addition, the memory 3k-40 provides stored data at a request of the controller 3k-50.

The controller 3k-50 controls the overall operations of the main base station. For example, the controller 3k-50 receives/transmits signals through the baseband processor 3k-20 and the RF processor 3k-10, or through the backhaul transceiver 3k-30. In addition, the controller 3k-50 records and reads data in the memory 3k-40. To this end, the controller 3k-50 may include at least one processor.

Fourth Embodiment

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Terms for identifying access nodes, terms referring to network entities, terms referring to messages, terms referring to interfaces between network entities, and terms referring to various kinds of identification information, used in the following description, are examples for convenience of description. Therefore, the disclosure may not be limited by the terminologies provided below, and other terms that indicate subjects having equivalent technical meanings may be used.

Hereinafter, terms and names defined by the 3rd generation partnership project long term evolution (3GPP LTE) will be used in the disclosure for convenience of description. However, the disclosure is not limited to the terms and names, and is identically applicable to other systems following different standards. In the disclosure, an eNB may be used interchangeably with a gNB for convenience of description. That is, a base station described as an eNB may refer to a gNB.

Figure 4A:
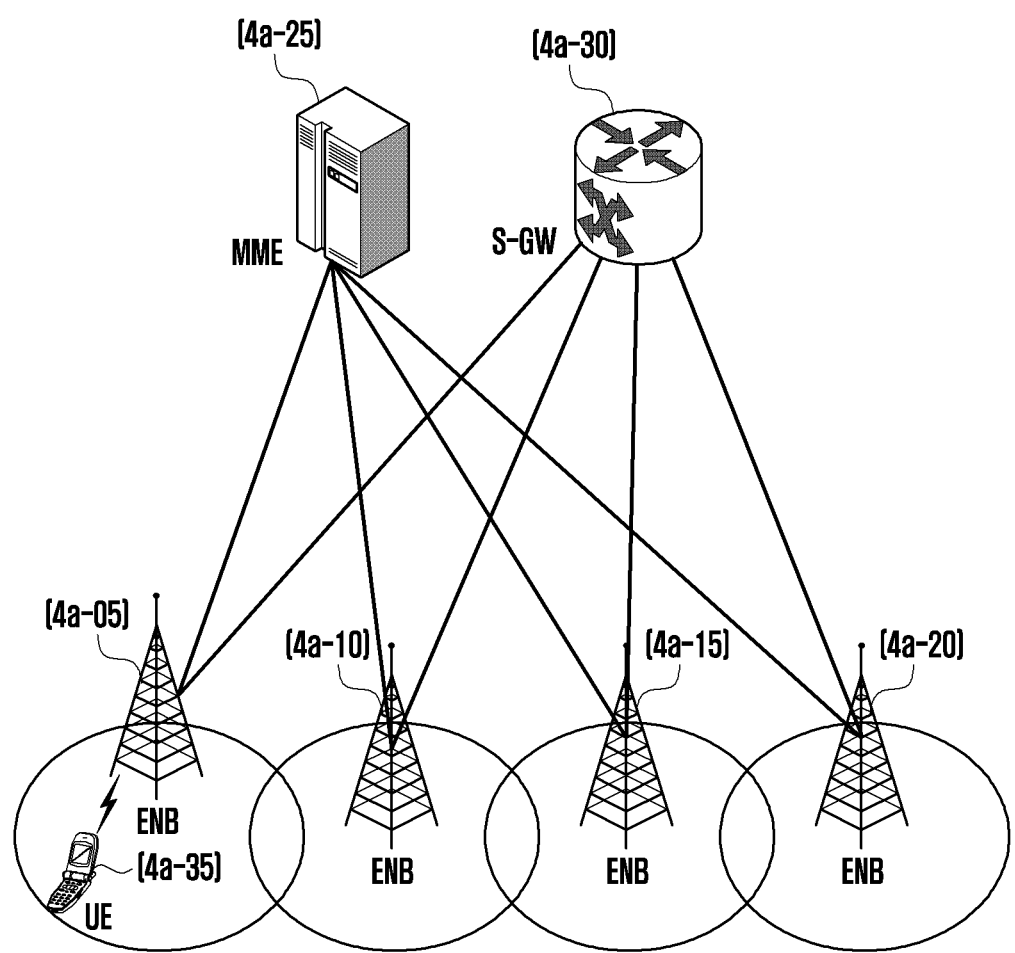
FIG. 4A is a diagram illustrating the structure of an LTE system to which the disclosure may be applied.

FIG. 4A is a diagram illustrating the structure of an LTE system to which the disclosure can be applied.

Referring to FIG. 4A, the radio access network of the LTE system includes evolved nodes B (hereinafter, referred to as ENBs, Nodes B, or base stations) 4a-05, 4a-10, 4a-15, and 4a-20, an MME 4a-25, and an S-GW 4a-30. A user equipment (UE or terminal) 4a-35 accesses an external network through the ENBs 4a-05 to 4a-20 and the S-GW 4a-30.

In FIG. 4A, the ENBs 4a-05 to 4a-20 correspond to existing nodes B of a UMTS system. The ENBs are connected to the UE 4a-35 through a wireless channel, and play more complicated roles than existing nodes B. In the LTE system, all user traffics including a real-time service such as voice over IP (VOIP) through the Internet Protocol are provided through a shared channel, and there is accordingly a need for a device for aggregating and scheduling status information such as the buffer status of UEs, the available transmission power status, and the channel status, and the same is handled by the ENBs 4a-05 to 4a-20.

A single ENB normally controls multiple cells. In order to implement a transmission rate of 100 Mbps, for example, the LTE system uses OFDM as a radio access technology at a bandwidth of 20 MHz, for example. In addition, an adaptive modulation & coding (hereinafter, referred to as AMC) scheme is applied, which determines the modulation scheme and the channel coding rate according to the channel status of the UE. The S-GW 4a-30 is a device configured to provide a data bearer, and generates or removes the data bearer under the control of the MME 4a-25. The MME is a device in charge of not only the UE mobility management function, but also various kinds of control functions, and is connected to multiple base stations.

Figure 4B:
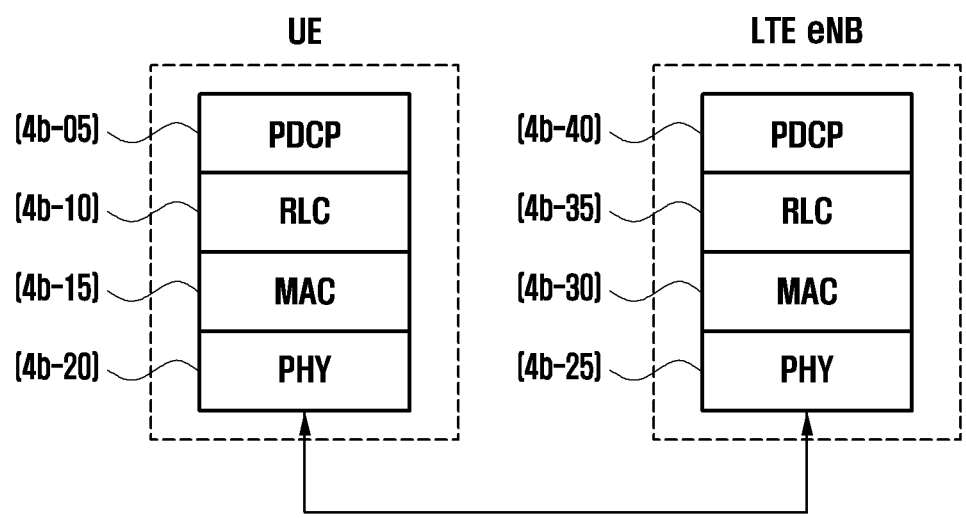
FIG. 4B is a diagram illustrating a wireless protocol structure in an LTE system to which the disclosure may be applied.

FIG. 4B is a diagram illustrating a wireless protocol structure in an LTE system to which the disclosure can be applied.

Referring to FIG. 4B, the wireless protocol of the LTE system includes PDCPs 4b-05 and 4b-40, RLCs 4b-10 and 4b-35, and MACs 4b-15 and 4b-30 in a UE and in an ENB, respectively. The PDCPs 4b-05 and 4b-40 are in charge of operations such as IP header compression/restoration. Major functions of the PDCPs are summarized as follows:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link controls (RLCs) 4b-10 and 4b-35 reconfigure the PDCP PDUs into appropriate sizes and perform ARQ operations and the like. Major functions of the RLCs are summarized as follows:
Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 4b-15 and 4b-30 are connected to multiple RLC layer devices configured in a single UE, and perform operations of multiplexing RLC PDUs to a MAC PDU and demultiplexing the RLC PDUs from the MAC PDU. Major functions of the MACs are summarized as follows:
Mapping between logical channels and transport channels
Multiplexing/demultiplexing of MAC SDUs belonging to one or different logical channels into/from transport blocks (TB) transferred to/from the physical layer on transport channels
Scheduling information reporting
Error correction through HARQ
Priority handling between logical channels of one UE
Priority handling between UEs by means of dynamic scheduling
MBMS service identification
Transport format selection
Padding The physical layers 4b-20 and 4b-25 perform operations of channel-coding and modulating upper layer data, generating an OFDM symbol, and transmitting the same through a wireless channel, or demodulating an OFDM symbol received through the wireless channel, channel-decoding the same, and transferring the same to the upper layer.

Figure 4C:
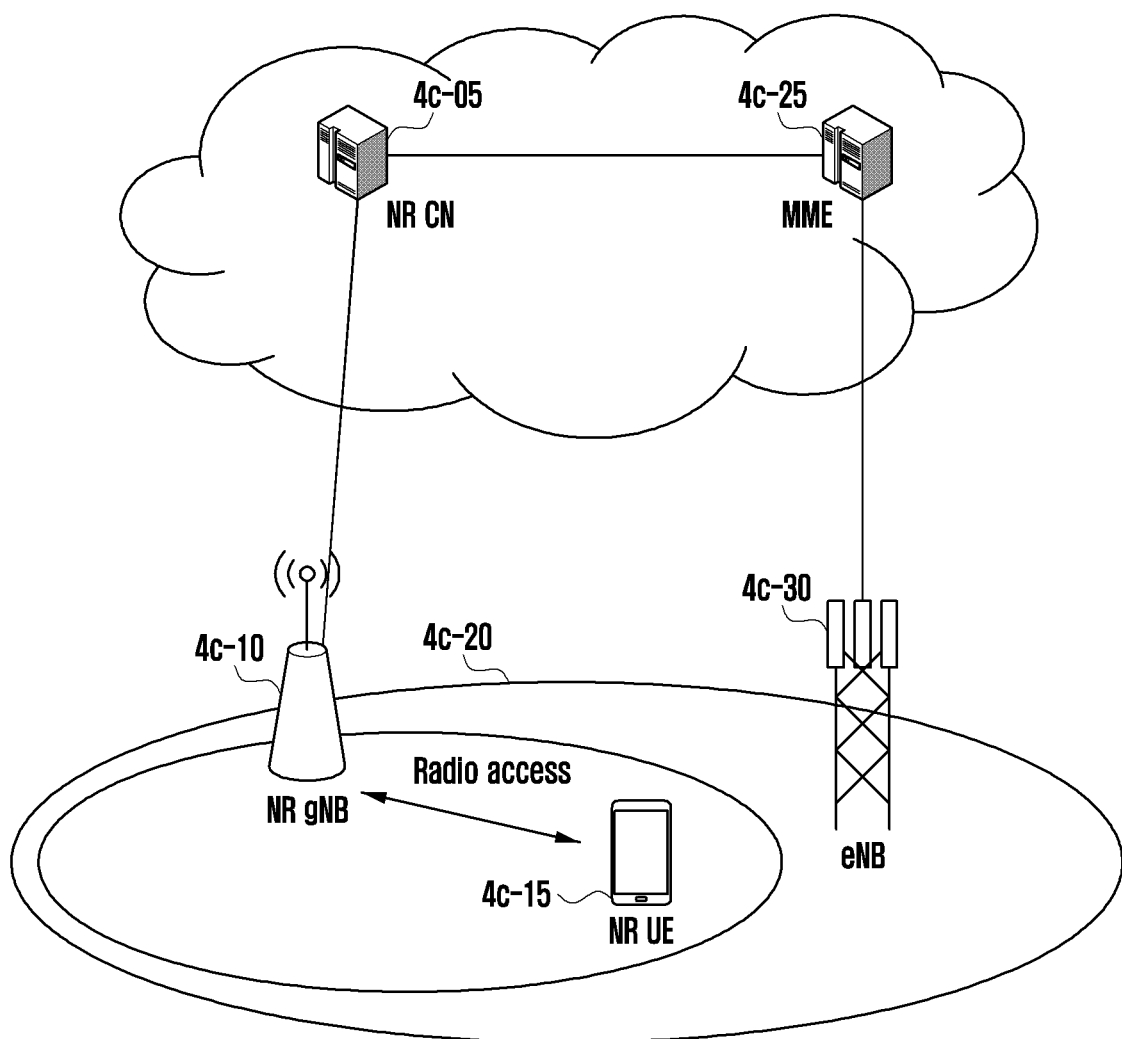
FIG. 4C a diagram illustrating the structure of a next-generation mobile communication system to which the disclosure may be applied.

FIG. 4C a diagram illustrating the structure of a next-generation mobile communication system to which the disclosure can be applied.

Referring to FIG. 4C, the radio access network of the next-generation mobile communication system (hereinafter, referred to as NR or 5G) includes a NR gNB or NR base station 4c-10 and a new radio core network (NR CN) 4c-05, as illustrated. A new radio user equipment (hereinafter, referred to as NR UE or terminal) 4c-15 accesses an external network through the NR gNB 4c-10 and the NR CN 4c-05.

In FIG. 4C, the NR gNB 4c-10 corresponds to an evolved Node B (eNB) of an existing LTE system. The NR gNB is connected to the NR UE 4c-15 through a wireless channel, and is capable of providing a better service than an existing node B. In the next-generation mobile communication system, all user traffics are provided through a shared channel, and there is accordingly a need for a device for aggregating and scheduling status information such as the buffer status of UEs, the available transmission power status, and the channel status, and the same is handled by the NR gNB 4c-10.

A single NR gNB normally controls multiple cells. In order to implement super-high data transmission compared with the current LTE, the next-generation mobile communication system may have at least the existing maximum bandwidth, and a beamforming technology may be additionally combined, based OFDM as a radio access technology. In addition, an AMC scheme is applied, which determines the modulation scheme and the channel coding rate according to the channel status of the UE. The NR CN 4c-05 performs functions such as mobility support, bearer configuration, and QoS configuration. The NR CN is a device in charge of not only the UE mobility management function, but also various control functions, and is connected to multiple base stations. In addition, the next-generation mobile communication system may interwork with an existing LTE system, and the NR CN is connected to an MME 4c-25 through a network interface. The MME is connected to an eNB 4c-30, which is an existing base station.

Figure 4D:
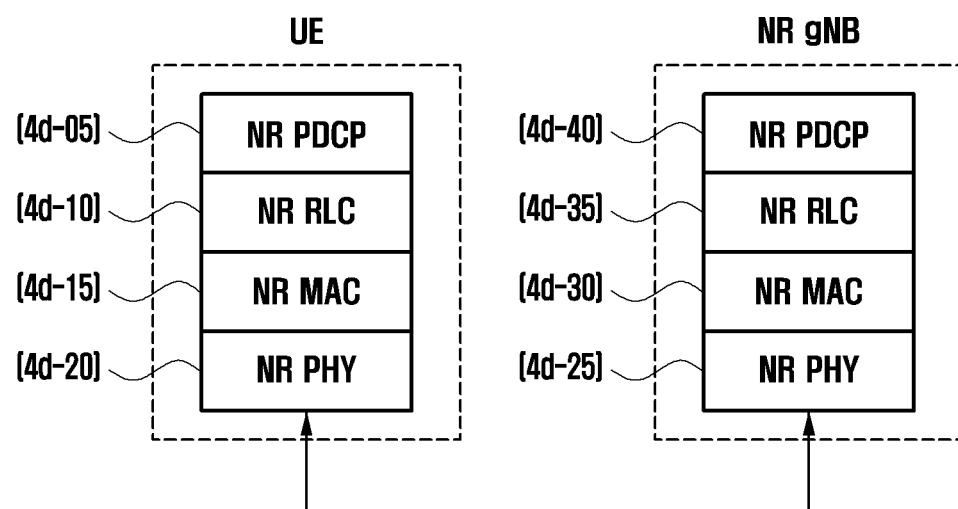
FIG. 4D a diagram illustrating a wireless protocol structure of a next-generation mobile communication system to which the disclosure may be applied.

FIG. 4D a diagram illustrating a wireless protocol structure in a next-generation mobile communication system to which the disclosure can be applied.

Referring to FIG. 4D, the wireless protocol of the next-generation mobile communication system includes NR PDCPs 4d-05 and 4d-40, NR RLCs 4d-10 and 4d-35, and NR MACs 4d-15 and 4d-30 in a UE and in a NR base station, respectively. Major functions of the NR PDCPs 4d-05 and 4d-40 may include some of the following functions:

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

The above-mentioned reordering of the NR PDCP device refers to a function of reordering PDCP PDUs received from the lower layer, based on a PDCP sequence number (SN), may include a function of delivering the reordered data to the upper layer, may include a function of recording PDCP PDUs that are lost as a result of reordering, may include a function of reporting the status of the lost PDCP PDUs to the transmitting side, and may include a function of requesting retransmission of the lost PDCU PDUs.

Major functions of the NR RLCs 4d-10 and 4d-35 may include some of the following functions:

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The above-mentioned in-sequence delivery of the NR RLC device refers to a function of delivering RLC PDUs received from the lower layer to the upper layer in a sequence. If a single RLC SDU has been segmented into multiple RLC SDUs and then received, the in-sequence delivery may include a function of reassembling and delivering the same. The in-sequence delivery may also include: a function of reordering received RLC PDUs with reference to the RLC sequence number (SN) or PDCP SN; a function of recording PDCP PDUs that are lost as a result of reordering; a function of reporting the status of the lost RLC PDUs to the transmitting side; and a function of requesting retransmission of the lost RLC PDUs. If there is a lost RLC SDU, the in-sequence delivery may include a function of delivering only RLC SDUs that precede the lost RLC SDU to the upper layer in a sequence. Alternatively, if a predetermined timer has expired although there is a lost RLC SDU, the in-sequence delivery may include a function of delivering all RLC SDUs received before the timer has started to the upper layer in a sequence. Alternatively, if a predetermined timer has expired although there is a lost RLC SDU, the in-sequence delivery may include a function of delivering all currently received RLC SDUs to the upper layer in a sequence. In addition, the RLC PDUs may be processed in the receiving order (in the arriving order, regardless of the sequence number) and delivered to the PDCP device regardless of the sequence (out-of-sequence delivery). In the case of segments, segments stored in a buffer or segments to be received later may be received such that the same are reconfigured into a single complete PLC PDU and delivered to the PDCP device. The NR RLC layer may not include the concatenation function, and the function may be performed in the NR MAC layer or replaced with a multiplexing function of the NR MAC layer.

The out-of-sequence delivery of the NR RLC device refers to a function of delivering RLC SDUs received from the lower layer directly to the upper layer regardless of the sequence. If a single RLC SDU has been segmented into multiple RLC SDUs and then received, the out-of-sequence delivery may include a function of reassembling and delivering the same. The out-of-sequence delivery may include a function of storing the RLC SN or PDCP SN of received RLC PDUs, reordering the same, and recording lost RLC PDUs.

The NR MACs 4d-15 and 4d-30 may be connected to multiple NR RLC layer devices configured in a single UE, and major functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 4d-20 and 4d-25 may perform operations of channel-coding and modulating upper layer data, turning the same into an OFDM symbol, and transmitting the same through a wireless channel, or demodulating an OFDM symbol received through the wireless channel, channel-decoding the same, and transferring the same to the upper layer.

Figure 4E:
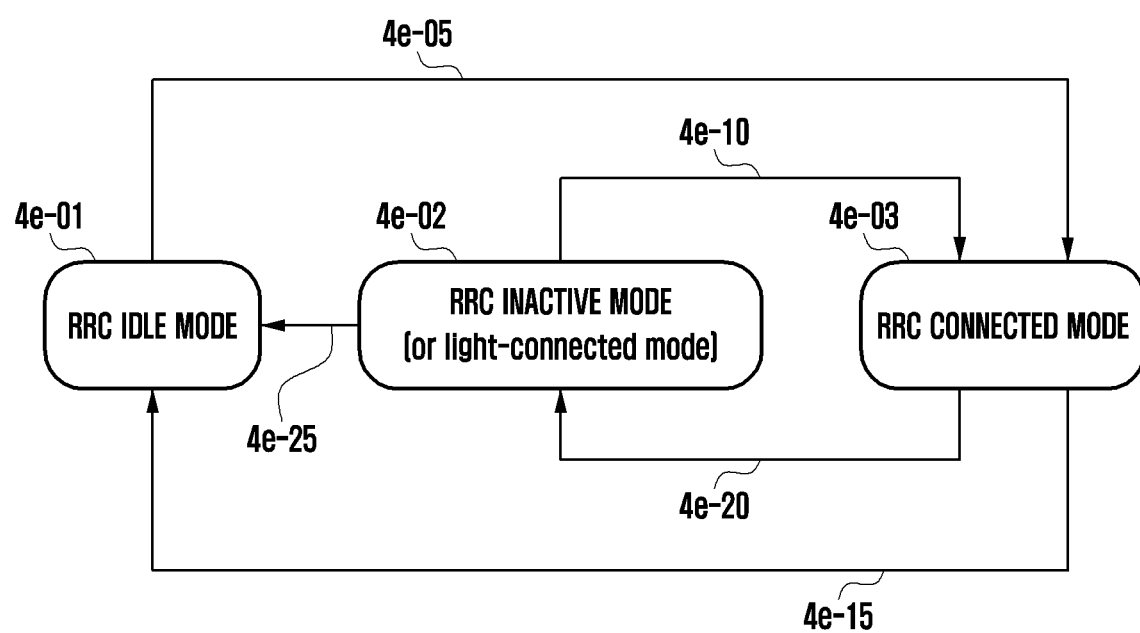
FIG. 4E is a diagram illustrating modes in which a UE may stay in a next-generation mobile communication system of the disclosure.

FIG. 4E is a diagram illustrating modes in which a UE may stay in a next-generation mobile communication system of the disclosure.

In FIG. 4E, the UE may stray in an RRC connected mode 4e-03, in an RRC inactive mode 4e-02 or a lightly-connected mode 4e-02, or in an RRC idle mode 4e-01, and may undergo processes of switching to respective different modes 4e-05, 4e-10, 4e-15, 4e-20, and 4e-25. More specifically, the UE in the RRC idle mode 4e-01 may switch to the RRC connected mode 4e-03 in order to configure connection with the network and to transmit/receive data, if data to be transmitted through the uplink is generated, if a paging message is received because downlink data has arrived, or in order to update the tracking area (periodically, or when moved out of the tracking area) (4e-05).

If no data is generated for a predetermined period of time after transmitting/receiving data, the UE in the RRC connected mode may switch to the RRC idle mode by means of the network (4e-15). In addition, if no data is generated for a predetermined period of time, the UE in the RRC connected mode 4e-03 may switch to the RRC inactive mode 4e-02 by means of the network or through voluntary mode switching, for the purpose of saving the battery and supporting fast connection (4e-20).

The UE in the RRC inactive mode 4e-03 may switch to the RRC connected mode 4e-03 in order to configure connection with the network and to transmit/receive data, if data to be transmitted through the uplink is generated, if a paging message is received because downlink data has arrived, or in order to update the tracking area (also referred to as RAN notification area) (periodically, or when moved out of the tracking area (or RAN notification area) (4e-10).

The UE in the RRC inactive mode 4e-03 may transition to the RRC idle mode 4e-1 according to an instruction from the network, according to a pre-promised configuration, or voluntarily (4e-25). The above operation needs to be supported because, if the network has many UEs in the RRC inactive mode, the signaling overhead of the network may be increased by a frequent RAN notification area update procedure.

A UE having a predetermined purpose may transmit data in the RRC inactive mode 4e-03 without having to transition to the RRC connected mode, may repeat a transition between the RRC inactive mode and the RRC idle mode according to the instruction from the network, and may transition to the RRC connected mode only in a necessary case. The above procedure is advantageous in that the UE in the RRC inactive mode, which transmits data in the RRC inactive mode, may have a very short transmission delay and may have a very small signaling overhead. The above-mentioned predetermined purpose may correspond to a case wherein, if the UE is to transmit only a small amount of data, the UE transmits data intermittently or periodically with a very long period.

In addition, the UE in the RRC idle model 4e-01 may instantly transition to the RRC inactive mode 4e-03 by means of the network, or may transition to the RRC inactive mode after transitioning to the RRC connected mode (4e-03 and 4e-20).

An additional inactive timer may be configured in the UE and then driven in order to solve the problem of state mismatch between the mode of the UE and the mode of the UE recognized by the network when the UE transitions between the modes described above. In addition, an additional inactive timer may also be driven in the base station.

In the disclosure, the RRC inactive mode and the lightly-connected mode may be interpreted as modes in the same state, and it may be assumed that the UE performs the same operation in these modes. In addition, although the RRC inactive mode and the lightly-connected mode may be interpreted as modes in the same state, it may be assumed that the UE performs different operations in respective modes. In addition, the RRC inactive mode and the lightly-connected mode may be interpreted as modes in different states, and it may be assumed that the UE performs different operations in respective modes. As such, the RRC inactive mode and the lightly-connected mode may have the same purpose in that a quick re-access is possible through a small amount of signaling, and the battery can be saved, but may be interpreted as identical modes or different modes, depending on implementation of the UE and the network and the definition thereof.

In addition, operations of the UE in the RRC inactive mode and the lightly-connected mode may be identical to operations in the RRC idle mode, may have additional functions, or may have only some functions among the operations in the RRC idle mode. As described above, there is an advantage in that, in the RRC inactive mode, the battery of the UE is saved and, when the UE connects to the network, quick connection can be configured with a small amount of signaling overhead. However, the UE in the RRC inactive mode needs to perform a procedure of updating the RAN notification area more frequently than when the UE in the RRC idle mode performs a procedure of periodically updating the tracking area.

Therefore, if the network has a large number of UEs in the RRC inactive mode, periodic RAN notification area update procedures may cause signaling overhead. Accordingly, the network needs to manage UEs in the RRC inactive mode and needs to be able to switch UEs in the RRC inactive mode to the RRC idle mode if necessary.

Figure 4F:
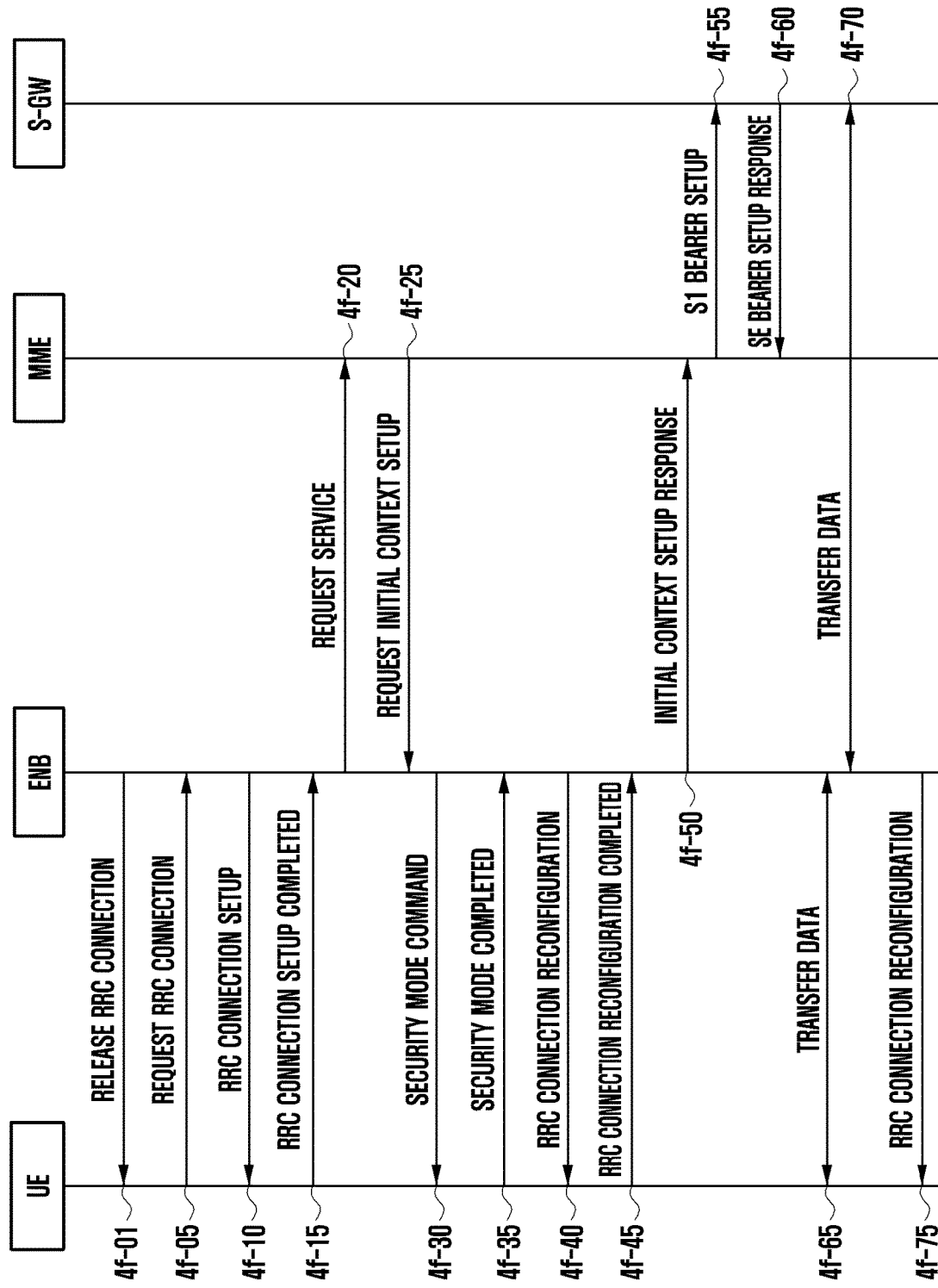
FIG. 4F is a diagram illustrating a procedure wherein a UE switches from an RRC connected mode to an RRC idle mode, and switches from the RRC idle mode to the RRC connected mode in the disclosure.

FIG. 4F is a diagram illustrating a procedure wherein a UE switches from an RRC connected mode to an RRC idle mode, and switches from the RRC idle mode to the RRC connected mode in the disclosure.

In FIG. 4F, if a UE transmitting/receiving data in the RRC connected mode does not transmit/receive data for a predetermined period of time or for a predetermined reason, the base station may transmit an RRCConnectionRelease message to the UE such that the UE switches to the RRC idle mode (4f-01).

If data to be transmitted is later generated, the UE currently having no configured connection (hereinafter, referred to as idle mode UE) performs an RRC connection establishment process with the base station. The UE establishes backward transmission synchronization with the base station through a random access process, and transmits an RRCConnectionRequest message to the base station (4f-05). The message contains the identifier of the UE, the reason to establish a connection (establishmentCause), and the like.

The base station transmits an RRCConnectionSetup message such that the UE establishes RRC connection (4f-10). The message contains RRC connection configuration information and the like.

The RRC connection is also referred to as SRB, and is used to transmit/receive an RRC message, which is a control message between the UE and the base station.

After configuring the RRC connection, the UE transmits an RRCConnectionSetupComplete message to the base station (4f-15). The message contains a control message (entitled SERVICE REQUEST) used by the UE to request the MME to configure a bearer for a predetermined service.

The base station transmits the SERVICE REQUEST message contained in the RRCConnectionSetupComplete message to the MME (4f-20), and the MME determines whether or not to provide the service requested by the UE.

If the MME determines to provide the service requested by the UE, the MME transmits an INITIAL CONTEXT SETUP REQUEST message to the base station (4f-25). The message includes information regarding the quality of service to be applied during DRB configuration, information regarding security to be applied to the DRB (for example, security key and security algorithm), and the like.

In order to configure security with the UE, the base station exchanges a SecurityModeCommand message (4f-30) and a SecurityModeComplete message (4f-35). After the security configuration is completed, the base station transmits an RRCConnectionReconfiguration message to the UE (4f-40).

The message includes information regarding configuration of the DRB by which user data is to be processed. The UE configures the DRB by applying the information, and transmits an RRCConnectionReconfigurationComplete message to the base station (4f-45).

After completing the DRB configuration with the UE, the base station transmits an INITIAL CONTEXT SETUP COMPLETE message to the MME (4f-50). After receiving the same, the MME exchanges an S1 BEARER SETUP message and an S1 BEARER SETUP RESPONSE message with the S-GW in order to configure an S1 bearer (4f-055 and 4f-60).

The S1 bearer is a connection for data transmission configured between the S-GW and the base station, and has one-to-one correspondence with the DRB. After all of the above processes are completed, the UE transmits/receives data with the base station through the S-WG (4f-65 and 4f-70).

As such, a normal data transmission process largely includes three steps of RRC connection configuration, security configuration, and DRB configuration. In addition, the base station may transmit an RRCConnectionReconfiguration message in order to make a new configuration for the UE, to add the same, or to change the same for a predetermined reason (4f-75).

As described above, many signaling procedures are necessary to switch from the RRC idle mode to the RRC connected mode. Therefore, an RRC inactive mode or a lightly-connected mode may be newly defined in the next-generation mobile communication system. Since the UE and the base station have context of the UE stored therein in such a new mode, and since the same may be maintaining an S1 bearer if needed, a faster access can be made through fewer signaling procedures.

Figure 4G:
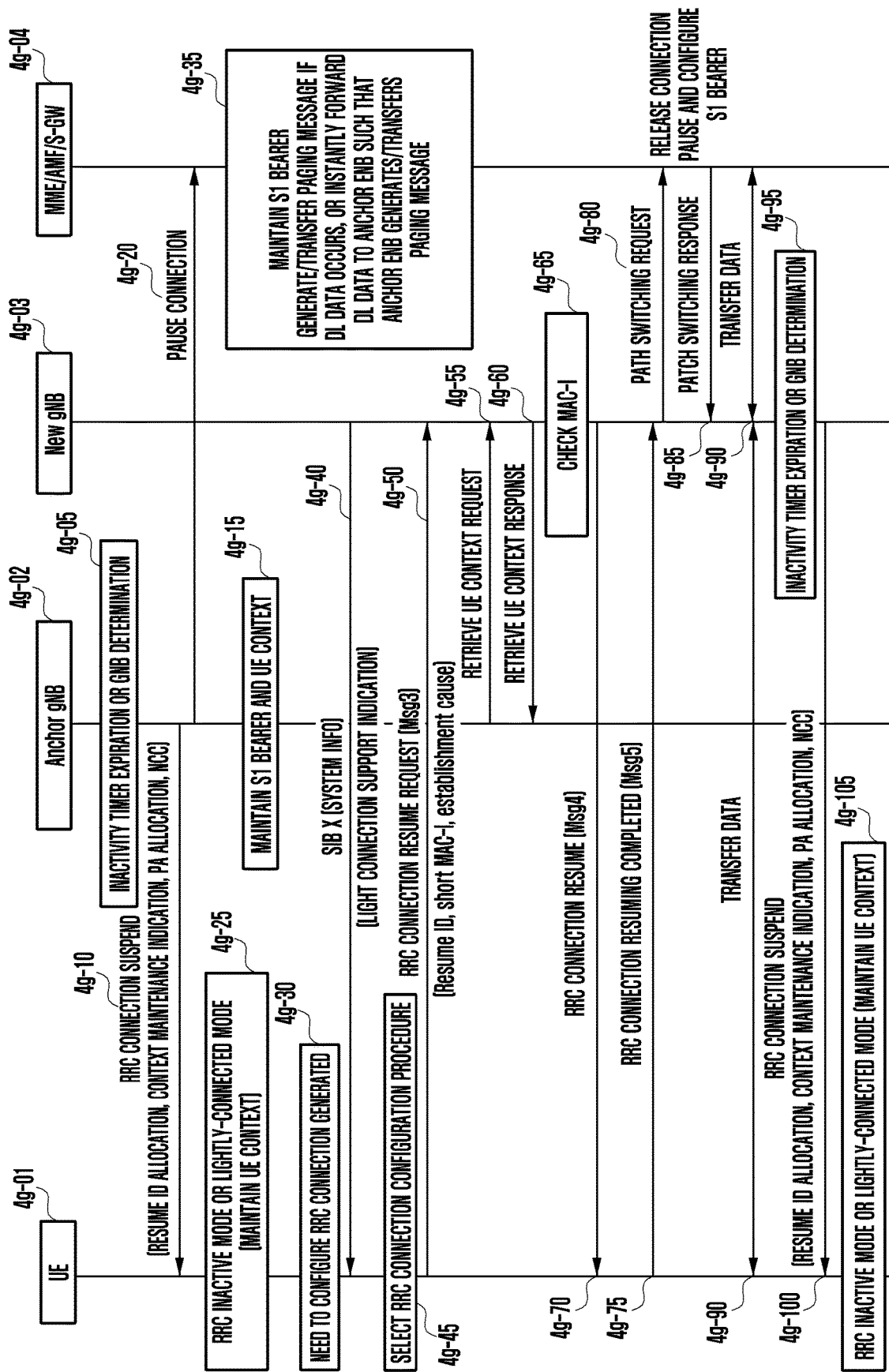
FIG. 4G is a diagram illustrating a procedure wherein a UE switches from an RRC connected mode to an RRC inactive mode (or lightly-connected mode), and a procedure wherein the UE switches from the RRC inactive mode (or lightly-connected mode) to the RRC connected mode in the disclosure.

FIG. 4G is a diagram illustrating a procedure wherein a UE switches from an RRC connected mode to an RRC inactive mode (or lightly-connected mode), and a procedure wherein the UE switches from the RRC inactive mode (or lightly-connected mode) to the RRC connected mode in the disclosure.

FIG. 4G illustrates the overall flow of a UE 4g-01, an anchor gNB 4g-02, a new gNB 4g-03, and an MME 4g-04 for performing a procedure of reusing UE context and an S1 bearer.

The UE 4g-01 in an RRC connected state transmits/receives data with the gNB. If data transmission/reception stops, the gNB may drive a predetermined timer. If data transmission/reception does not resume until the timer expires (4g-05), the gNB may consider releasing the RRC connection of the UE, and the gNB may determine whether to switch the UE to the RRC idle mode or to the RRC inactive mode according to a predetermined condition.

As the predetermined condition, the degree of network traffic, the amount of UE context that the network can maintain, the number of UEs for which the network can support a service, and the like may be considered.

In process 4g-10, the gNB may transmit an RRCConnectionRelease message, an RRCConnectionSuspend message, a newly defined RRC message, or another existing RRC message to the UE, after reusing the same, such that the UE transitions to the RRC inactive mode or lightly-connected mode. In 4g-10, the gNB may release the RRC connection of the UE according to a predetermined rule, may store UE context, may transmit a control message to the UE so as to instruct release of the RRC connection, may allocate a Resume ID, and may configure a paging area (PA) in which mobility is to be reported while the UE is in the lightly-connected mode. The Resume ID allocation may inform the UE that UE context needs to be stored. Alternatively, the gNB may add a separate context maintenance indication to the message so as to instruct the UE to operate in the RRC inactive mode/lightly-connected mode and to store UE context (4g-10). In addition, the message may include security information for updating security configuration necessary when the UE later performs an RRC connection resuming procedure. For example, the UE may have a NextHop-ChangingCount (NCC) allocated thereto in advance, and may calculate and configure a new security key (KeNB* or KgNB*) by using the same.

In addition, the control message may include the period of time for which the gNB is to maintain context, a list of cells to which a procedure of using stored context can be applied when the UE wants to reconfigure RRC connection within the effective period of time, or the like.

After releasing the RRC connection of the UE, the gNB does not change and maintains the UE context and the S1 bearer (4g-15). The S1 bearer refers to an S1-control bearer used to transmit/receive a control message between the gNB and the MME, and an S1-user plane bearer used to transmit/receive user data between the gNB and the S-GW. By maintaining the S1 bearer, it is possible to omit a procedure for S1 bearer configuration when the UE wants to configure RRC connection in the same cell or in the same gNB. If the effective period of time expires, the gNB may delete the UE context and release the S1 bearer. After receiving the RRCConnectionRelease message in step 4g-10, the UE switches to the RRC inactive mode/lightly-connected mode.

The above-mentioned anchor gNB refers to a gNB which manages and maintains UE context (resume ID) of the RRC inactive mode UE, and which manages the RAN paging area (or RAN notification area) in order to manage mobility of the RAN inactive mode UE. The role of the anchor gNB described above may be performed instead by an access and mobility management function (AMF) entity.

The gNB transmits a control message to the MME so as to request a connection pause (4g-20). If the MME receives the control message, and if downlink data related to the UE is generated in the S-GW, the MME may instantly transfer the downlink data to the anchor gNB, and may cause the anchor gNB to generate a paging message and to transfer the same to a neighboring gNB (4g-35). That is, after receiving the downlink data, the anchor gNB stores the data in the buffer and performs a paging procedure. The anchor gNB refers to a gNB maintaining the UE context of the UE and the S1-U bearer. Alternatively, if there is no response from the UE after the anchor gNB sent the paging message, in other words, if paging fails, the anchor gNB may request the MME to perform a paging procedure. The MME may request the S-GW not to transfer the downlink data related to the UE, which has been generated in the S-GW, to the gNB, and to initiate the paging procedure. The S-GW may operate accordingly (4g-35).

After receiving information indicating context maintenance and an RRCConnectionRelease message 4g-10 including Resume ID, the UE may release the RRC connection, may start a timer corresponding to an effective period of time, and may record an effective cell list in the memory. The UE maintains the current UE context in the memory without deleting the same (4g-25), and transitions to the lightly-connected mode. The above-mentioned UE context refers to various kinds of information regarding the RRC configuration of the UE, and includes SRB configuration information, DRB configuration information, security key information, and the like.

Thereafter, there occurs a need to configure RRC connection for an arbitrary reason (4g-30). If the UE has no Resume ID allocated thereto in the previous RRC connection release process, or if the UE has no indication that context is maintained, the UE initiates the normal RRC connection configuration procedure (FIG. 4F) described with reference to FIG. 4F. However, if the UE has Resume ID allocated thereto in the previous RRC connection release process and thus is in the RRC inactive mode/lightly-connected mode, the UE may attempt an RRC connection resuming process by using the stored UE context.

The UE in the RRC inactive mode/lightly-connected mode may perform a normal RRC connection configuration process (FIG. 4F), according to whether or not the network supports the RRC inactive mode/light connection, or may perform an RRC connection resuming process by using the stored UE context. In other words, if the RRC inactive mode/lightly connection mode is not supported, a normal RRC connection configuration process (FIG. 4F) may be performed, and, if the same is supported, an RRC connection resuming procedure may be performed as follows. The RRC inactive mode may be always supported by the network (therefore the system information may not separately inform whether or not the same is supported).

In the disclosure, each gNB or cell may insert an indication regarding whether or not each gNB or cell supports light connection to system information and then transmit the same to a UE. The indication may be included in the second block (systeminformation2) of the system information, or may be included in other blocks (system information1-19) of the system information. The fact that light connection is supported may mean that the following procedures 4g-50, 4g-55, 4g-60, 4g-65, 4g-70, 4g-75, 4g-80, 4g-85, and 4g-90 may be configured by the corresponding gNB or corresponding cell, and are supported thereby.

If there occurs a need to configure RRC connection, a UE in the lightly-connected mode reads system information of the cell on which the UE is currently camping. If the system information does not include the indication that the gNB or cell supports light connection (or RRC inactive mode), the UE may perform the normal RRC connection configuration process described with reference to FIG. 4F (4g-45).

However, if the system information includes the indication that the gNB or cell supports light connection (or RRC inactive mode), the UE may perform an RRC connection resuming process by using the stored UE context (4g-45). The RRC connection resuming process using the stored UE context is as follows:

The UE initially transmits a preamble to the gNB by using a first message in order to perform a random access procedure. If a resource can be allocated according to the preamble received through the first message, the gNB allocates a corresponding uplink resource to the UE by using a second message.

The UE transmits a ResumeRequest message (third message), including the Resume ID received in step 4g-10, based on the received uplink resource information (4g-50). The message may be a variant of the RRCConnectionRequest message or a newly defined message (for example, RRCConnectionResumeRequest).

If the UE in the lightly-connected mode disconnects from the existing anchor gNB 4g-02 and camps on a cell of another gNB, the new gNB 4g-03 may receive the Resume ID of the UE, may check the same, and may find out which gNB provided a service to the corresponding UE. If the new gNB 4g-03 has successfully received and checked the Resume ID, the new gNB 4g-03 performs a procedure of retrieving UE context from the existing gNB 4g-02 (context retrieve procedure, retrieve UE context request (4g-55), retrieve UE context response (4g-60)).

If the procedure of retrieving UE context fails because, for example, the new gNB cannot find any anchor/source gNB, or because no UE context exists, the gNB may transmit an RRCConnectionSetup message as in FIG. 4F instead of the RRCConnectionResume message 4g-70, and may fall back from the following bearer configuration procedure/security configuration procedure to the RRC connection configuration procedure illustrated with reference to FIG. 4F. In addition, the gNB may complete security configuration and cause the UE to switch to the RRC connected mode. Alternatively, the gNB may transmit an RRCConnectionSuspend message together with a new UE identifier (resume ID) and a RAN paging area such that the UE returns to the RRC inactive mode.

The new gNB 4g-03 may retrieve the UE context from the existing gNB 4g-02 through an S1 or X2 interface. (If the new gNB has received the Resume ID but has failed to identify the UE for a predetermined reason, the new gNB may transmit an RRCConnectionSetup message to the UE such that the UE returns to the normal RRC connection configuration procedure described with reference to FIG. 4F. In other words, the gNB may transmit the RRCConnectionSetup message to the UE, and the UE, after receiving the message, may send an RRCConnectionSetupComplete message to the gNB such that connection is configured. Alternatively, if the new gNB has received the Resume ID but has failed to identify the UE (for example, when failed to retrieve UE context from the existing anchor gNB), the gNB may transmit an RRCConnectionRelease message or an RRCConnectionReject message to the UE such that the UE rejects the connection and reattempts the normal RRC connection configuration procedure described with reference to FIG. 4F from the beginning.)

The new gNB checks MAC-I based on the retrieved UE context (4g-65). The MAC-I is a message authentication code calculated by the UE with regard to a control message by applying security information of the restored UE context, that is, by applying a security key and a security counter. The gNB checks the integrity of the message by using the MAC-I of the message, the security key and security counter stored in the UE context, and the like. In addition, the new gNB 4g-03 determines a configuration to be applied to the RRC connection of the UE, and transmits an RRCConnectionResume message (fourth message) containing the configuration information to the UE (4g-70).

The gNB may check the UE identifier (Resume ID), may cipher the RRCConnectionResume message by using a new security key (KeNB* or KgNB*), and may transmit the same. The UE may normally receive the RRCConnectionResume message by deciphering the same by using a new security key (KeNB* or KgNB*) calculated by using the NCC allocated in advance in step 4g-10. After the procedure of transmitting the RRC ConnectionResume message, the UE and the gNB may cipher the RRC message and data with the new security key and transmit/receive the same.

The RRCConnectionResume message may be a control message including a normal RRCConnectionRequest message and information indicating "RRC context reuse" (REUSE INDICATOR) inserted therein. The RRCConnectionResume message contains various kinds of information related to RRC connection configuration of the UE, as in the case of the RRCConnectionSetup message. If the UE receives a normal RRCConnectionSetup message, the UE configures RRC connection based on configuration information indicated in the RRCConnectionSetup message. However, if the UE receives an RRCConnectionResume message, the UE configures RRC connection (delta configuration) based on both configuration information stored therein and configuration information indicated by the control message. In summary, the UE may determine configuration information having indicated configuration information stored therein as delta information, thereby determining configuration information to be applied, and may update the configuration information or UE context. For example, if the RRCConnectionResume message includes SRB configuration information, an SRB is configured by applying the indicated SRB configuration information; and, if the RRCConnectionResume message includes no SRB configuration information, the SRB is configured by applying SRB configuration information stored in the UE context.

The UE configures RRC connection by applying the updated UE context and configuration information, and transmits an RRCConnectionResumeComplete message to the gNB (4g-75).

In addition, the gNB transmits a control message to the MME so as to request the same to release the connection pause, and request the same to reconfigure the S1 bearer as the new gNB (path switch request (4g-80), path switch response (4g-85)). After receiving the message, the MME instructs the S-GW to reconfigure the S1 bearer as the new gNB and to normally process data related to the UE. After the above process is completed, the UE resumes data transmission/reception in the cell (4g-90).

In the above procedure, if the UE has disconnected from the existing anchor gNB 4g-02, has been in the lightly-connected mode, has moved to a small extent, and has camped on the cell 4g-02 of the existing anchor gNB again, the existing anchor gNB 4g-03 may not perform the procedures of 4g-55 and 4g-60 and may only release the connection pause of the S1 bearer instead of the procedures of 4g-80 and 4g-85. Then, the existing anchor gNB may search for the UE context with reference to the Resume ID indicated in the third message, and may reconfigure connection, based on the same, in a similar method to the above procedures.

If data transmission/reception stops, the gNB drives a predetermined timer. If data transmission/reception does not resume until the timer expires (4g-95), the gNB considers releasing the RRC connection of the UE.

In process 4g-100, the gNB may transmit an RRCConnectionRelease message, an RRCConnectionSuspend message, a newly defined RRC message, or another existing RRC message to the UE, after reusing the same, such that the UE transitions to the RRC inactive state or lightly-connected state. In the process 4g-100, the gNB may release the RRC connection of the UE according to a predetermined rule, may store UE context, may transmit a control message to the UE so as to instruct release of the RRC connection, may allocate a new Resume ID, and may configure a RAN paging area (or RAN notification area) in which mobility is to be reported while the UE is in the RRC inactive mode (or lightly-connected mode) (4g-100). If the UE 4g-105 in the RRC inactive mode (lightly-connected mode) moves out of the configured RAN paging area, the UE performs a procedure of updating the RAN paging area.

FIG. 4H is a diagram illustrating a procedure wherein, if an RRC inactive mode UE moves out of a configured CN-based paging area (tracking area (TA)), the TA of the UE is updated in the disclosure.

In FIG. 4H, the UE 4h-01 may configure a tracking area or a CN-based paging area for a predetermined reason (4h-05). The tracking area or CN-based paging area may be indicated by a list of tracking area identifiers (IDs) or a list of new CN-based paging area identifiers.

The predetermined reason may be configured during a procedure wherein the UE initially accesses the network and configures UE connection, may be configured when the tracking area or paging area is updated periodically, or for other reasons.

The UE 4h-01 may configure the tracking area or paging area by receiving a TAU accept message by the MME in the procedure of configuring the tracking area or paging area. The TAU accept message may be included in the RRC message, and may be delivered to the UE while being included in DedicatedInfoNAS of an RRCConnectionReconfiguration message or a DLInformationTransfer message, for example.

The gNB 4h-03 may disconnect the UE for a predetermined reason (4h-10). The predetermined reason may be that the inactive timer has expired since there has been no data transmission/reception between the UE and the network for a predetermined period of time. The UE may return to the RRC inactive mode and move along the user's movement. The UE may move out of the configured tracking area or paging area due to mobility (4h-15). The UE may check the tracking area or paging area identifier from the current cell's system information (4h-20) and, if it is confirmed that the UE has moved out of the configured tracking area or paging area (4h-25), the UE may perform a procedure of updating the tracking area or paging area (4h-30).

The UE 4h-01 may transmit an RRCConnectionRequest message to the gNB in order to configure connection to a new gNB or cell 4h-02 and to update the tracking area or paging area (4h-35). The reason to configure RRC connection (establishmentCause) may be to configure mobile originated (mo)-signaling in the RRC message so as to attempt to update the tracking area or paging area. Alternatively, an indication that indicates RAN paging area update may be defined as the establishmentCause.

The gNB may transmit an RRCConnectionSetup message to the UE to allow RRC connection configuration (4h-40). In order to update the tracking area or paging area, the UE 4h-05 may insert a TAU request message into DedicatedInfoNAS of the RRCConnectionSetupComplete message and transmit the same (4h-45).

The gNB 4h-02 may transmit the TAU request message to the MME so as to request the same to update the tracking area or paging area (4h-50). If the MME 4h-04 receives the TAU request message and accepts tracking area or paging area update, the MME 4h-04 transmits a TAU accept message to the gNB 4h-02 (4h-55), and the gNB inserts the TAU accept message into the RRC message and transmits the same to the UE (4h-60).

The TAU accept message may include new tracking area or paging area information. The above-mentioned RRC message transmitted to the UE by the gNB may be an RRCConnectionReconfiguration message or a DLInformationTransfer message.

Figure 4I:
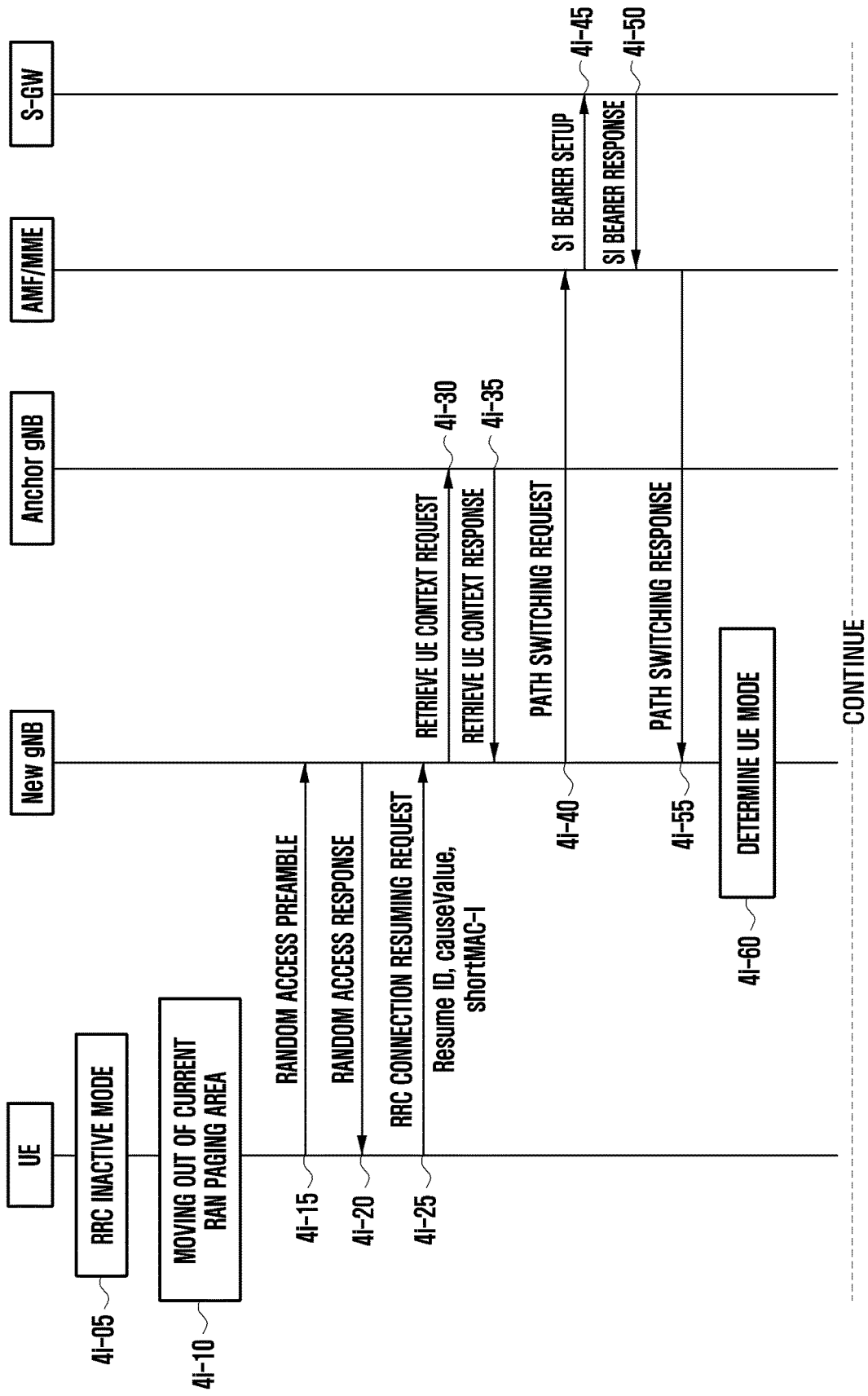
FIG. 4IA and FIG. 4IB are diagrams illustrating a RAN paging area update procedure performed when a UE in an RRC inactive mode (or lightly-connected mode) moves out of the currently configured RAN paging area, and a response thereto by a gNB, in the disclosure.

FIG. 4IA and FIG. 4IB are diagrams illustrating a RAN paging area update procedure performed when a UE in an RRC inactive mode (or lightly-connected mode) moves out of the currently configured RAN paging area, and a response thereto by a gNB, in the disclosure.

In FIG. 4IA and FIG. 4IB, if the UE 4i-05 in the RRC inactive mode moves out of the currently configured RAN paging area, the UE attempts to access the network in order to perform a RAN paging area update procedure. The UE first performs a random access procedure, first transmits a random access preamble (4i-15), and receives an RAR in response thereto in 4i-20.

After performing the random access procedure, the UE may insert a UE identifier (Resume ID), a connection cause indicator (cause Value, for example, new cause Value may be defined and used, such as ran NotificationAreaUpdateRequest), short MAC-I (indicator for verifying integrity of the message), and the like into an RRCConnectionResumeRequest message (third message), and may transmit the same.

The reason the RRCConnectionResumeRequest message is transmitted is that the gNB needs to be able to switch the UE mode if downlink data to the UE is generated in the gNB at a timepoint at which the UE attempts an access to update the RAN paging area, or if the UE needs to switch to the RRC connected mode for a predetermined reason.

After receiving the UE message in 4i-25, the gNB checks the resume ID, checks an existing anchor gNB having the resume ID, and sends the resume ID to the existing gNB, thereby performing a procedure of retrieving UE context related to the UE (4i-30 and 4i-35). In addition, a bearer path modification procedure may be performed to change the bearer path to the new gNB accessed by the UE (4i-40, 4i-45, 4i-50, and 4i-55). The gNB may omit the bearer path modification procedures 4i-40, 4i-45, 4i-50, and 4i-55 in order to quickly update only the RAN paging area of the UE.

If the gNB determines to maintain the UE in the RRC inactive mode in step 4i-60, or if there is no downlink data to the UE, the gNB may insert a new resume ID, new RAN paging area information (RPA info.), security configuration information (NexthopChanging Counter (NCC)), and the like into an RRCConnectionSuspend message and transmit the same to the UE, in order to update the RAN paging area of the UE, such that the UE remains in the RRC inactive mode (4i-65).

The above-mentioned RAN paging area configuration information may include a list of cell IDs, a RAN paging area ID, or information indicating a tracking area. In addition, the RAN paging area information may be delta signaling. That is, the gNB may instruct to reuse RAN paging area information that has been used, or may add information for adding or deleting a part of the area/cell ID from the existing RAN paging area. The above-mentioned security configuration information may be applied to generate a new security key, and may be used to decipher the RRC message from the gNB during a following RRC connection configuration process and to verify the integrity thereof.

The gNB may confirm whether or not there is downlink data to the UE in step 4i-60 and, if downlink data exists, or if the UE needs to switch to the RRC connected mode for a predetermined reason (for example, the network resource is sufficient to manage the UE in the RRC connected mode), the gNB may transmit an RRCConnectionResume message to the UE so as to attempt to switch the UE to the RRC connected mode.

The RRCConnectionResume message may be transmitted after ciphering the same with a new security key and verifying the integrity thereof. The UE may calculate the new security key by using security configuration information (for example, NCC) configured by the previous gNB when switching the UE to the RRC inactive mode by an RRCConnectionSuspend message. Then, the UE may decipher the RRCConnectionResume message, may perform integrity verification, and may receive the same.

After receiving the RRCConnectionResume message, the UE may transmit an RRCConnectionResumeComplete message, which indicates connection configuration completion, to the gNB in order to switch to the RRC connected mode, and may then switch to the RRC connected mode (4i-70).

The gNB may confirm in step 4i-60 whether or not there is downlink data to the UE and, if there is no downlink data, and if the UE needs to switch to the RRC idle mode for a predetermined reason, the gNB may perform procedure 4i-75. The predetermined reason may be that the network has insufficient resources, the UE context is no longer valid, or the current cell has too many RRC inactive mode UEs.

The gNB may transmit an RRCConnectionReject message or an RRCConnectionRelease message to the UE such that the UE transitions to the RRC idle mode (4i-75). The RRCConnectionReject message or RRCConnectionRelease message may include indications instructing the UE to transition from the RRC inactive mode to the RRC idle mode.

Figure 4J:
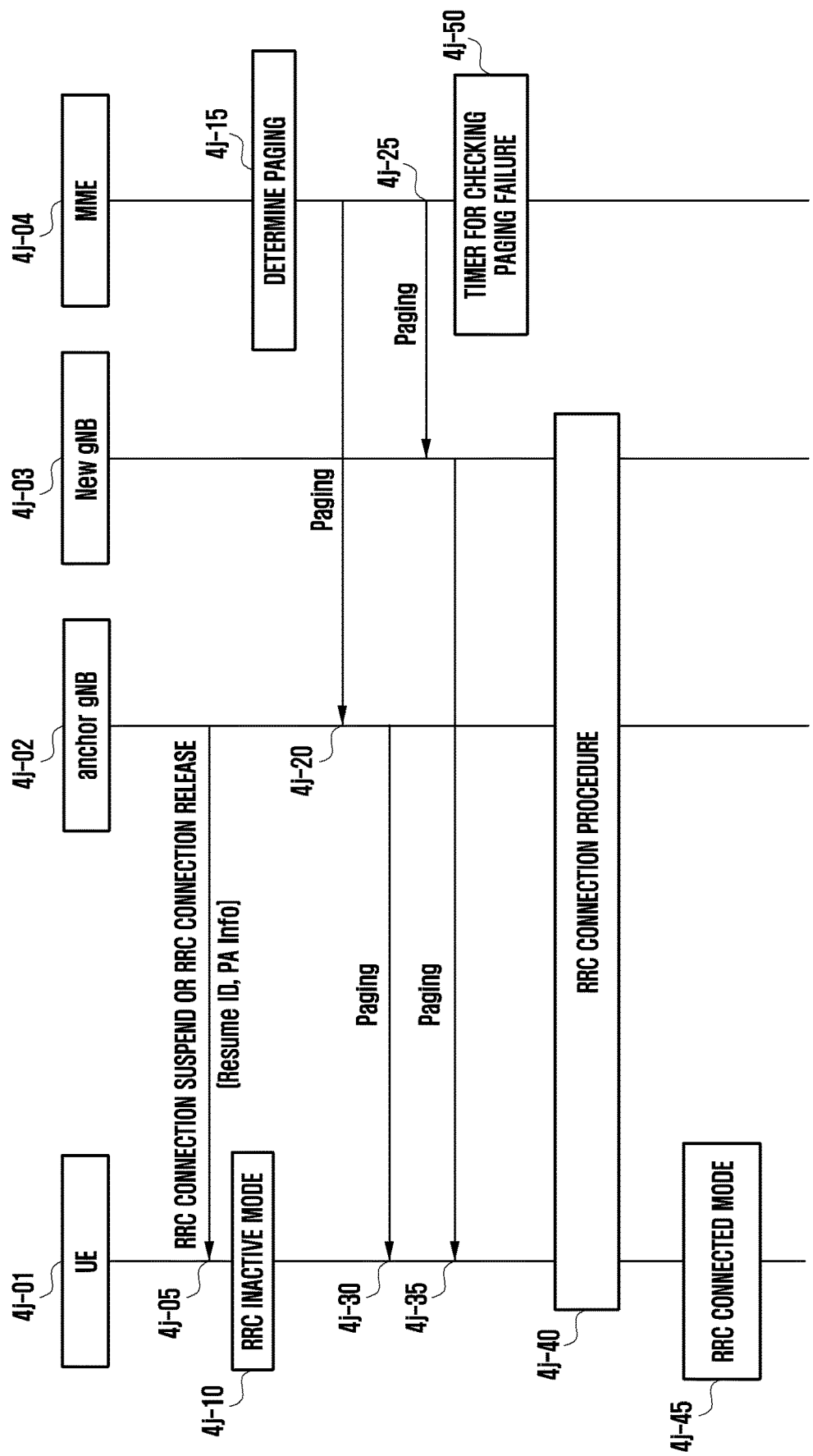
FIG. 4J is a diagram illustrating a procedure wherein a network MME (or a predetermined network entity) transmits a CN paging message to a UE in the disclosure.

FIG. 4J is a diagram illustrating a procedure wherein a network MME (or a predetermined network entity) transmits a CN paging message to a UE in the disclosure.

FIG. 4J is a diagram illustrating a procedure wherein, if the role of transmitting a paging message in a network that supports an RRC inactive mode is played not by an anchor gNB, but by an MME as in the case of an LTE system, the MME transmits paging to a UE for a predetermined reason.

In FIG. 4J, a UE in an RRC connected state performs data transmission/reception with a gNB. If the data transmission/reception stops, the gNB starts a predetermined timer. If the data transmission/reception does not resume until the timer expires, the gNB considers transitioning the UE to an RRC inactive mode.

The gNB releases the RRC connection of the UE according to a predetermined rule, stores UE context, transmits a control message to the UE so as to instruct release of the RRC connection, allocates a Resume ID (UE context identifier), and configures a paging area (PA) in which mobility is to be reported while the UE is in the RRC inactive mode. The Resume ID allocation may inform the UE that UE context needs to be stored. Alternatively, the gNB may transmit a separate context maintenance indication so as to instruct the same (4j-05). The control message may include the period of time for which the gNB is to maintain context, a list of cells to which a procedure of using stored context can be applied when the UE wants to reconfigure RRC connection within the effective period of time, or the like. After releasing the RRC connection of the UE, the gNB does not change and maintains the UE context and the S1 bearer.

After receiving the RRCConnectionRelease message 4j-05, the UE switches to the RRC inactive mode (4j-10). The RRCConnectionRelease message may be an RRCConnectionSuspend message, an RRCConnectionRelease message, or a newly defined RRC message.

If the MME has determined to transmit a paging message to the RRC inactive mode UE for a predetermined reason (4*j*-15), the MME transmits a paging message such that the UE switches to the RRC connected mode (4*j*-20, 4*j*-25, 4*j*-30, and 4*j*-35). The MME can know the paging area of the UE because the MME receives a report of the paging area (or tracking area) of the UE every time the UE moves and updates the paging area.

After receiving the paging message, the UE transmits an RRCConnectionRequest message to a new gNB in order to request connection, performs the normal RRC connection request procedure described with reference to FIG. 4F (4*j*-40), and transitions to the RRC connected mode (4*j*-45).

In the above procedure, the MME (or a specific entity of the network) may start a timer to check whether the paging message transmitted to the RRC inactive mode UE has failed or not (4*j*-50). That is, if there is no response from the UE until the timer expires, if the UE does not attempt to resume connection, or if the UE does not transition to the connected mode, the MME may determine that the paging related to the UE has failed.

If it is determined that paging has failed, the MME may repeatedly transmit the paging message a predetermined number of times until paging succeeds.

Figure 4K:
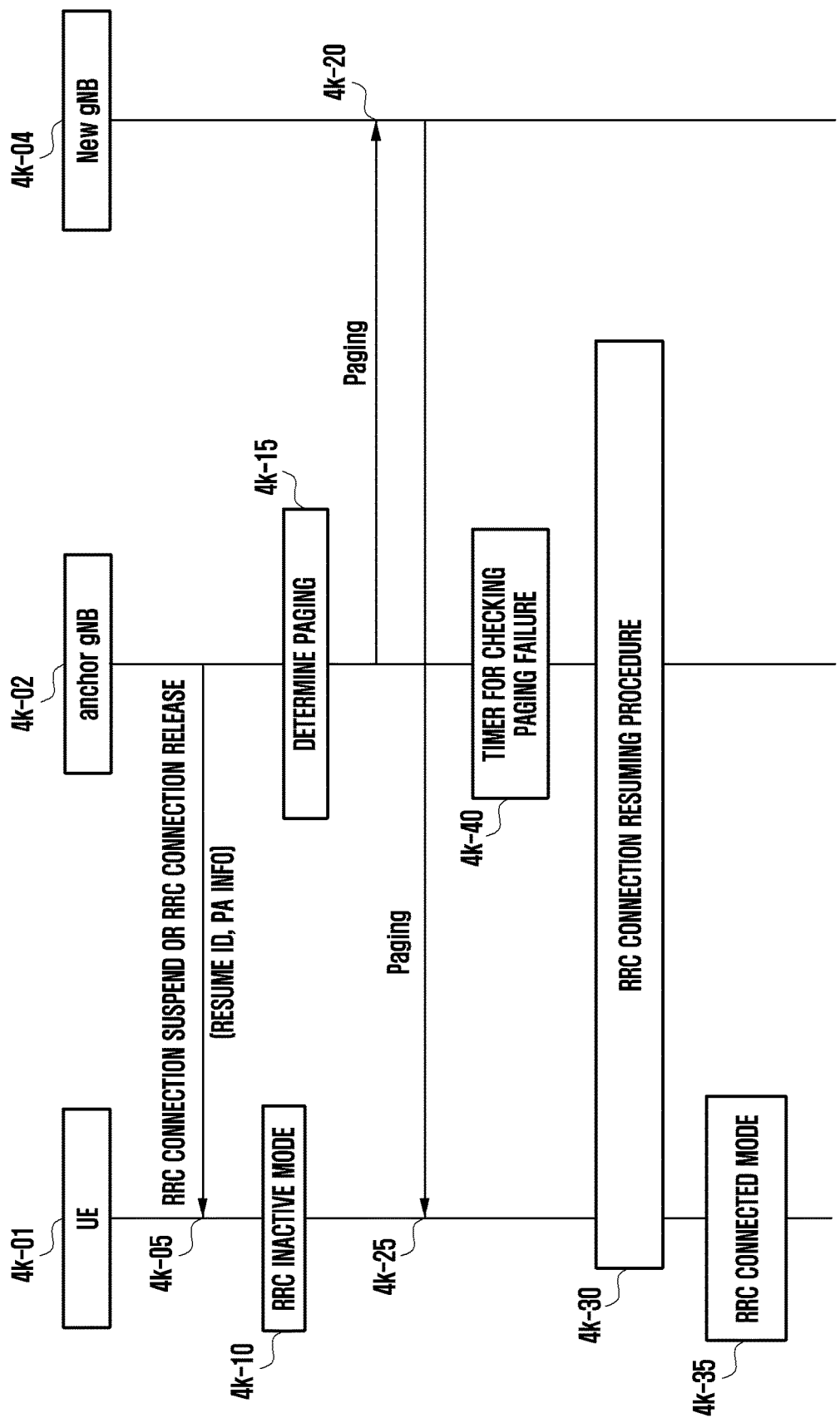
FIG. 4K is a diagram illustrating a procedure wherein an anchor gNB transmits a RAN paging message to an RRC inactive mode UE outside the cell area of the anchor gNB in the disclosure.

FIG. 4K is a diagram illustrating a procedure wherein an anchor gNB transmits a RAN paging message to an RRC inactive mode UE outside the cell area of the anchor gNB in the disclosure.

In FIG. 4K, a UE in an RRC connected state performs data transmission/reception with the gNB. If the data transmission/reception stops, the gNB starts a predetermined timer. If the data transmission/reception does not resume until the timer expires, the gNB considers releasing the RRC connection of the UE. The gNB releases the RRC connection of the UE according to a predetermined rule, stores UE context, transmits a control message to the UE so as to instruct release of the RRC connection, allocates a Resume ID (UE context identifier), and configures a paging area (PA) in which mobility is to be reported while the UE is in the RRC inactive mode. The Resume ID (UE context ID) allocation may inform the UE that UE context needs to be stored. Alternatively, the gNB may transmit a separate context maintenance indication so as to instruct the same (4*k*-05).

The control message may include the period of time for which the gNB is to maintain context, a list of cells to which a procedure of using stored context can be applied when the UE wants to reconfigure RRC connection within the effective period of time, or the like. After releasing the RRC connection of the UE, the gNB does not change and maintains the UE context and the S1 bearer.

After receiving the RRCSuspend message or the RRCConnectionRelease message 4*k*-05, the UE switches to the RRC inactive mode (4*k*-10). The anchor gNB may transmit a paging message to the UE in the RRC inactive mode for a predetermined reason. The predetermined reason may be that downlink data to be transmitted to the UE has been generated. The anchor gNB refers to a gNB maintaining the UE context of the UE and the S1-U bearer.

If the anchor gNB has determined to transmit a paging message to the RRC inactive mode UE (4*k*-15), the MME transmits a paging message so as to request the UE to switch to the RRC connected mode such that the UE can receive the same (4*k*-20 and 4*k*-25). The anchor gNB may transmit the paging message to all gNBs belonging to the paging area (4*k*-20). The anchor gNB can know the paging area of the UE because the gNB receives a report of the paging area of the UE every time the UE moves and updates the paging area. After receiving the paging message, the UE transmits an RRCConnectionResume message to a new gNB in order to resume connection, performs the normal RRC connection resuming procedure described with reference to FIG. 4G (4*k*-30), and transitions to the RRC connected mode (4*k*-35).

In the above procedure, the anchor gNB may start a timer to check whether the paging message transmitted to the RRC inactive mode UE has failed or not (4*k*-40). That is, if there is no response from the UE until the timer expires, if the UE does not attempt to resume connection, or if the UE does not transition to the connected mode, the anchor gNB may determine that the paging related to the UE has failed.

If it is determined that paging has failed, the anchor gNB may repeatedly transmit the paging message a predetermined number of times until paging succeeds. Alternatively, the gNB may request the MME (Or specific entity of the network) to perform core network (CN)-based paging. The CN-based paging refers to the paging procedure performed by the MME in FIG. 4J.

FIG. 4L is a diagram illustrating a procedure performed when an anchor gNB transmits a RAN paging message to an RRC inactive mode UE and fails in the disclosure.

In FIG. 4L, a UE in an RRC connected state performs data transmission/reception with the gNB. If the data transmission/reception stops, the gNB starts a predetermined timer. If the data transmission/reception does not resume until the timer expires, the gNB considers releasing the RRC connection of the UE. The gNB releases the RRC connection of the UE according to a predetermined rule, stores UE context, transmits a control message to the UE so as to instruct release of the RRC connection, allocates a Resume ID (UE context identifier), and configures a paging area (PA) in which mobility is to be reported while the UE is in the RRC inactive mode. The Resume ID (UE context ID) allocation may inform the UE that UE context needs to be stored. Alternatively, the gNB may transmit a separate context maintenance indication so as to instruct the same (4*l*-05).

The control message may include the period of time for which the gNB is to maintain context, a list of cells to which a procedure of using stored context can be applied when the UE wants to reconfigure RRC connection within the effective period of time, or the like. After releasing the RRC connection of the UE, the gNB does not change and maintains the UE context and the S1 bearer.

After receiving the RRCConnectionRelease message 4*l*-05, the UE switches to the RRC inactive mode (4*l*-10). The anchor gNB may transmit a paging message to the UE in the RRC inactive mode for a predetermined reason. The predetermined reason may be that downlink data to be transmitted to the UE has been generated. The anchor gNB refers to a gNB maintaining the UE context of the UE and the S1-U bearer.

If the anchor gNB has determined to transmit a paging message to the RRC inactive mode UE (4*l*-15), the MME transmits a paging message so as to request the UE to switch to the RRC connected mode such that the UE can receive the same (4*l*-20 and 4*l*-25). The anchor gNB may transmit the paging message to all gNBs belonging to the paging area (4*l*-20). The anchor gNB can know the paging area of the UE because the gNB receives a report of the paging area of the UE every time the UE moves and updates the paging area.

In the above procedure, the anchor gNB may start a timer to check whether the paging message transmitted to the RRC inactive mode UE has failed or not (4*l*-30). That is, if there is no response from the UE until the timer expires, if the UE does not attempt to resume connection, or if the UE does not transition to the connected mode, the anchor gNB may determine that the paging related to the UE has failed.

If it is determined that paging has failed, the anchor gNB may repeatedly transmit the paging message a predetermined number of times until paging succeeds. Alternatively, the gNB may request the MME (Or specific entity of the network) to perform CN-based paging (4*l*-40). The CN-based paging refers to the paging procedure performed by the MME in FIG. 4J.

If the MME has received the paging request message 4*l*-45 and has determined to transmit a paging message to the RRC inactive mode UE (4*l*-45), the MME transmits a paging message such that the UE switches to the RRC connected mode (4*l*-50, 4*l*-55, 4*l*-60, and 4*l*-65). The MME can know the paging area (or tracking area) of the UE because the MME receives a report of the paging area of the UE every time the UE moves and updates the paging area. The MME may request all gNBs belonging to the paging area (or tracking area) related to the UE to transmit a paging message. After receiving the paging message, the UE transmits an RRCConnectionRequest message to a new gNB in order to request connection, performs the normal RRC connection request procedure described with reference to FIG. 4F (4*l*-70), and transitions to the RRC connected mode (4*l*-75).

The UE may receive the paging message by the anchor gNB or MME (specific entity of the network) as in FIG. 4J, FIG. 4K, and FIG. 4L. After receiving the paging message, the UE may check the Resume ID or CN-based ID (for example, UE recognizing ID such as S-TMSI or IMSI) included in the paging message. If the received paging message has the Resume ID (determines that the paging message has been received from the anchor gNB), the UE may perform the RRC connection resuming procedure as in FIG. 4G. If the received paging message has the CN-based ID (determines that the paging message has been received from the MME), the UE may transition to the idle mode and perform the normal RRC connection procedure as in FIG. 4F.

If downlink data to be transmitted in the network is generated in a UE that is in the RRC inactive mode in the next-generation mobile communication system, the MME (or CN) or the gNB may transmit a paging message to UEs so as to inform the RRC inactive mode UE that the same needs to re-access the network. There may be two kinds of paging messages.

The first is a RAN paging message transmitted from the anchor gNB (described with reference to FIG. 4K), and the second is a CN paging message transmitted from the MME or CN (described with reference to FIG. 4J).

After receiving the RAN paging message, the UE may perform an RRC connection resuming procedure (described with reference to FIG. 4G) in order to quickly access the network by using UE context stored by the UE. However, if the UE receives the CN paging message, the UE determines that the UE context has been erased or lost in the network, erases the context, returns to the RRC idle mode, and performs a normal RRC connection configuration procedure (described with reference to FIG. 4F) instead of quick connection configuration.

The UE may receive the paging message by the anchor gNB or MME (specific entity of the network) as in FIG. 4J, FIG. 4K, and FIG. 4L. After receiving the paging message, the UE may check the Resume ID or CN-based ID (for example, UE recognizing ID such as S-TMSI or IMSI) included in the paging message. If the received paging message has the Resume ID (determines that the paging message has been received from the anchor gNB), the UE may perform the RRC connection resuming procedure as in FIG. 4G. If the received paging message has the CN-based ID (determines that the paging message has been received from the MME), the UE may transition to the RRC idle mode and perform the normal RRC connection procedure as in FIG. 4F.

However, there may be several reasons to transmit the CN paging message. Specifically, the CN may transmit the paging message because the accurate position of the UE in the network is not identified, because the RAN paging message failed such that the MME or CN retransmitted the paging message, because the UE moved to another radio access technology network, or because the network really does not have UE context any longer. There is a problem in that, if the UE erases UE context and returns to the RRC idle mode because the network sent the CN paging message, except the case in which the network really does not have UE context any longer, all advantages of the RRC inactive mode are lost.

Therefore, the CN paging message includes an indication for indicating the reason to transmit paging (or paging-Cause) in the disclosure such that the UE can recognize the intent of the CN paging message. In other words, even if the UE has received the CN paging message, the UE is not supposed to perform operations of instantly deleting UE context and transitioning to the RRC idle mode. The UE is configured to check the indication included in the CN paging message (or pagingCause) and to determine, according to the checking result, whether to maintain the UE context and to maintain the RRC inactive mode or to delete the UE context and to transition to the RRC idle mode.

A (4-1)th embodiment of detailed operations of a network which transmits a paging message to an RRC inactive mode UE, and operations of a UE that received the paging message in the disclosure, is as follows:

In the (4-1)th embodiment, even if the RRC inactive mode UE moves to a different radio access technology (inter-RAT) or actually chooses a different radio access technology, the RRC inactive mode UE does not perform a tracking area update procedure or a RAN paging area update procedure as long as the same does not move out of the configured tracing area (TA) or the RAN paging area (or RAN notification area). In addition, if downlink data is generated, the network may send a paging message to the UE.

The operation of the network in the (4-1)th embodiment is as follows:
- If a first condition is satisfied, an anchor gNB or an entity that manages the RAN paging area in the network transmits a first paging message to the UE;
- If a second condition is satisfied, an MME or an entity that manages the tracking area transmits a second paging message to the UE; and
- If a third condition is satisfied, the MME or the entity that manages the tracking area transmits a third paging message to the UE.

The first condition corresponds to a case in which the network knows in which RAN paging area the UE is, and stores UE context. In this case, the anchor gNB or the entity that manages the RAN paging area sends a first paging message to a cell corresponding to the RAN paging area.

The first paging message includes a resume ID as a UE identifier.

The second condition corresponds to a case in which the network no longer has the UE context, the network has determined not to support the UE in the RRC inactive mode any longer (possibly because the network does not know the RAN paging area of the UE), or the network wants to transition the UE to the RRC idle mode.

The second paging message includes S-TMSI or IMSI as a UE identifier, and includes an indication instructing the UE to delete the UE context and to transition to the RRC idle mode (pagingCause).

The third condition corresponds to a case in which the network has the UE context and has determined to support the UE in the RRC inactive mode, to a case in which the network sent a paging message in the tracking area without accurately positioning the UE (that is, without knowing the RAN paging area of the UE), but wants to support the RRC inactive mode with UE context, or to a case in which the network sent a RAN paging message but failed, and wants to retransmit CN paging (support the UE in the RRC inactive mode).

The third paging message includes S-TMSI or IMSI as a UE identifier, and includes an indication instructing the UE to maintain the UE context and to remain in the RRC inactive mode (pagingCause).

The first paging message may correspond to a RAN paging message, and the second paging message and the third paging message may correspond to CN paging messages.

In addition, the second paging message and the third paging message may have the following structure:

```
CN-PagingCause ::= ENUMERATED {
terminatingSignalling,
(indicate that network no longer has UE context, so UE transitions to RRC idle
mode)
releaseConnection,
(indicate that network has UE context but does not know RAN paging area of UE,
thus sent CN paging message, or indicate that network supports UE context and
inactive mode)
}
PagingRecord ::= SEQUENCE
Ue-Identity PagingUE-Identity,
cn-Domain ENULERATED {pas, cs},
cn-pagingCause OPTIONAL
...
}
PagingUE-Identity::=CHOICE{
s-TMSI ,
imsi IMSI,
...
}
```

As described above, pagingCause may be transmitted while being included in the CN paging message. An indication having predetermined bits may be used to indicate that the network no longer has the UE context, to indicate that the UE needs to transition to the RRC idle mode, to indicate that the network has UE context but does not know the RAN paging area of the UE and thus sent the CN paging message, or to indicate that the network supports UE context and the inactive mode. For example, one-bit indication may indicate the same by 0 or 1.

Operations of the UE in the first embodiment are as follows:
The UE receives a paging message and checks the paging message;
The UE performs a first operation if a first condition is satisfied;
The UE performs a second operation if a second condition is satisfied; and
The UE performs a third operation if a third condition is satisfied.

The first condition corresponds to a case in which the received paging message includes Resume ID. The UE determines that a paging message has been received from the anchor gNB, and performs, as the first operation, an RRC connection resuming procedure as in FIG. 4G.

The second condition corresponds to a case in which the received paging message includes a CN-based ID (S-TMSI or IMSI), the network has no UE context, and the received paging message includes an indication instructing a transition to the RRC idle mode. The UE may determine that a paging message has been received from the MME and, as the second operation, may delete the UE context, transition to the RRC idle mode, and perform a normal RRC connection procedure as in FIG. 4F.

The third condition corresponds to a case in which the received paging message includes a CN-based ID (S-TMSI or IMSI), the network has UE context, and the received paging message includes an indication instructing the same to maintain the RRC inactive mode. The UE determines that a paging message has been received from the MME and, as the third operation, maintains the UE context and performs a normal RRC connection resuming procedure as in FIG. 4F in the RRC inactive mode.

Figure 4M:
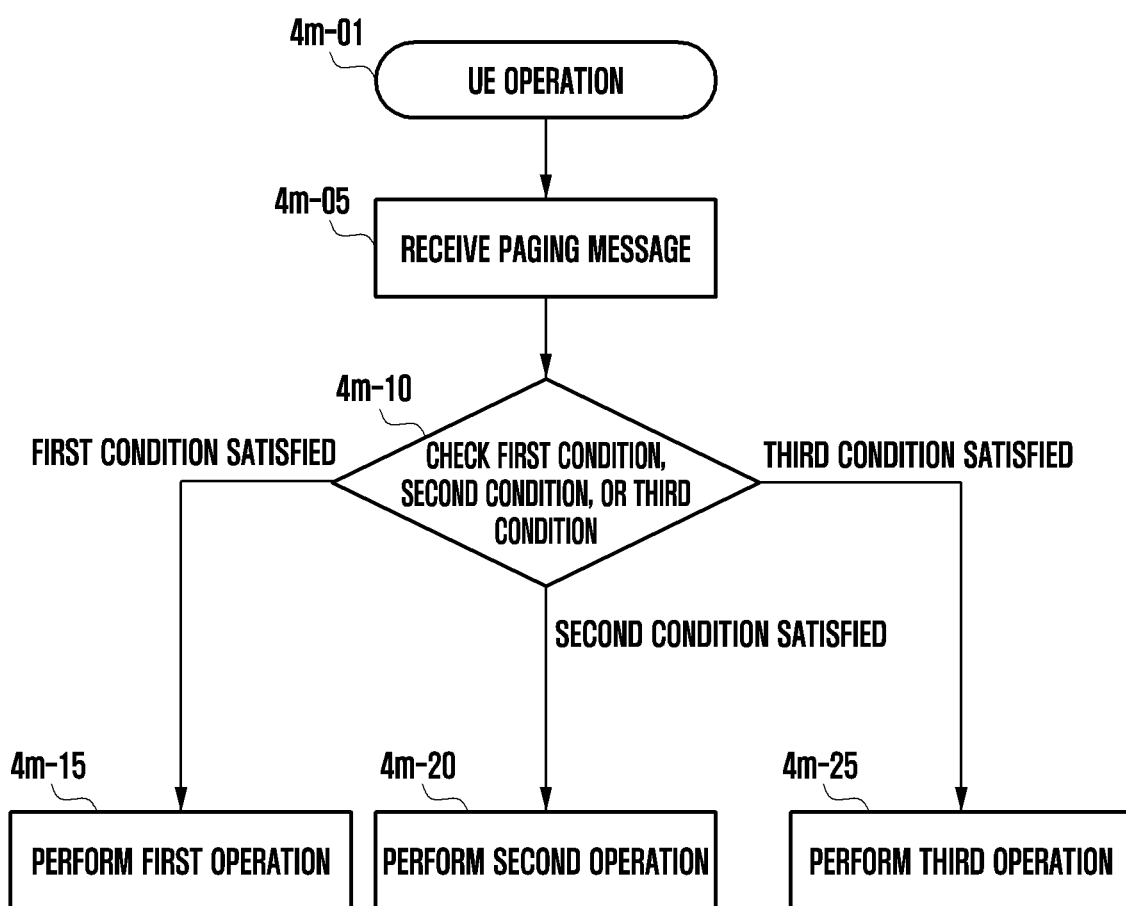
FIG. 4M illustrates operations of a UE described in the (4-1)th embodiment of the disclosure.

FIG. 4M illustrates operations of a UE described in the (4-1)th embodiment of the disclosure.

In FIG. 4M, the UE 4m-01 may receive a paging message (4m-05) and check the paging message (4m-10).

The UE performs a first operation if a first condition is satisfied as a result of checking the paging message (4m-15). The UE performs a second operation if a second condition is satisfied (4m-20). The UE performs a third operation if a third condition is satisfied (4m-25).

The first condition corresponds to a case in which the received paging message includes Resume ID. The UE determines that a paging message has been received from the anchor gNB, and performs, as the first operation, an RRC connection resuming procedure as in FIG. 4G.

The second condition corresponds to a case in which the received paging message includes a CN-based ID (S-TMSI or IMSI), the network has no UE context, and the received paging message includes an indication instructing a transition to the RRC idle mode. The UE may determine that a paging message has been received from the MME and, as the second operation, may delete the UE context, transition to the RRC idle mode, and perform a normal RRC connection procedure as in FIG. 4F.

The third condition corresponds to a case in which the received paging message includes a CN-based ID (S-TMSI or IMSI), the network has UE context, and the received paging message includes an indication instructing the same to maintain the RRC inactive mode. The UE determines that a paging message has been received from the MME and, as the third operation, maintains the UE context and performs a normal RRC connection resuming procedure as in FIG. 4F in the RRC inactive mode.

Figure 4N:
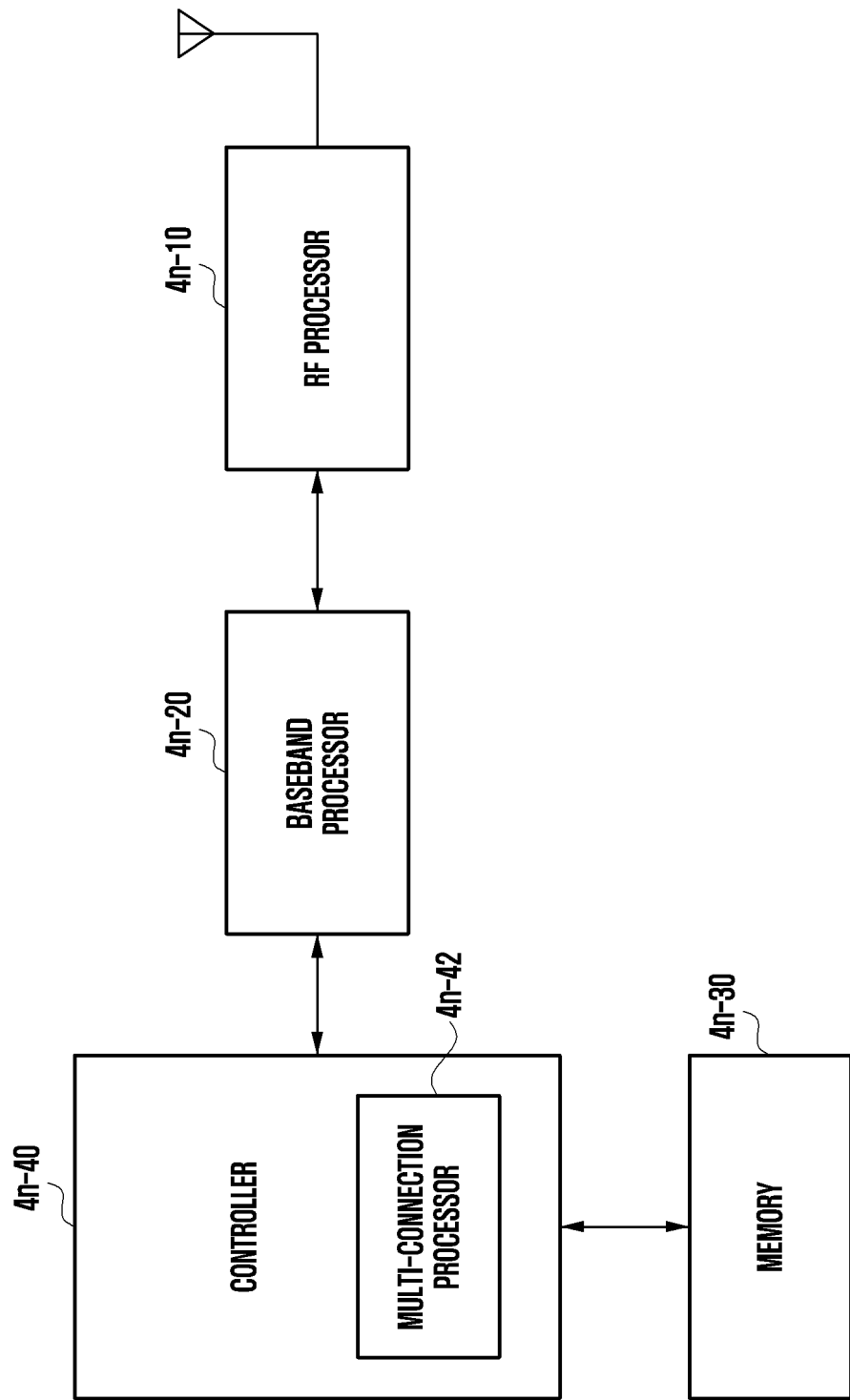
FIG. 4N illustrates the structure of a UE to which an embodiment of the disclosure may be applied.
Figure 40:
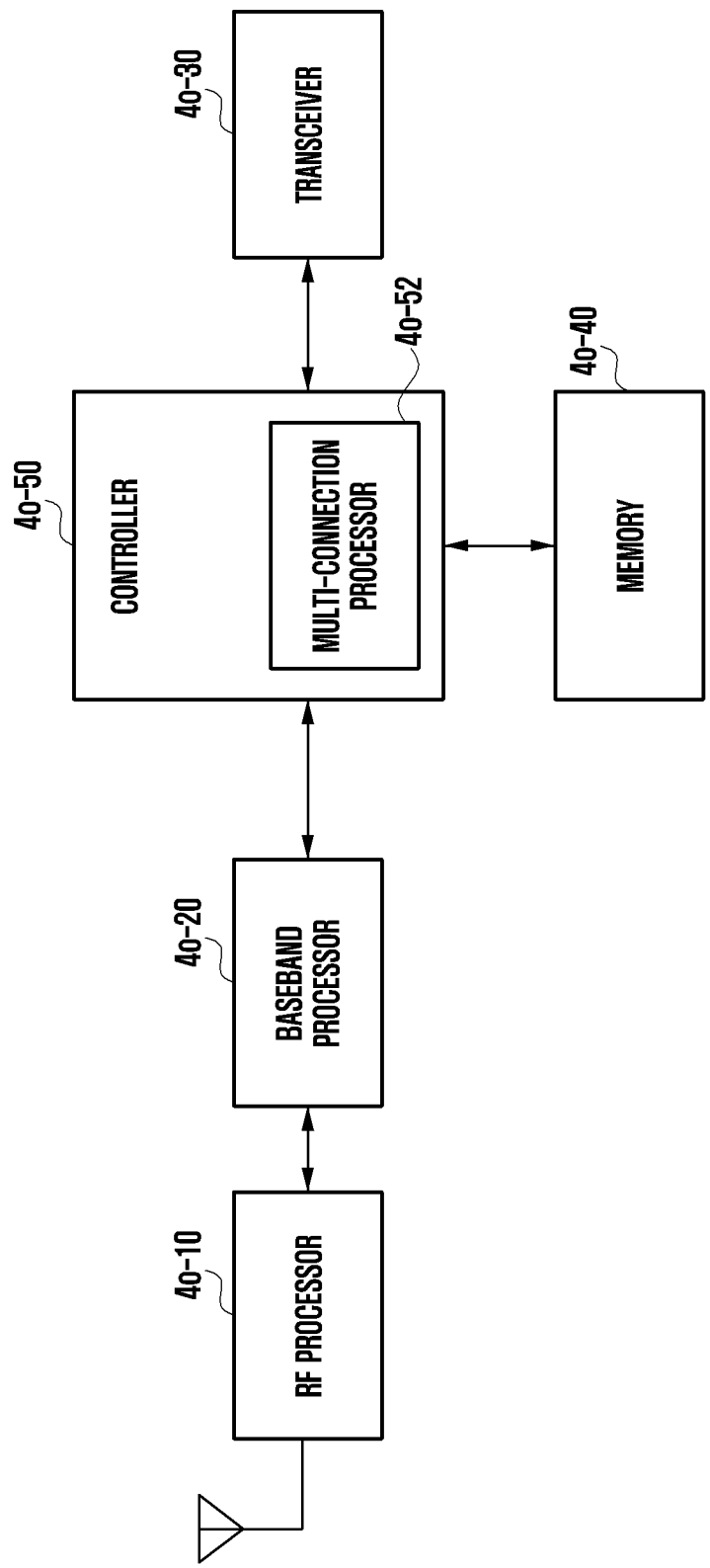

FIG. 4N illustrates the structure of a UE to which an embodiment of the disclosure can be applied.

Referring to the diagram, the UE includes a radio frequency (RF) processor 4n-10, a baseband processor 4n-20, a memory 4n-30, and a controller 4n-40.

The RF processor 4n-10 performs functions for transmitting/receiving signals through a wireless channel, such as signal band conversion, amplification, and the like. Specifically, the RF processor 4n-10 up-converts a baseband signal provided from the baseband processor 4n-20 into an RF band signal, transmits the same through an antenna, and down-converts an RF band signal received through the antenna into a baseband signal. For example, the RF processor 4n-10 may include a transmission filter, a reception filter, an amplifier, a mixer, an oscillator, a digital-to-analog converter (DAC), an analog-to-digital converter (ADC), and the like. Although only one antenna is illustrated in the diagram, the UE may include multiple antennas. In addition, the RF processor 4n-10 may include multiple RF chains. Moreover, the RF processor 4n-10 may perform beamforming. For the sake of the beamforming, the RF processor 4n-10 may adjust the phase and magnitude of signals transmitted/received through multiple antennas or antenna elements. In addition, the RF processor may perform MIMO, and may receive multiple layers when performing the MIMO operation. The RF processor 4n-10 may appropriately select multiple antennas or antenna elements under the control of the controller, thereby performing reception beam sweeping, or may adjust the direction of a reception beam and the width of the beam such that the reception beam is coordinated with the transmission beam.

The baseband processor 4n-20 performs a function of conversion between a baseband signal and a bit string according to the physical layer specification of the system. For example, during data transmission, the baseband processor 4n-20 encodes and modulates a transmission bit string, thereby generating complex symbols. In addition, during data reception, the baseband processor 4n-20 demodulates and decodes a baseband signal provided from the RF processor 4n-10, thereby restoring a reception bit string. For example, when an OFDM scheme is followed, during data transmission, the baseband processor 4n-20 encodes and modulates a transmission bit string so as to generate complex symbols, maps the complex symbols to subcarriers, and then configures OFDM symbols through an inverse fast Fourier transform (IFFT) operation and cyclic prefix (CP) insertion. In addition, during data reception, the baseband processor 4n-20 divides a baseband signal provided from the RF processor 4n-10 in an OFDM symbol unit, restores signals mapped to subcarriers through a fast Fourier transform (FFT) operation, and then restores the reception bit string through demodulation and decoding.

The baseband processor 4n-20 and the RF processor 4n-10 transmit and receive signals as described above. Accordingly, the baseband processor 4n-20 and the RF processor 4n-10 may be referred to as transmitter, receiver, transceiver, or communication units. In addition, at least one of the baseband processor 4n-20 and the RF processor 4n-10 may include multiple communication modules in order to support multiple different radio access technologies. Furthermore, at least one of the baseband processor 4n-20 and the RF processor 4n-10 may include different communication modules in order to process signals in different frequency bands. For example, the different radio access technologies may include an LTE network, an NR network, and the like. In addition, the different frequency bands may include a super high frequency (SHF) (for example, 2.5 gigaHertz (GHz), 5 GHz) band and a millimeter wave (for example, 60 GHz) band.

The memory 4n-30 stores data for operation of the UE, such as a basic program, an application program, and configuration information. The memory 4n-30 provides stored data at a request of the controller 4n-40.

The controller 4n-40 controls the overall operations of the UE. For example, the controller 4n-40 receives/transmits signals through the baseband processor 4n-20 and the RF processor 4n-10. In addition, the controller 4n-40 records and reads data in the memory 4n-40. To this end, the controller 4n-40 may include at least one processor. For example, the controller 4n-40 may include a communication processor (CP) that performs control for communication, and an application processor (AP) that controls the upper layer, such as an application program.

FIG. 4O illustrates a block configuration of a TRP in a wireless communication system to which an embodiment of the disclosure can be applied.

As illustrated in the diagram, the base station includes an RF processor 4o-10, a baseband processor 4o-20, a backhaul transceiver 4o-30, a memory 4o-4o, and a controller 4o-50.

The RF processor 4o-10 performs functions for transmitting/receiving signals through a wireless channel, such as signal band conversion, amplification, and the like. Specifically, the RF processor 4o-10 up-converts a baseband signal provided from the baseband processor 4o-20 into an RF band signal, transmits the same through an antenna, and down-converts an RF band signal received through the antenna into a baseband signal. For example, the RF processor 4o-10 may include a transmission filter, a reception filter, an amplifier, a mixer, an oscillator, a DAC, an ADC, and the like. Although only one antenna is illustrated in the diagram, the first access node may include multiple antennas. In addition, the RF processor 4o-10 may include multiple RF chains. Moreover, the RF processor 4o-10 may perform beamforming. For the sake of the beamforming, the RF processor 4o-10 may adjust the phase and magnitude of signals transmitted/received through multiple antennas or antenna elements. The RF processor may perform a downlink MIMO operation by transmitting at least one layer.

The baseband processor 4o-20 performs a function of conversion between a baseband signal and a bit string according to the physical layer specification of the first radio access technology. For example, during data transmission, the baseband processor 4o-20 encodes and modulates a transmission bit string, thereby generating complex symbols. In addition, during data reception, the baseband processor 4o-20 demodulates and decodes a baseband signal provided from the RF processor 4o-10, thereby restoring a reception bit string. For example, when an OFDM scheme is followed, during data transmission, the baseband processor 4o-20 encodes and modulates a transmission bit string so as to generate complex symbols, maps the complex symbols to subcarriers, and then configures OFDM symbols through an IFFT operation and CP insertion. In addition, during data reception, the baseband processor 4o-20 divides a baseband signal provided from the RF processor 4o-10 in an OFDM symbol unit, restores signals mapped to subcarriers through a FFT operation, and then restores the reception bit string through demodulation and decoding. The baseband processor 4o-20 and the RF processor 4o-10 transmit and receive signals as described above. Accordingly, the baseband processor 4o-20 and the RF processor 4o-10 may be referred to as transmitter, receiver, transceiver, or communication units.

The transceiver 4o-30 provides an interface for communicating with other nodes inside the network.

The memory 4o-40 stores data for operation of the main base station, such as a basic program, an application program, and configuration information. Particularly, the memory 4o-40 may store information regarding a bearer allocated to an accessed UE, a measurement result reported from the accessed UE, and the like. In addition, the memory 4o-40 may store information serving as a criterion to determine whether to provide the UE with multi-connection or to discontinue the same. In addition, the memory 4o-40 provides stored data at a request of the controller 4o-50.

The controller 4o-50 controls the overall operations of the main base station. For example, the controller 4o-50 receives/transmits signals through the baseband processor 4o-20 and the RF processor 4o-10, or through the backhaul transceiver 4o-30. In addition, the controller 4o-50 records and reads data in the memory 4o-40. To this end, the controller 4o-50 may include at least one processor.

Fifth Embodiment

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

Figure 5A:
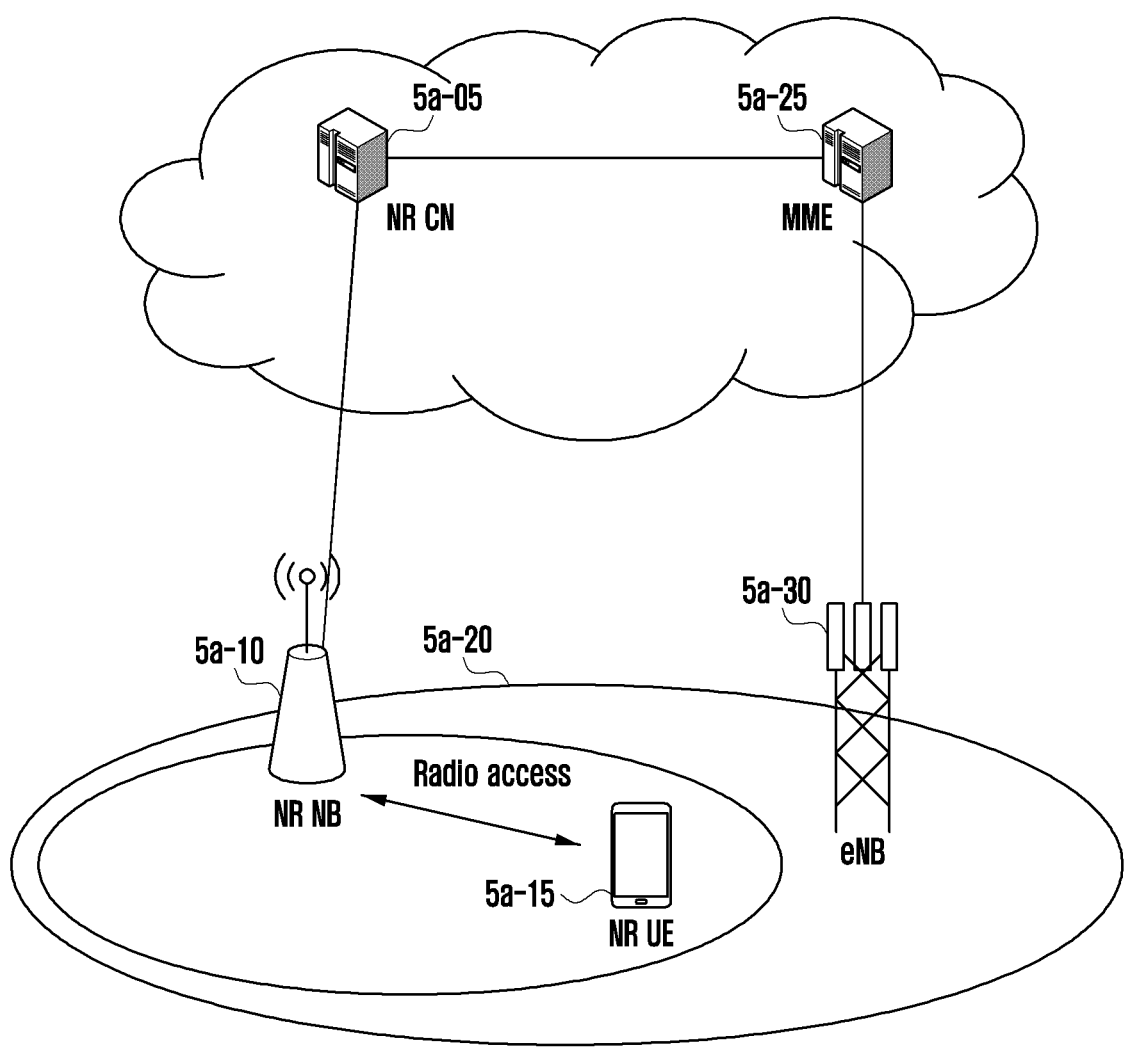
FIG. 5A is a diagram illustrating the structure of a next-generation mobile communication system.

FIG. 5A is a diagram illustrating the structure of a next-generation mobile communication system.

Referring to FIG. 5A, the radio access network of the next-generation mobile communication system includes a new radio Node B (hereinafter, referred to as NR NB) 5a-10 and a new radio core network (NR CN) 5a-05, as illustrated. A new radio user equipment (hereinafter, referred to as NR UE or terminal) 5a-15 accesses an external network through the NR NB 5a-10 and the NR CN 5a-05.

In FIG. 5A, the NR NB 5a-10 corresponds to an evolved Node B (eNB) of an existing LTE system. The NR NB is connected to the NR UE 5a-15 through a wireless channel, and is capable of providing a better service than an existing node B. In the next-generation mobile communication system, all user traffics are provided through a shared channel, and there is accordingly a need for a device for aggregating and scheduling status information such as the buffer status of UEs, the available transmission power status, and the channel status, and the same is handled by the NR NB 5a-10.

A single NR NB normally controls multiple cells. In order to implement super-high data transmission compared with the LTE, the next-generation mobile communication system may have at least the existing maximum bandwidth, and a beamforming technology may be additionally combined, based on OFDM as a radio access technology. In addition, an AMC scheme is applied, which determines the modulation scheme and the channel coding rate according to the channel status of the UE. The NR CN 5a-05 performs functions such as mobility support, bearer configuration, and QoS configuration. The NR CN is a device in charge of not only the UE mobility management function, but also various control functions, and is connected to multiple base stations. In addition, the next-generation mobile communication system may interwork with an existing LTE system, and the NR CN is connected to an MME 5a-25 through a network interface. The MME is connected to an eNB 5a-30, which is an existing base station.

Figure 5B:
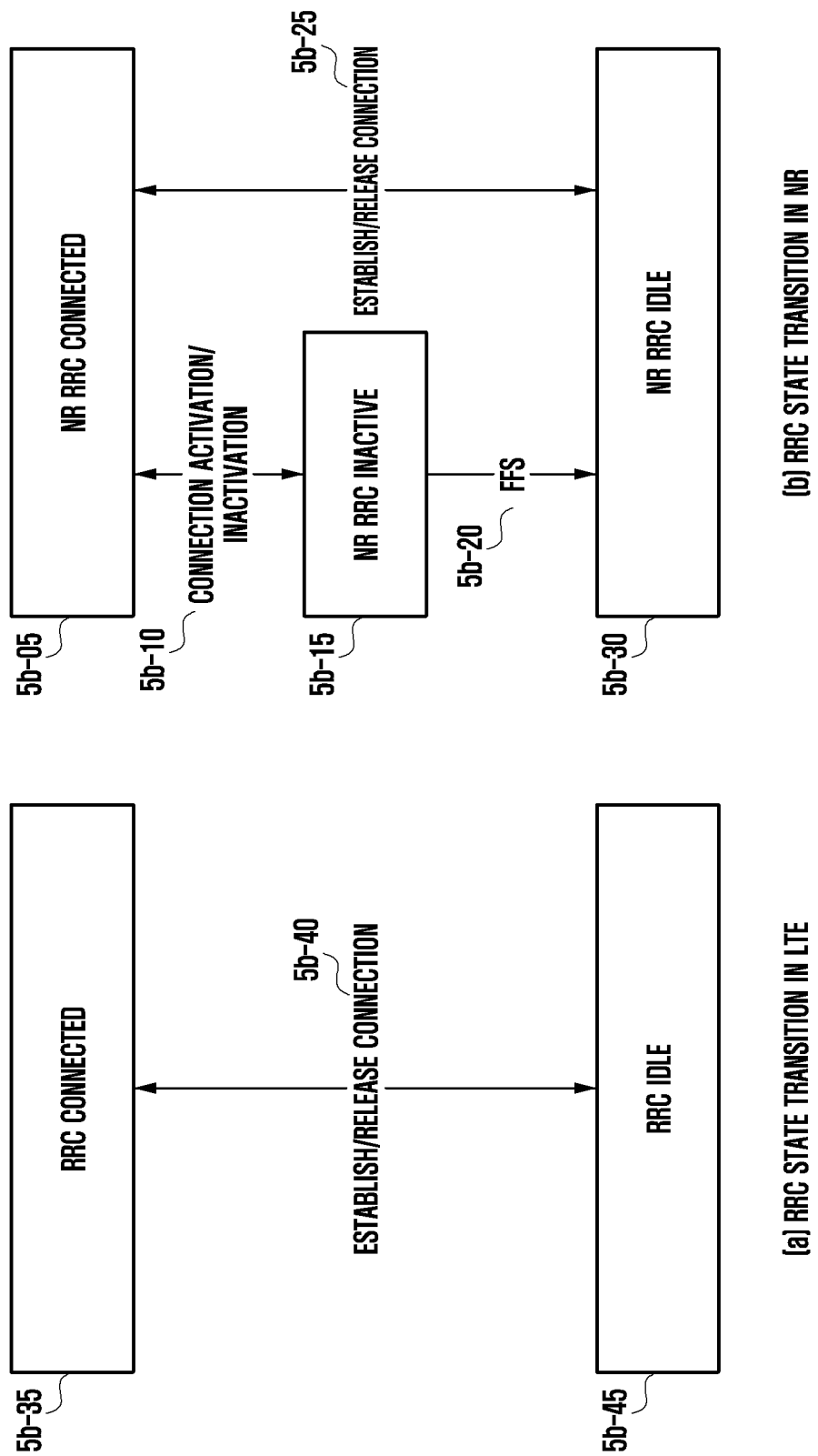
FIG. 5B is a diagram illustrating radio access status transition in a next-generation mobile communication system.

FIG. 5B is a diagram illustrating radio access status transition in a next-generation mobile communication system.

An existing LTE system has two radio access states: a connected mode (RRC connected) 5b-35 and a standby mode (RRC idle) 5b-45. The two modes are switched through an establishment procedure and a release procedure (5b-40).

However, the next-generation mobile communication system has three RRC states. The connected mode (RRC_CONNECTED) 5b-05 is a radio access state in which a UE can transmit/receive data. The standby mode (RRC_IDLE) 5b-30 is a radio access state in which the UE monitors if paging is transmitted thereto. The two modes are radio access states also applied to the existing LTE system, and detailed technologies thereof are identical to those of the LTE system.

The next-generation mobile communication system has newly defined RRC_INACTIVE radio access state 5b-15. In this radio access state, UE context is maintained in the gNB and the UE, and RAN-based paging is supported. Characteristics of the new radio access state are enumerated as follows:
  Cell re-selection mobility;
  CN-NR RAN connection (both C/U-planes) has been established for UE;
  The UE AS context is stored in at least one gNB and the UE;
  Paging is initiated by NR RAN;
  RAN-based notification area is managed by NR RAN; and
  NR RAN knows the RAN-based notification area which the UE belongs to In the new INACTIVE radio access state, the UE may transition to the connected mode or standby mode by using a specific procedure. The UE switches from the INACTIVE mode to the connected mode according to connection activation, and switches from the connected mode to the INACTIVE mode by using a connection inactivation procedure (5b-10).

The connection activation/inactivation procedure is characterized in that at least one RRC message is transmitted/received between the UE and the gNB, and the procedure includes at least one step.

In addition, the UE can switch from the INACTIVE mode to the standby mode according to a specific procedure (5b-20). Various methods may be considered as the above-mentioned specific procedure, such as exchange of a specific message, a timer-based method, and an event-based method. Switching between the connected mode and the standby mode follows the existing LTE technology. That is, the switching between modes occurs through a connection establishment or release procedure (5b-25).

Figure 5C:
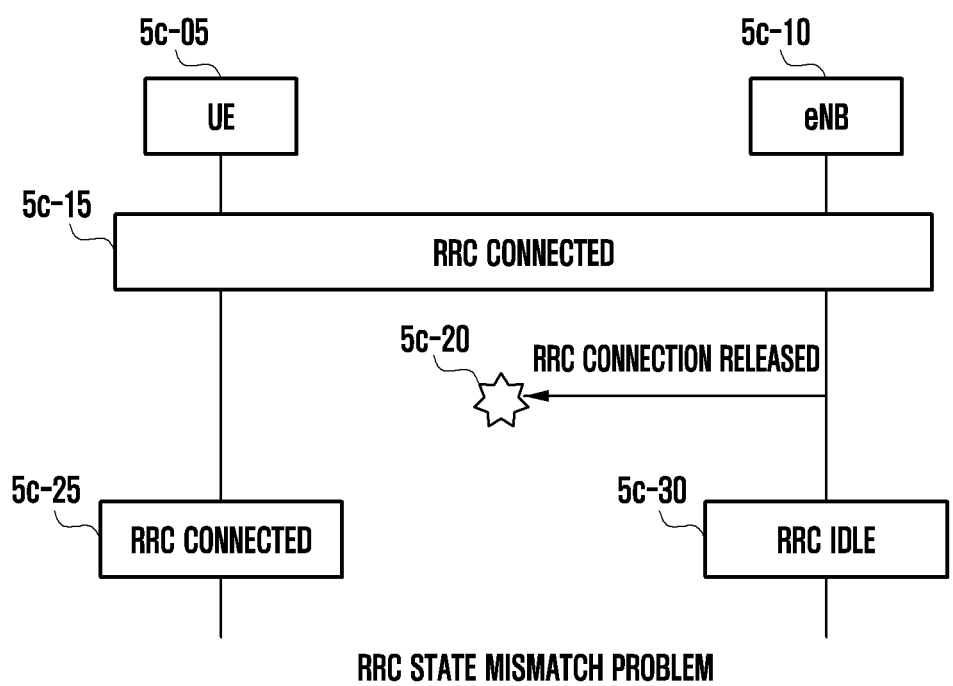
FIG. 5C is a diagram illustrating a radio access state mismatch occurring in an existing LTE system.

FIG. 5C is a diagram illustrating a radio access state mismatch occurring in an existing LTE system.

A UE 5c-05 is connected to an eNB 5c-10 (5c-15). The eNB transmits an RRC connection release message to the UE to switch the UE to the standby mode. However, the UE may fail to receive the message because the wireless channel is not good (5c-20).

The existing eNB does not wait for a HARQ feedback in response to the message, and instantly considers that the UE switched to the standby mode (5c-30). However, the UE has not received the release message, and still maintains the connected mode (5c-25).

Figure 5D:
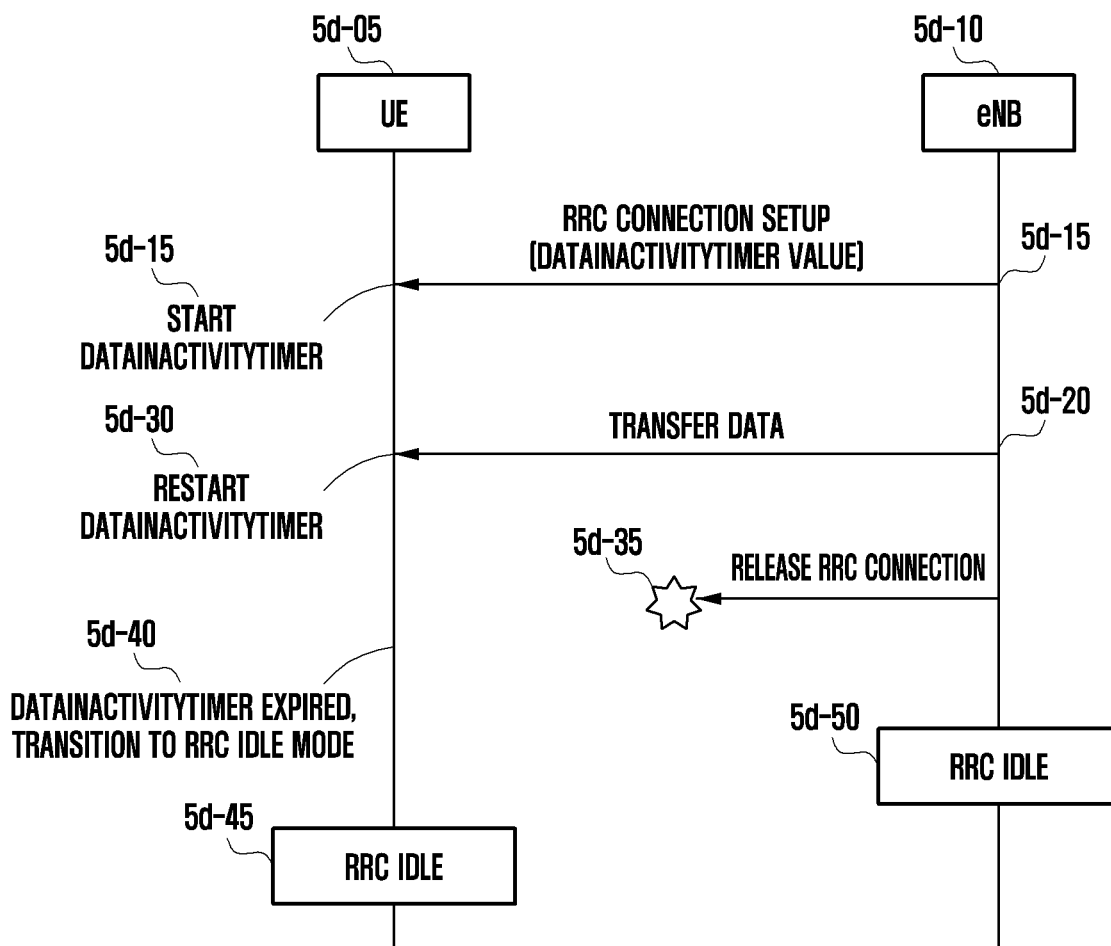
FIG. 5D is a diagram illustrating a scheme for solving a radio access state mismatch occurring in the existing LTE system.

FIG. 5D is a diagram illustrating a scheme for solving a radio access state mismatch occurring in the existing LTE system.

In order to solve the above-mentioned problem, the LTE system has introduced a timer. The timer is provided to the UE by using dedicated signaling.

For example, the eNB 5d-10 may insert the timer information (for example, DataInactivityTimer value) into an RRC connection setup message in the establishment procedure, and may provide the same to the UE 5d-05 (5d-15).

After receiving the timer information, the UE starts the timer (5d-20). The timer is restarted every time data is generated in the up/downlink (5d-25).

If the timer expires, the UE automatically switches to the standby mode (5d-40). This solves the problem of radio access state mismatch that may occur if the UE fails to receive the release message (5d-35). Therefore, the UE and the eNB are both in the standby mode (5d-45 and 5d-50).

FIG. 5E is a diagram illustrating a radio access state mismatch occurring in a next-generation mobile communication system.

The phenomenon of radio access state mismatch between the connected mode and the standby mode will still occur in the next-generation mobile communication system. This problem can be solved by a solution developed in the LTE system. On the other hand, the next-generation mobile communication system has introduced a new RRC radio access state (INACTIVE). Therefore, there may occur a problem of mismatch between the UE 5e-05 and the gNB 5e-10 with regard to the INACTIVE state.

A UE in the INACTIVE state may periodically perform paging area update or transmit data. The paging area update is similar to existing TAU. The paging area includes multiple cells, and serves as a reference area to transmit initialized paging in a RAN. Each cell provides the paging area ID, to which the same belongs, to the UE as system information. According to a connection inactivation procedure 5e-15, a UE in the INACTIVE state performs paging area update if the paging area is changed during a cell change. In addition, paging area update is also performed periodically.

For the paging area update, the UE attempts a random access to related cells, and registers the paring area, which includes the same, in the RAN. However, such an access attempt may fail due to the poor channel status (5e-20). In addition, the UE may have attempted a random access, in order to transmit uplink data, instead of the paging area update, but may fail (5e-40).

In order to prevent radio access state mismatch, the UE and the gNB need to determine the radio access state, if the access attempt fails, according to a predetermined rule. The disclosure proposes a scheme wherein, if a UE in the INACTIVE state fails an access attempt, the UE and the gNB transition to a predetermined radio access state according to the purpose of the access attempt.

Figure 5F:
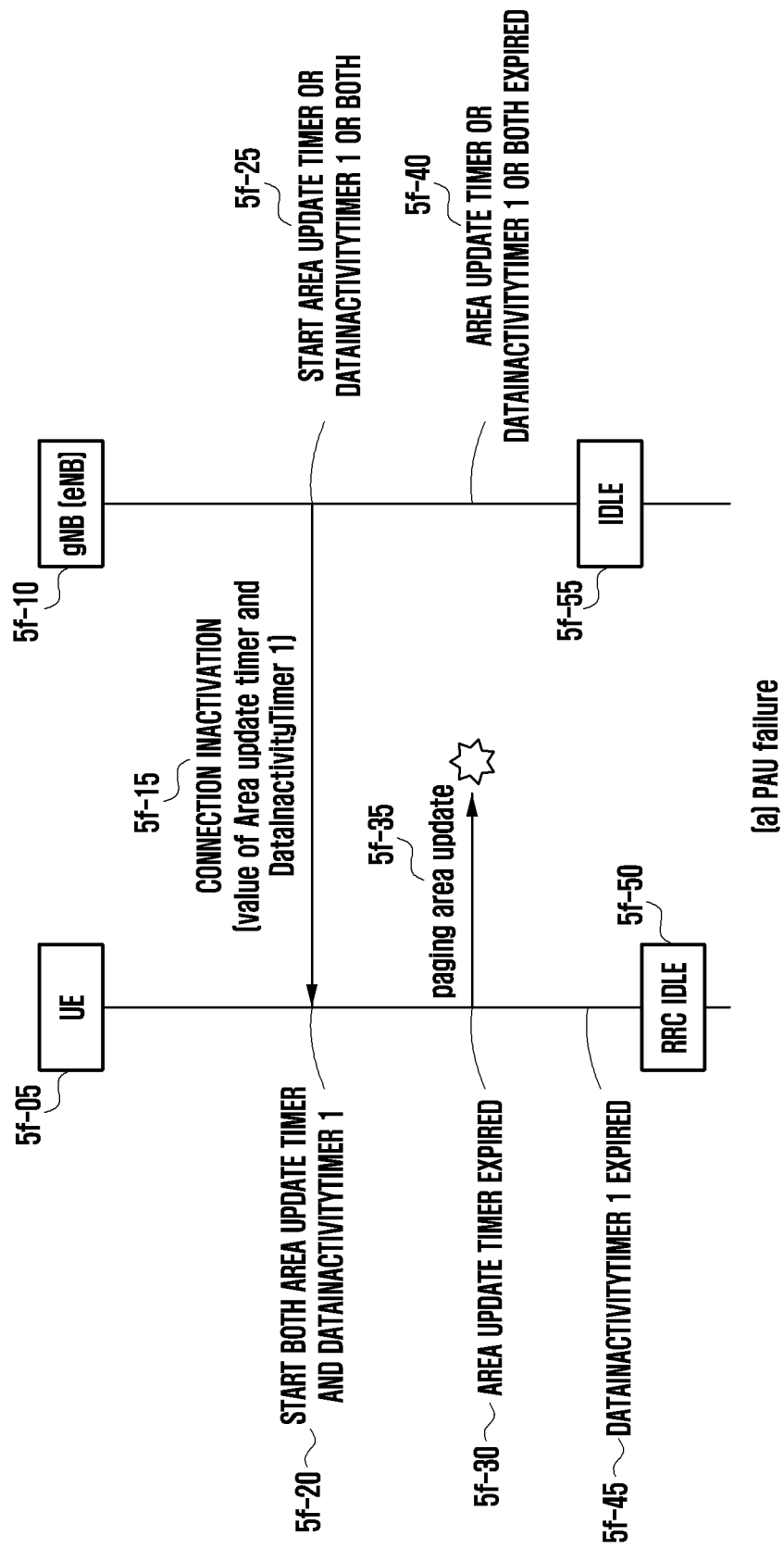
FIG. 5FA and FIG. 5FB are diagrams illustrating a scheme for solving a radio access state mismatch occurring in a next-generation mobile communication system.
Figure 5F:
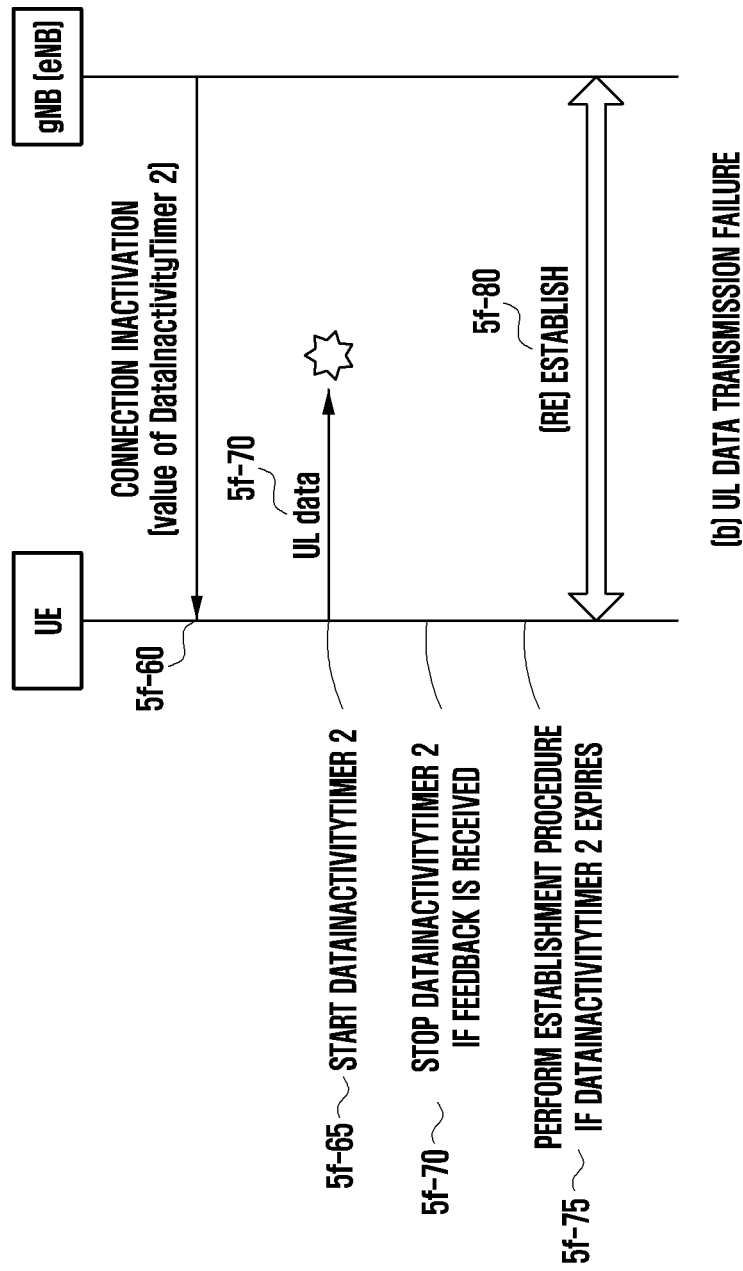

FIG. 5FA and FIG. 5FB are diagrams illustrating a scheme for solving a radio access state mismatch occurring in the next-generation mobile communication system.

The diagrams deal with a case in which the UE fails padding area update and a case in which the UE fails uplink data transmission. In the disclosure, the UE 5f-05 and the gNB 5f-10 switch to different radio access states depending on the case.

When the gNB transitions a UE to the INACTIVE state, a connection inactivation procedure is triggered (5f-15). The procedure includes at least one, a plurality of dedicated signaling.

The gNB inserts area update timer information and dataInactivityTimer 1 information into a downlink message and transmits the same to the UE. Shortly after receiving the area update timer information, the UE starts the timer (5f-20), and has to perform paging area update (5f-35) every time the timer expires (5f-30). Shortly after receiving the dataInactivityTimer 1 information, the UE starts the timer (5f-20), and the UE switches to the standby mode (5f-50) if the timer expires (5f-45).

If the paging area update is successfully performed, the dataInactivityTimer 1 is restarted. The length of the paging area update timer is normally configured to be slightly shorter than the length of dataInactivityTimer 1. After transmitting the timer information, the gNB starts the timer (5f-25). If no paging update message is received from the UE although the area update timer or dataInactivityTimer 1 has expired (5f-40), the gNB considers that the UE has transitioned to the standby mode (5f-55).

When the gNB transitions a UE to the INACTIVE state, a connection inactivation procedure is triggered. The procedure includes at least one, a plurality of dedicated signaling.

The gNB inserts dataInactivityTimer 2 information into a downlink message and transmits the same to the UE (5f-60). The UE starts the timer if uplink data transmission occurs shortly after receiving the timer information (5f-65). If feedback information is received with regard to the uplink data, the UE stops the timer and resets the same (5f-70). If the timer expires (5f-75), the UE performs a (re)establishment procedure (5f-80). If uplink data transmission is performed successfully, the dataInactivityTimer is stopped and reset.

FIG. 5G is a diagram illustrating a timer operation when paging is received in a next-generation mobile communication system.

The UE in the INACTIVE state may receive RAN initiated paging or CN initiated paging from the gNB. In the disclosure, the above-mentioned operations of timers vary depending on what type of paging is received.

When the gNB 5g-10 transitions a UE 5g-05 to the INACTIVE state, a connection inactivation procedure is triggered (5g-15). The procedure includes at least one, a plurality of dedicated signaling.

The gNB inserts area update timer information and dataInactivityTimer 1 information into a downlink message and transmits the same to the UE (5g-15). The UE receives RAN initiated paging from the gNB (5g-20).

If the paging includes an identifier allocated by the RAN, such as resume ID, the paging is regarded as RAN initiated paging. If the UE receives the RAN initiated paging, the UE restarts the timers.

Meanwhile, paging may be transmitted from a core network as in (b) of FIG. 5G (5g-35). In this case, the paging includes an identifier allocated by the CN, such as S-TMSI, and the UE considers the paging as CN initiated paging. After receiving the CN initiated paging, the UE stops the timers and transitions to the standby mode. This is because, when CN initiated paging is received, the following operation is performed assuming the standby mode state.

Figure 5H:
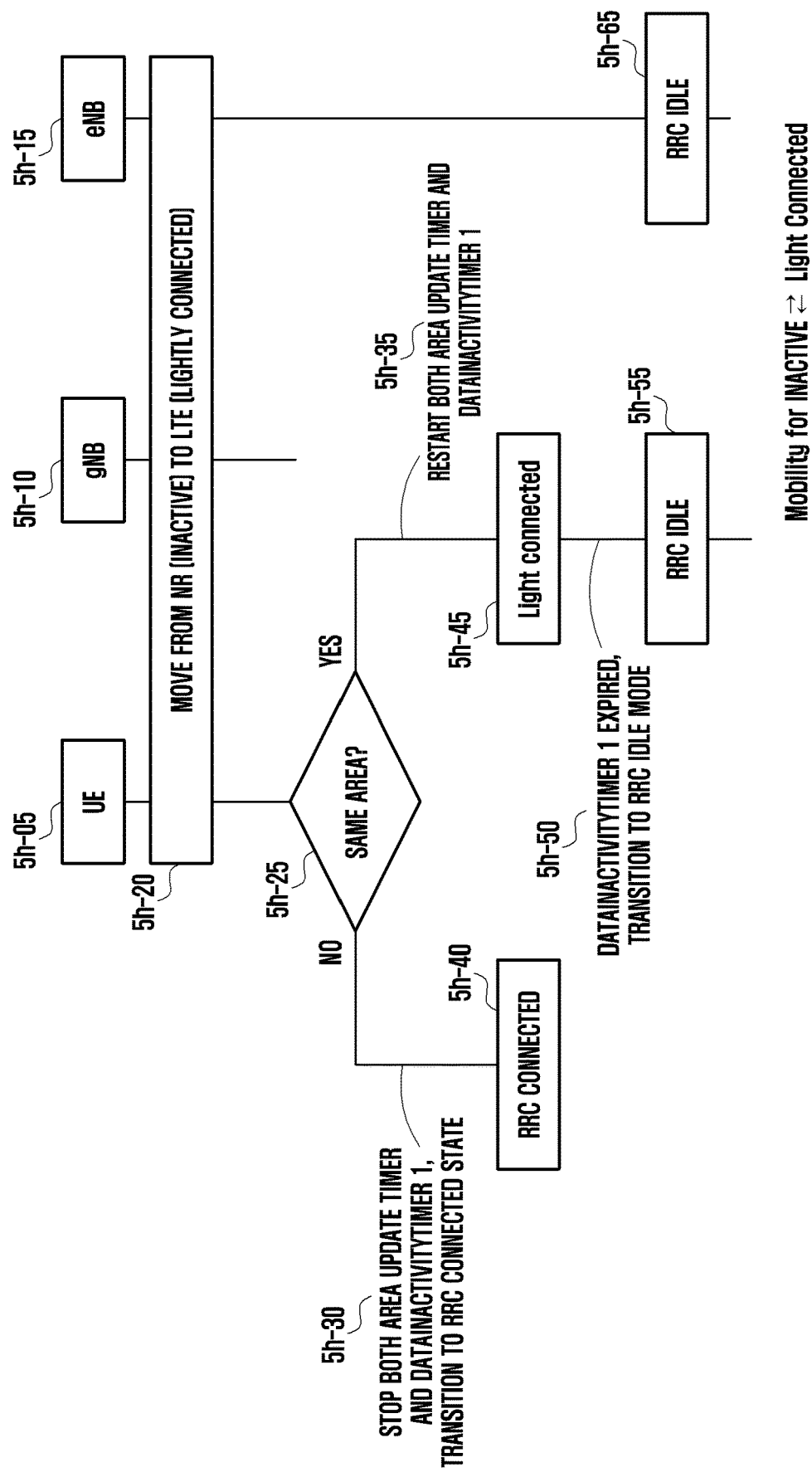
FIG. 5H is a diagram illustrating a timer operation during inter-RAT mobility in a next-generation mobile communication system.

FIG. 5H is a diagram illustrating a timer operation during inter-RAT mobility in a next-generation mobile communication system.

Mobility may be supported between the next-generation mobile communication system and the LTE system. Particularly, UEs may have supported mobility from the INACTIVE state in the next-generation mobile communication system to the light connection state in the LTE system. In such a scenario, the above-mentioned timer operation is proposed.

If a UE 5h-05 in the INACTIVE state in the next-generation mobile communication system 5h-10 moves to the light connection state in the LTE system 5h-15 (5h-20), the UE determines whether or not the paging area of the cell to which the same moved is identical (5h-25).

In the case of a different area, the UE needs to switch to the connected mode. Therefore, the UE stops the area updater timer and DataInactivityTimer 1, and switches to the connected mode (5h-30).

On the other hand, if the UE is in the same paging area, the UE restarts the area update timer and DataInactivityTimer 1 (5h-35). Since the same problem of state mismatch may occur in the light connection state 5h-45 as well, the UE may restart the timer used in the INACTIVE state and may reuse the same. If the DataInactivityTimer 1 expires (5h-50), the UE switches to the standby mode (5h-55). The LTE eNB is also driving the same timer and, if the timer expires, considers that the UE will switch to the standby mode (5h-65).

In the disclosure, the UE needs to attempt a random access in order to connect to the gNB. In this case, DataInactivityTimer 2 is restarted every time data or signaling occurs, except for msg3. This is because a collision may occur.

A UE having a configured DC includes two MAC entities. One MAC entity is related to a link with an MCG, and the other MAC entity is related to a link with an SCG. The MCG and SCG refer to groups of serving cells provided by two gNBs. It may be considered that the RRC switched to the standby mode if timer expiration is reported from both MAC sides. Alternatively, the operation is different between the case in which the timer has expired in the MAC entity related to the MCG and the case in which the timer has expired in the MAC entity related to the SCG. Alternatively, the timer may always be configured with regard only to the MAC entity related to the MCG.

Figure 5I:
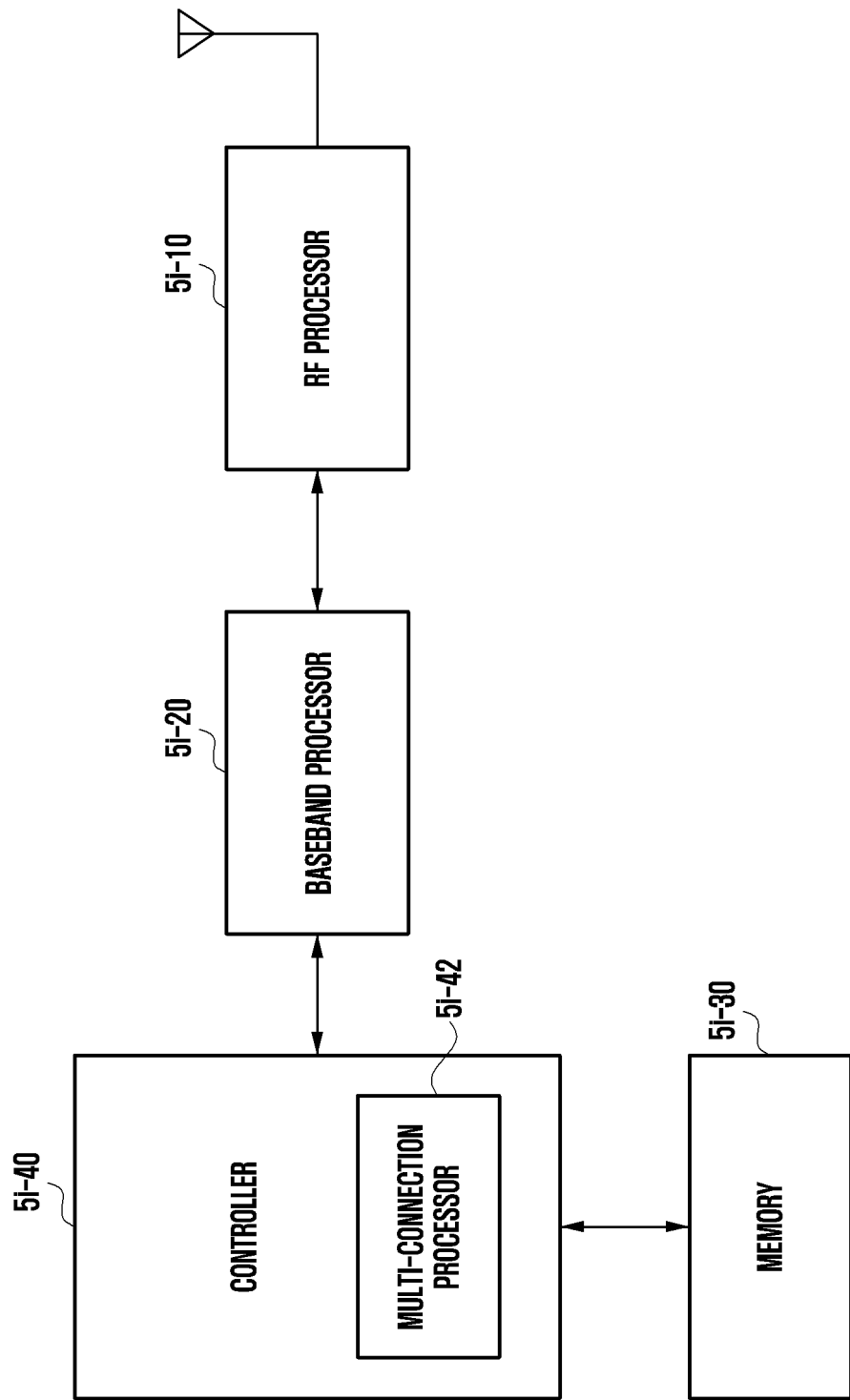
FIG. 5I is a block diagram illustrating the inner structure of a UE to which the disclosure is applied.

FIG. 5I illustrates the structure of a UE.

Referring to the diagram, the UE includes a radio frequency (RF) processor 5i-10, a baseband processor 5i-20, a memory 5i-30, and a controller 5i-40.

The RF processor 5i-10 performs functions for transmitting/receiving signals through a wireless channel, such as signal band conversion, amplification, and the like. Specifically, the RF processor 5i-10 up-converts a baseband signal provided from the baseband processor 5i-20 into an RF band signal, transmits the same through an antenna, and down-converts an RF band signal received through the antenna into a baseband signal. For example, the RF processor 5i-10 may include a transmission filter, a reception filter, an amplifier, a mixer, an oscillator, a digital-to-analog converter (DAC), an analog-to-digital converter (ADC), and the like. Although only one antenna is illustrated in the diagram, the UE may include multiple antennas. In addition, the RF processor 5i-10 may include multiple RF chains. Moreover, the RF processor 5i-10 may perform beamforming. For the sake of the beamforming, the RF processor 5i-10 may adjust the phase and magnitude of signals transmitted/received through multiple antennas or antenna elements. In addition, the RF processor may perform MIMO, and may receive multiple layers when performing the MIMO operation.

The baseband processor 5i-20 performs a function of conversion between a baseband signal and a bit string according to the physical layer specification of the system. For example, during data transmission, the baseband processor 5i-20 encodes and modulates a transmission bit string, thereby generating complex symbols. In addition, during data reception, the baseband processor 5i-20 demodulates and decodes a baseband signal provided from the RF processor 5i-10, thereby restoring a reception bit string. For example, when an OFDM scheme is followed, during data transmission, the baseband processor 5i-20 encodes and modulates a transmission bit string so as to generate complex symbols, maps the complex symbols to subcarriers, and then configures OFDM symbols through an inverse fast Fourier transform (IFFT) operation and cyclic prefix (CP) insertion. In addition, during data reception, the baseband processor 5i-20 divides a baseband signal provided from the RF processor 5i-10 in an OFDM symbol unit, restores signals mapped to subcarriers through a fast Fourier transform (FFT) operation, and then restores the reception bit string through demodulation and decoding.

The baseband processor 5i-20 and the RF processor 5i-10 transmit and receive signals as described above. Accordingly, the baseband processor 5i-20 and the RF processor 5i-10 may be referred to as transmitter, receiver, transceiver, or communication units. In addition, at least one of the baseband processor 5i-20 and the RF processor 5i-10 may include multiple communication modules in order to support multiple different radio access technologies. Furthermore, at least one of the baseband processor 5i-20 and the RF processor 5i-10 may include different communication modules in order to process signals in different frequency bands. For example, the different radio access technologies may include a wireless LAN (for example, IEEE 802.11), a cellular network (for example, LTE), and the like. In addition, the different frequency bands may include a super high frequency (SHF) (for example, 2.NRHz, NRhz) band and a millimeter wave (for example, 60 GHz) band.

The memory 5i-30 stores data for operation of the UE, such as a basic program, an application program, and configuration information. Particularly, the memory 5i-30 may store information regarding a second access node that performs wireless communication by using a second radio access technology. In addition, the memory 5i-30 provides stored data at a request of the controller 5i-40.

The controller 5i-40 controls the overall operations of the UE. For example, the controller 5i-40 receives/transmits signals through the baseband processor 5i-20 and the RF processor 5i-10. In addition, the controller 5i-40 records and reads data in the memory 5i-40. To this end, the controller 5i-40 may include at least one processor. For example, the controller 5i-40 may include a communication processor (CP) that performs control for communication, and an application processor (AP) that controls the upper layer, such as an application program.

Figure 5J:
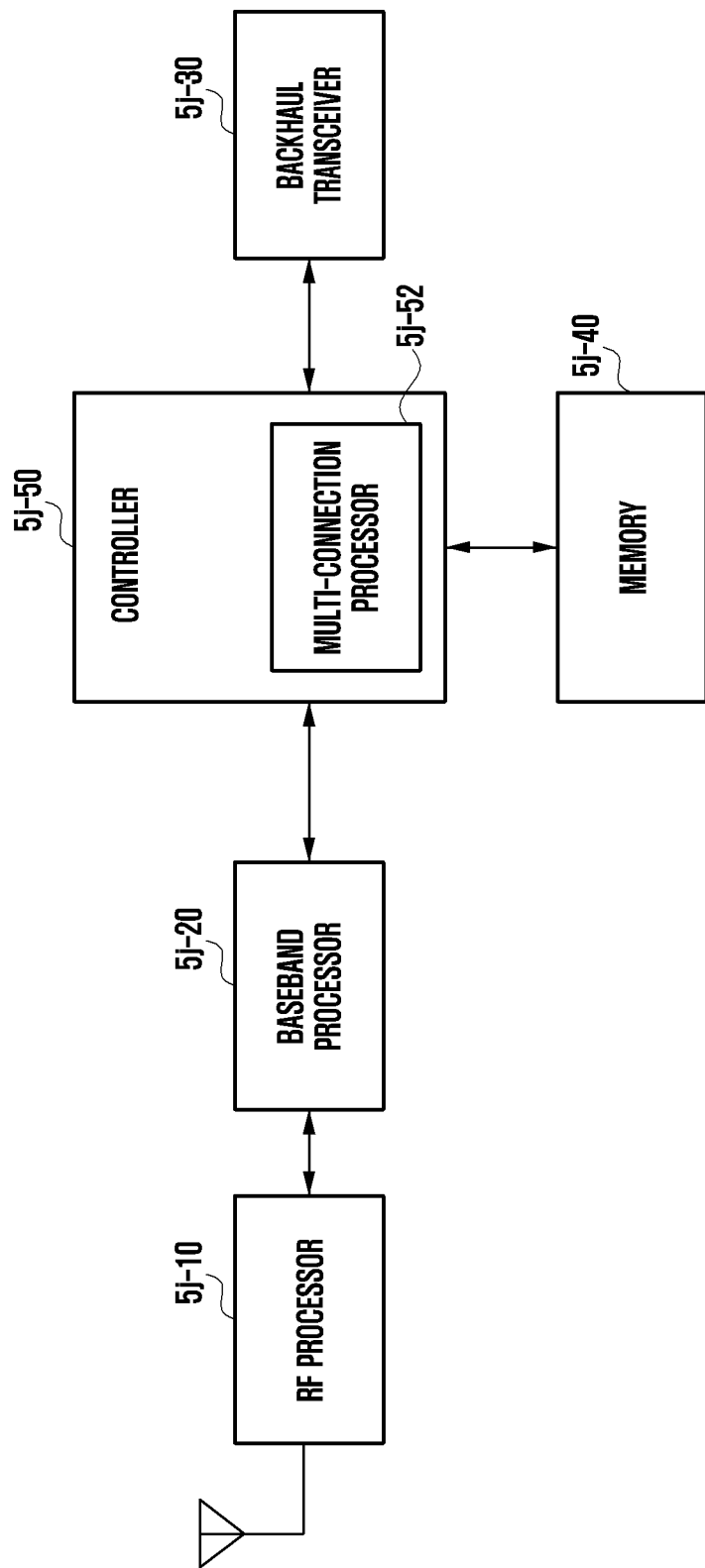
FIG. 5J is a block diagram illustrating the configuration of a base station according to an embodiment of the disclosure.

FIG. 5J illustrates a block configuration of a main base station in a wireless communication system according to an embodiment of the disclosure.

As illustrated in the diagram, the base station includes an RF processor 5j-10, a baseband processor 5j-20, a backhaul transceiver 5j-30, a memory 5j-40, and a controller 5j-50.

The RF processor 5j-10 performs functions for transmitting/receiving signals through a wireless channel, such as signal band conversion, amplification, and the like. Specifically, the RF processor 5j-10 up-converts a baseband signal provided from the baseband processor 5j-20 into an RF band signal, transmits the same through an antenna, and down-converts an RF band signal received through the antenna into a baseband signal. For example, the RF processor 5j-10 may include a transmission filter, a reception filter, an amplifier, a mixer, an oscillator, a DAC, an ADC, and the like. Although only one antenna is illustrated in the diagram, the first access node may include multiple antennas. In addition, the RF processor 5j-10 may include multiple RF chains. Moreover, the RF processor 5j-10 may perform beamforming. For the sake of the beamforming, the RF processor 5j-10 may adjust the phase and magnitude of signals transmitted/received through multiple antennas or antenna elements. The RF processor may perform a downlink MIMO operation by transmitting at least one layer.

The baseband processor 5j-20 performs a function of conversion between a baseband signal and a bit string according to the physical layer specification of the first radio access technology. For example, during data transmission, the baseband processor 5j-20 encodes and modulates a transmission bit string, thereby generating complex symbols. In addition, during data reception, the baseband processor 5j-20 demodulates and decodes a baseband signal provided from the RF processor 5j-10, thereby restoring a reception bit string. For example, when an OFDM scheme is followed, during data transmission, the baseband processor 5j-20 encodes and modulates a transmission bit string so as to generate complex symbols, maps the complex symbols to subcarriers, and then configures OFDM symbols through an IFFT operation and CP insertion. In addition, during data reception, the baseband processor 5j-20 divides a baseband signal provided from the RF processor 5j-10 in an OFDM symbol unit, restores signals mapped to subcarriers through a FFT operation, and then restores the reception bit string through demodulation and decoding. The baseband processor 5j-20 and the RF processor 5j-10 transmit and receive signals as described above. Accordingly, the baseband processor 5j-20 and the RF processor 5j-10 may be referred to as transmitter, receiver, transceiver, communication units, or wireless communication units.

The backhaul transceiver 5j-30 provides an interface for communicating with other nodes inside the network. That is, the backhaul transceiver 5j-30 converts a bit string transmitted from the main base station to another node, for example, an auxiliary base station or a core network, into a physical signal, and converts a physical signal received from the other node into a bit string.

The memory 5j-40 stores data for operation of the main base station, such as a basic program, an application program, and configuration information. Particularly, the memory 5j-40 may store information regarding a bearer allocated to an accessed UE, a measurement result reported from the accessed UE, and the like. In addition, the memory 5j-40 may store information serving as a criterion to determine whether to provide the UE with multi-connection or to discontinue the same. In addition, the memory 5j-40 provides stored data at a request of the controller 5j-50.

The controller 5j-50 controls the overall operations of the main base station. For example, the controller 5j-50 receives/transmits signals through the baseband processor 5j-20 and the RF processor 5j-10, or through the backhaul transceiver 5j-30. In addition, the controller 5j-50 records and reads data in the memory 5j-40. To this end, the controller 5j-50 may include at least one processor.

In the above-described detailed embodiments of the disclosure, an element included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

Meanwhile, in the drawings that illustrate methods of the disclosure, the order of description does not necessarily correspond to the order of execution, and may also be executed in a changed front/rear relation or in a parallel manner.

In addition, some elements may be omitted from the drawings that illustrate methods of the disclosure without departing from the essence of the disclosure, and only some elements may be included.

In addition, part or all or the content included in each embodiment of the method of the disclosure may be combined and executed without departing from the essence of the disclosure.

Although detailed embodiments have been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

What is claimed is:

1. A method performed by a terminal in a communication system, the method comprising:
   receiving a radio resource control (RRC) message including configuration information associated with a medium access control (MAC) control element (CE) for a beam recovery, wherein the configuration information includes information on a reference signal received power (RSRP) threshold;
   triggering the beam recovery for a first cell;
   identifying whether a configuration of a physical uplink control channel (PUCCH) transmission associated with a beam recovery request is provided for the terminal; and
   in case that the configuration of the PUCCH transmission is provided for the terminal:
      transmitting a scheduling request (SR) for an uplink resource based on the configuration of the PUCCH transmission,
      receiving resource allocation information of the uplink resource, and
      transmitting the MAC CE for the beam recovery on the uplink resource based on the configuration information associated with the MAC CE for the beam recovery.

2. The method of claim 1, wherein the MAC CE for the beam recovery includes information on a beam associated with the beam recovery, and wherein the beam is identified based on the RSRP threshold.

3. The method of claim 1, wherein the MAC CE for the beam recovery is prioritized in a specific order.

4. The method of claim 1, further comprising, in case that the configuration of the PUCCH transmission is not provided for the terminal:
   transmitting a random access preamble of a random access procedure;
   receiving a random access response of the random access procedure; and
   transmitting the MAC CE for the beam recovery in a message 3 of the random access procedure after reception of the random access response.

5. The method of claim 1, further comprising:
triggering the beam recovery for a second cell different from the first cell;
transmitting a random access preamble to the second cell;
receiving a random access response from the second cell; and
transmitting the MAC CE for the beam recovery for the second cell based on the configuration information and the random access response.

6. A terminal in a communication system, the terminal comprising:
a transceiver; and
a processor coupled with the transceiver and configured to:
receive a radio resource control (RRC) message including configuration information associated with a medium access control (MAC) control element (CE) for a beam recovery, wherein the configuration information includes information on a reference signal received power (RSRP) threshold,
trigger the beam recovery for a first cell,
identify whether a configuration of a physical uplink control channel (PUCCH) transmission associated with a beam recovery request is provided for the terminal, and
in case that the configuration of the PUCCH transmission is provided for the terminal, the processor is further configured to:
transmit a scheduling request (SR) for an uplink resource based on the configuration of the PUCCH transmission,
receive resource allocation information of the uplink resource, and
transmit the MAC CE for the beam recovery on the uplink resource based on the configuration information associated with the MAC CE for the beam recovery.

7. The terminal of claim 6, wherein the MAC CE for the beam recovery includes information on a beam associated with the beam recovery, and wherein the beam is identified based on the RSRP threshold.

8. The terminal of claim 6, wherein the MAC CE for the beam recovery is prioritized in a specific order.

9. The terminal of claim 6, wherein, in case that the configuration of the PUCCH transmission is not provided for the terminal, the processor is further configured to:
transmit a random access preamble of a random access procedure;
receive a random access response of the random access procedure; and
transmit the MAC CE for the beam recovery in a message 3 of the random access procedure after reception of the random access response.

10. The terminal of claim 6, wherein the processor is further configured to:
trigger the beam recovery for a second cell different from the first cell;
transmit a random access preamble to the second cell;
receive a random access response from the second cell; and
transmit the MAC CE for the beam recovery for the second cell based on the configuration information and the random access response.

11. A method performed by a base station in a communication system, the method comprising:
transmitting, to a terminal, a radio resource control (RRC) message including configuration information associated with a medium access control (MAC) control element (CE) for a beam recovery, wherein the configuration information includes information on a reference signal received power (RSRP) threshold; and
in case that a configuration of a physical uplink control channel (PUCCH) transmission is provided for the terminal:
receiving, from the terminal, a scheduling request (SR) for an uplink resource associated with the configuration of the PUCCH transmission,
transmitting, to the terminal, resource allocation information of the uplink resource, and
receiving, from the terminal, the MAC CE for the beam recovery for a first cell on the uplink resource.

12. The method of claim 11, wherein the MAC CE for the beam recovery includes information on a beam associated with the beam recovery, and wherein the beam is based on the RSRP threshold.

13. The method of claim 11, wherein the MAC CE for the beam recovery is prioritized in a specific order.

14. The method of claim 11, further comprising, in case that the configuration of the PUCCH transmission is not provided for the terminal:
receiving, from the terminal, a random access preamble of a random access procedure;
transmitting, to the terminal, a random access response of the random access procedure; and
receiving, from the terminal, the MAC CE for the beam recovery in a message 3 of the random access procedure after transmission of the random access response.

15. The method of claim 11, further comprising:
receiving, from the terminal, a random access preamble on a second cell different from the first cell;
transmitting, to the terminal, a random access response on the second cell; and
receiving, from the terminal, the MAC CE for the beam recovery for the second cell associated with the configuration information and the random access response.

16. A base station in a communication system, the base station comprising:
a transceiver; and
a processor coupled with the transceiver and configured to:
transmit, to a terminal, a radio resource control (RRC) message including configuration information associated with a medium access control (MAC) control element (CE) for a beam recovery, wherein the configuration information includes information on a reference signal received power (RSRP) threshold, and
in case that a configuration of a physical uplink control channel (PUCCH) transmission is provided for the terminal, the processor is further configured to:
receive, from the terminal, a scheduling request (SR) for an uplink resource associated with the configuration of the PUCCH transmission,
transmit, to the terminal, resource allocation information of the uplink resource, and
receive, from the terminal, the MAC CE for the beam recovery for a first cell on the uplink resource.

17. The base station of claim 16, wherein the MAC CE for the beam recovery includes information on a beam associated with the beam recovery, and wherein the beam is based on the RSRP threshold.

18. The base station of claim 16, wherein the MAC CE for the beam recovery is prioritized in a specific order.

19. The base station of claim 16, wherein, in case that the configuration of the PUCCH transmission is not provided for the terminal, the processor is further configured to:
- receive, from the terminal, a random access preamble of a random access procedure;
- transmit, to the terminal, a random access response of the random access procedure; and
- receive, from the terminal, the MAC CE for the beam recovery in a message 3 of the random access procedure after transmission of the random access response.

20. The base station of claim 16, wherein the processor is further configured to:
- receive, from the terminal, a random access preamble on a second cell different from the first cell;
- transmit, to the terminal, a random access response on the second cell; and
- receive, from the terminal, the MAC CE for the beam recovery for the second cell associated with the configuration information and the random access response.

* * * * *